United States Patent
Schrage et al.

(10) Patent No.: US 10,279,303 B2
(45) Date of Patent: May 7, 2019

(54) SEAL ARRANGEMENT FOR FILTER ELEMENT; FILTER ELEMENT ASSEMBLY; AND, METHODS

(71) Applicant: Donaldson Company, Inc., Minneapolis, MN (US)

(72) Inventors: Kevin Schrage, Spring Valley, MN (US); Troy Murphy, Cresco, IA (US); Donald Raymond Mork, Lime Springs, IA (US)

(73) Assignee: Donaldson Company, Inc., Minneapolis, MN (US)

( * ) Notice: Subject to any disclaimer, the term of this patent is extended or adjusted under 35 U.S.C. 154(b) by 62 days.

(21) Appl. No.: 15/250,308

(22) Filed: Aug. 29, 2016

(65) Prior Publication Data

US 2017/0050139 A1 Feb. 23, 2017

Related U.S. Application Data

(63) Continuation of application No. 14/230,561, filed on Mar. 31, 2014, now Pat. No. 9,457,310, which is a
(Continued)

(51) Int. Cl.
*B01D 46/52* (2006.01)
*B01D 46/00* (2006.01)
(Continued)

(52) U.S. Cl.
CPC ....... *B01D 46/527* (2013.01); *B01D 46/0001* (2013.01); *B01D 46/0004* (2013.01); *B01D 46/10* (2013.01); *B01D 46/525* (2013.01); *B01D 46/528* (2013.01); *F02M 35/024* (2013.01); *F02M 35/02483* (2013.01);
(Continued)

(58) Field of Classification Search
None
See application file for complete search history.

(56) References Cited

U.S. PATENT DOCUMENTS 3,019,854 A 2/1962 O'Bryant
3,025,963 A * 3/1962 Bauer ................. B01D 27/005
156/205
(Continued)

FOREIGN PATENT DOCUMENTS

CA 997684 9/1976
CN 1456384 11/2003
(Continued)

OTHER PUBLICATIONS

U.S. Appl. No. 11/019,883, filed Dec. 21, 2004, and issued as U.S. Pat. No. 7,396,376.
(Continued)

*Primary Examiner* — Amber R Orlando
(74) *Attorney, Agent, or Firm* — Merchant & Gould P.C.

(57) ABSTRACT

A filter element arrangement is provided which includes a media pack comprising Z-filter media, a preform and an overmold sealing a portion of the interface between the preform and the media pack, and also forming an air cleaner seal for the filter element. The overmold preferably comprises molded, foamed, polyurethane. A variety of media pack shapes can be used.

28 Claims, 17 Drawing Sheets

Related U.S. Application Data continuation of application No. 13/584,224, filed on Aug. 13, 2012, now Pat. No. 8,685,128, which is a continuation of application No. 13/098,983, filed on May 2, 2011, now Pat. No. 8,241,384, which is a continuation of application No. 12/215,725, filed on Jun. 30, 2008, now Pat. No. 7,935,166, which is a continuation of application No. 11/019,883, filed on Dec. 21, 2004, now Pat. No. 7,396,376.

(60) Provisional application No. 60/532,783, filed on Dec. 22, 2003.

(51) Int. Cl.
*B01D 46/10* (2006.01)
*F02M 35/024* (2006.01)

(52) U.S. Cl.
CPC .... *B01D 2271/02* (2013.01); *B01D 2271/027* (2013.01); *B01D 2279/60* (2013.01); *Y10S 55/30* (2013.01)

(56) References Cited

U.S. PATENT DOCUMENTS

| | | | | |
|---|---|---|---|---|
| 3,209,917 A | * | 10/1965 | Yelinek | B01D 27/02 210/484 |
| 3,442,067 A | | 5/1969 | Swenson | |
| 3,676,242 A | * | 7/1972 | Prentice | B32B 27/00 156/62.4 |
| 3,695,437 A | * | 10/1972 | Shaltis | B01D 27/08 210/136 |
| 3,740,933 A | | 6/1973 | Hollowell | |
| 3,807,150 A | * | 4/1974 | Maracle | B01D 46/2411 210/493.1 |
| 3,841,953 A | * | 10/1974 | Lohkamp et al. | D01D 5/0985 156/181 |
| 3,849,241 A | * | 11/1974 | Butin | D01D 5/0985 156/167 |
| 3,878,014 A | * | 4/1975 | Melead | D04H 1/56 156/167 |
| 3,912,631 A | | 10/1975 | Turman | |
| 4,065,341 A | * | 12/1977 | Cub | B01D 25/001 156/187 |
| 4,282,186 A | * | 8/1981 | Nonnenmann | F01N 3/281 422/180 |
| 4,285,909 A | * | 8/1981 | Mizusawa | B01D 53/86 422/179 |
| 4,310,419 A | | 1/1982 | Nara et al. | |
| 4,322,231 A | * | 3/1982 | Hilzendeger | B01D 46/0005 49/463 |
| 4,402,830 A | * | 9/1983 | Pall | B01D 29/111 210/457 |
| 4,449,993 A | * | 5/1984 | Bergeron | B01D 46/00 55/379 |
| 4,498,989 A | | 2/1985 | Miyakawa et al. | |
| 4,578,091 A | | 3/1986 | Borja | |
| 4,617,176 A | * | 10/1986 | Merry | F01N 3/2857 422/179 |
| 4,720,292 A | * | 1/1988 | Engel | B01D 46/2414 55/337 |
| 4,759,783 A | | 7/1988 | Machado | |
| 4,824,564 A | | 4/1989 | Edwards et al. | |
| 4,925,561 A | * | 5/1990 | Ishii | B01D 46/2451 210/493.3 |
| 4,997,556 A | | 3/1991 | Yano et al. | |
| 4,999,038 A | | 3/1991 | Lundberg | |
| 5,038,775 A | * | 8/1991 | Maruscak | A62B 23/02 128/205.27 |
| 5,049,326 A | | 9/1991 | Matsumoto et al. | |
| 5,082,476 A | * | 1/1992 | Kahlbaugh | B01D 39/14 55/320 |
| 5,174,895 A | | 12/1992 | Drori | |
| 5,238,474 A | * | 8/1993 | Kahlbaugh | B01D 39/14 55/320 |
| 5,266,195 A | * | 11/1993 | Hopkins | B01D 61/10 210/321.74 |
| 5,304,312 A | * | 4/1994 | Forster | B01D 25/24 210/808 |
| 5,350,515 A | * | 9/1994 | Stark | B01D 29/111 210/493.2 |
| 5,415,677 A | * | 5/1995 | Ager | B01D 46/0024 55/482 |
| 5,435,870 A | * | 7/1995 | Takagaki | B01D 25/001 156/189 |
| 5,472,463 A | * | 12/1995 | Herman | B01D 46/0047 123/198 E |
| 5,484,466 A | * | 1/1996 | Brown | B01D 46/0004 55/498 |
| 5,487,767 A | * | 1/1996 | Brown | B01D 46/0024 55/357 |
| 5,490,930 A | | 2/1996 | Krull | |
| 5,543,007 A | | 8/1996 | Takagaki et al. | |
| 5,547,480 A | * | 8/1996 | Coulonvaux | B01D 46/0001 55/498 |
| 5,558,689 A | * | 9/1996 | Yanagihara | B01D 46/0001 55/492 |
| 5,582,146 A | | 12/1996 | Linsbauer et al. | |
| 5,611,922 A | | 3/1997 | Stene | |
| 5,611,992 A | * | 3/1997 | Naraghi | C09K 8/54 422/15 |
| 5,613,992 A | * | 3/1997 | Engel | B01D 46/0031 55/432 |
| 5,645,718 A | * | 7/1997 | Hardison | B01D 17/0211 210/232 |
| 5,672,399 A | | 9/1997 | Kahlbaugh et al. | |
| 5,683,660 A | * | 11/1997 | Wirth | B21D 5/015 422/171 |
| 5,685,985 A | * | 11/1997 | Brown | B01D 29/21 210/450 |
| 5,690,712 A | | 11/1997 | Engel | |
| 5,693,109 A | | 12/1997 | Coulonvaux | |
| 5,714,126 A | * | 2/1998 | Frund | A62B 23/02 422/122 |
| 5,730,766 A | * | 3/1998 | Clements | B01D 46/0005 55/341.1 |
| 5,755,843 A | * | 5/1998 | Sundquist | B01D 46/0004 123/198 E |
| 5,772,883 A | * | 6/1998 | Rothman | B01D 25/001 210/487 |
| D396,098 S | * | 7/1998 | Gillingham | B01D 46/527 D23/365 |
| 5,792,247 A | * | 8/1998 | Gillingham | F02M 35/14 181/231 |
| D398,046 S | * | 9/1998 | Gillingham | B01D 46/527 D23/365 |
| 5,800,587 A | | 9/1998 | Kahlbaugh et al. | |
| 5,820,646 A | * | 10/1998 | Gillingham | B01D 25/001 55/488 |
| 5,824,232 A | * | 10/1998 | Asher | B01D 29/21 210/787 |
| D401,306 S | | 11/1998 | Ward et al. | |
| 5,863,313 A | | 1/1999 | Coulonvaux | |
| 5,895,574 A | | 4/1999 | Friedmann et al. | |
| 5,897,676 A | * | 4/1999 | Engel | B01D 46/0031 55/428 |
| 5,902,364 A | * | 5/1999 | Tokar | B01D 25/001 55/498 |
| 5,908,480 A | | 6/1999 | Ban et al. | |
| 5,938,804 A | | 8/1999 | Engel et al. | |
| D416,308 S | | 11/1999 | Ward et al. | |
| D417,268 S | * | 11/1999 | Gillingham | D23/365 |
| 6,048,386 A | | 4/2000 | Gillingham et al. | |
| D425,189 S | * | 5/2000 | Gillingham | B01D 46/0002 D23/355 |
| 6,149,700 A | * | 11/2000 | Morgan | B01D 46/2414 123/198 E |
| 6,179,890 B1 | * | 1/2001 | Ramos | B01D 46/0004 55/482 |

(56) References Cited

U.S. PATENT DOCUMENTS

| | | | |
|---|---|---|---|
| 6,187,073 B1* | 2/2001 | Gieseke | B01D 46/0024 123/198 E |
| 6,187,240 B1 | 2/2001 | Coulonvaux | |
| 6,190,432 B1* | 2/2001 | Gieseke | B01D 46/0001 123/198 E |
| 6,235,195 B1* | 5/2001 | Tokar | B01D 25/001 210/238 |
| D450,827 S | 11/2001 | Gieseke et al. | |
| 6,312,491 B2 | 11/2001 | Coulonvaux | |
| 6,348,084 B1* | 2/2002 | Gieseke | B01D 46/0002 55/357 |
| 6,348,085 B1* | 2/2002 | Tokar | B01D 46/0001 55/482 |
| 6,350,291 B1 | 2/2002 | Gieseke et al. | |
| 6,368,374 B1* | 4/2002 | Tokar | B01D 46/10 210/443 |
| D461,003 S | 7/2002 | Gieseke et al. | |
| D461,884 S | 8/2002 | Gieseke et al. | |
| 6,447,567 B1 | 9/2002 | Ehrenberg | |
| D466,602 S | 12/2002 | Gieseke et al. | |
| 6,517,598 B2* | 2/2003 | Anderson | B01D 46/0004 55/498 |
| 6,610,117 B2 | 8/2003 | Gieseke et al. | |
| 6,610,126 B2 | 8/2003 | Xu et al. | |
| 6,638,332 B1 | 10/2003 | Schmitz et al. | |
| 6,652,614 B2 | 11/2003 | Gieseke et al. | |
| D483,459 S* | 12/2003 | DeWit | D23/365 |
| 6,743,317 B2 | 6/2004 | Wydeven | |
| 6,783,565 B2 | 8/2004 | Gieseke et al. | |
| 6,946,012 B1 | 9/2005 | Miller et al. | |
| 6,994,744 B2 | 2/2006 | Tokar et al. | |
| 6,997,968 B2 | 2/2006 | Xu et al. | |
| 7,004,986 B2 | 2/2006 | Kopec et al. | |
| 7,008,467 B2 | 3/2006 | Krisko et al. | |
| 7,252,704 B2 | 8/2007 | Tokar et al. | |
| 7,255,300 B2 | 8/2007 | Johnston | |
| 7,261,756 B2 | 8/2007 | Merritt | |
| 7,303,604 B2 | 12/2007 | Gieseke et al. | |
| 7,318,851 B2 | 1/2008 | Brown et al. | |
| 7,396,376 B2 | 7/2008 | Schrage et al. | |
| 7,674,308 B2 | 3/2010 | Krisko et al. | |
| 7,931,724 B2 | 4/2011 | Schrage et al. | |
| 7,935,166 B2 | 5/2011 | Schrage et al. | |
| 7,959,701 B2 | 6/2011 | Merritt | |
| 8,034,144 B2 | 10/2011 | Gieseke et al. | |
| 8,152,888 B2* | 4/2012 | Nelson | B01D 46/0001 55/498 |
| 8,241,384 B2 | 8/2012 | Schrage et al. | |
| 8,409,316 B2 | 4/2013 | Nelson et al. | |
| 8,685,128 B2 | 4/2014 | Schrage et al. | |
| 8,945,268 B2 | 2/2015 | Nelson et al. | |
| 9,457,310 B2 | 10/2016 | Schrage et al. | |
| 9,718,021 B2 | 8/2017 | Nelson et al. | |
| 9,757,676 B2 | 9/2017 | Merritt et al. | |
| 9,827,527 B2 | 11/2017 | Merritt et al. | |
| 2001/0003893 A1 | 6/2001 | Ramos et al. | |
| 2001/0037631 A1* | 11/2001 | Morgan | B01D 46/2414 55/498 |
| 2002/0096247 A1* | 7/2002 | Wydeven | B01D 46/525 156/210 |
| 2002/0100262 A1* | 8/2002 | Gieseke | B01D 46/0001 55/385.3 |
| 2002/0150806 A1 | 10/2002 | Stenersen et al. | |
| 2002/0184864 A1* | 12/2002 | Bishop | B01D 25/001 55/498 |
| 2002/0185007 A1* | 12/2002 | Xu | B01D 46/0004 95/273 |
| 2003/0042196 A1 | 3/2003 | Leibold et al. | |
| 2004/0173097 A1* | 9/2004 | Engelland | B01D 46/0004 95/273 |
| 2004/0221555 A1 | 11/2004 | Engelland et al. | |
| 2005/0060972 A1 | 3/2005 | Gieseke et al. | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2006/0163150 A1 | 7/2006 | Golden et al. | |
| 2007/0186528 A1 | 8/2007 | Wydeven et al. | |
| 2009/0241494 A1* | 10/2009 | Schrage | B01D 46/0001 55/500 |
| 2009/0266041 A1 | 10/2009 | Schrage et al. | |
| 2009/0301045 A1 | 12/2009 | Nelson et al. | |
| 2010/0011725 A1 | 1/2010 | Babb | |
| 2010/0242425 A1 | 9/2010 | Swanson et al. | |
| 2011/0197556 A1 | 8/2011 | Brown et al. | |
| 2011/0203241 A1 | 8/2011 | Schrage et al. | |
| 2014/0014572 A1 | 1/2014 | Mbadinga-Mouanda et al. | |
| 2018/0015406 A1 | 1/2018 | Nelson et al. | |

FOREIGN PATENT DOCUMENTS

| | | |
|---|---|---|
| DE | 2155522 | 5/1973 |
| DE | 10222800 | 12/2003 |
| EP | 0 376 443 B1 | 7/1990 |
| EP | 0 486 276 B1 | 5/1992 |
| EP | 0 492 250 A1 | 7/1992 |
| EP | 0 529 921 B1 | 3/1993 |
| EP | 0 581 695 B1 | 2/1994 |
| EP | 0 704 233 B1 | 4/1996 |
| EP | 0 738 528 A2 | 10/1996 |
| EP | 1 008 375 A1 | 6/2000 |
| EP | 1 023 933 A2 | 8/2000 |
| EP | 1 159 052 B1 | 12/2001 |
| EP | 1 364 695 A1 | 11/2003 |
| GB | 703823 | 2/1954 |
| GB | 1275651 | 5/1972 |
| JP | S58-151417 | 3/1982 |
| JP | 59-26113 | 2/1984 |
| JP | S60-155921 | 3/1984 |
| JP | 59-170669 | 11/1984 |
| JP | 60-112320 | 7/1985 |
| JP | 63-122617 | 8/1988 |
| JP | H02-48117 | 9/1988 |
| JP | H02-48118 | 9/1988 |
| JP | 1-11971 | 4/1989 |
| JP | 1-171615 | 7/1989 |
| JP | 1-122817 | 8/1989 |
| WO | WO 88/03431 | 5/1988 |
| WO | WO 88/03432 | 5/1988 |
| WO | WO 97/40908 | 11/1997 |
| WO | WO 97/40910 | 11/1997 |
| WO | WO 97/40917 | 11/1997 |
| WO | WO 97/40918 | 11/1997 |
| WO | WO 97/41939 | 11/1997 |
| WO | WO 97/45200 | 12/1997 |
| WO | WO 98/35144 | 8/1998 |
| WO | WO 99/37381 | 7/1999 |
| WO | WO 99/47237 | 9/1999 |
| WO | WO 00/32295 | 6/2000 |
| WO | WO 00/50149 | 8/2000 |
| WO | WO 00/74818 A1 | 12/2000 |
| WO | WO 03/084641 A2 | 10/2003 |
| WO | WO 03/095068 A1 | 11/2003 |
| WO | WO 2004/007054 A1 | 1/2004 |
| WO | WO 2004/020075 A2 | 3/2004 |
| WO | WO 2005/063361 A1 | 7/2005 |
| WO | WO 2005/094655 A2 | 10/2005 |
| WO | WO 2006/017790 A1 | 2/2006 |
| WO | WO 2007/056589 A2 | 5/2007 |

OTHER PUBLICATIONS

U.S. Appl. No. 12/215,725, filed Jun. 30, 2008, and issued as U.S. Pat. No. 7,935,166.
U.S. Appl. No. 13/098,983, filed May 2, 2011, and issued as U.S. Pat. No. 8,241,384.
U.S. Appl. No. 12/321,130, filed Jan. 14, 2009, and published as US 2009/0266041 and is abandoned.
U.S. Appl. No. 12/381,669, filed Mar. 13, 2009, and issued as U.S. Pat. No. 7,931,724.

(56) References Cited

OTHER PUBLICATIONS

U.S. Appl. No. 12/321,127, filed Jan. 14, 2009, and published as US 2009/0241494 and is abandoned.
U.S. Appl. No. 13/584,224, filed Aug. 13, 2012, and issued as U.S. Pat. No. 8,685,128.
U.S. Appl. No. 14/230,561, filed Mar. 31, 2014, and issued as U.S. Pat. No. 9,457,310.
U.S. Appl. No. 12/084,730, filed Nov. 8, 2006, and issued as U.S. Pat. No. 8,409,316.
U.S. Appl. No. 13/854,316, filed Apr. 1, 2013, and issued as U.S. Pat. No. 8,945,268.
U.S. Appl. No. 14/611,604, filed Feb. 2, 2016, and published as US 2015/0343364 (pending).
Brown Demonstrative Exhibits filed May 2, 2013.
Brown Exhibit 2001—USP 20090241494, Schrage U.S. Appl. No. 12/321,127, published Oct. 1, 2009.
Brown Exhibit 2007—Browns involved U.S. Pat. No. 7,318,851 (Document name EX2007_USP_7318851_Brown.pdf), issued Jan. 15, 2008.
Brown Exhibit 2008—Schrage Notice of Copying Claims (Document name EX2008_SchrageNoticeOfCopyingClaims.pdf), filed in Interference on Jul. 13, 2011.
Brown Exhibit 2009—Schrage's involved application's specification, including claims and abstract, and figures, filed in Interference on Jul. 13, 2011.
Brown Exhibit 2010—U.S. Patent Publication 20090301045 to Nelson, published Dec. 10, 2009.
Brown Exhibit 2011—Inventor Declaration in Nelson, U.S. Appl. No. 12/084,730, published as 20090301045, filed in Interference Jul. 13, 2011.
Brown Exhibit 2012—Text Compare Figs1-16Nelson_Schrage, filed in Interference Jul. 7, 2011.
Brown Exhibit 2013—Definition of "shelf" from onelook.com, downloaded Jun. 23, 2011.
Brown Exhibit 2014—Definition of "rib" from Oxford Dictionaries, downloaded Jun. 23, 2011.
Brown Exhibit 2015—Definition of "annular" from onelook.com, downloaded Jun. 23, 2011.
Brown Exhibit 2016—Definition of "ring" from onelook.com, downloaded Jun. 23, 2011.
Brown Exhibit 2017—Definition of "raised" from onelook.com, downloaded Jun. 23, 2011.
Brown Exhibit 2018—Definition of "projecting" from onelook.com, downloaded Jun. 23, 2011.
Brown Exhibit 2019—Claims of Schrage provisional, filed in Interference Jul. 13, 2011.
Brown Exhibit 2020—Claims of Schrage U.S. Appl. No. 11/091,883, as filed, filed in Interference Jul. 13, 2011.
Brown Exhibit 2021—Examiner Reasons for Allowance, U.S. Appl. No. 11/019,883, filed in Interference Jul. 13, 2011.
Brown Exhibit 2022—Schrage Comments on Allowance in U.S. Appl. No. 11/019,883, filed in Interference Jul. 13, 2011.
Brown Exhibit 2023—US Patent Publication 20030146149 showing holes in the extension, published Aug. 7, 2003.
Brown Exhibit 2024—Timely Engineering Associates Memorandum dated Aug. 10, 2004.
Brown Exhibit 2025—Apr. 1, 2003 Baldwin Filters Engineering Bulletin.
Brown Exhibit 2026—Apr. 6, 2004 Baldwin Update.
Brown Exhibit 2027—Aug. 5, 2003 Baldwin Update.
Brown Exhibit 2028—CV of Steve Merritt, filed in Interference Jul. 7, 2011.
Brown Exhibit 2029—Definition of "from" from onelook.com, downloaded Jul. 1, 2011.
Brown Exhibit 2030—Brown Reasons for Allowance, filed in Interference Jul. 13, 2011.
Brown Exhibit 2031—Definition of "edge" from onelook.com, downloaded Jul. 3, 2011.
Brown Exhibit 2032—Definition of "perimeter" from onelook.com, downloaded Jul. 3, 2011.
Brown Exhibit 2033—Brown's first declaration of Steve Merritt, filed in Interference Jul. 7, 2011.
Brown Exhibit 2034—Definition of "axial" from onelook.com, downloaded Jul. 6, 2011.
Brown Exhibit 2035—Definition of "situated" from onelook.com, downloaded Jul. 6, 2011.
Brown Exhibit 2036—Definition of "on" from onelook.com, downloaded Jul. 6, 2011.
Brown Exhibit 2037—Brown Exhibit 2001—Definition of "along" from onelook.com, downloaded Jul. 6, 2011.
Brown Exhibit 2038—Definition of "in" from onelook.com, downloaded Jul. 6, 2011.
Brown Exhibit 2039—Definition of "direction" from onelook.com, downloaded Jul. 6, 2011.
Brown Exhibit 2040—Definition of "of" from onelook.com, downloaded Jul. 6, 2011.
Brown Exhibit 2041—Definitions of "axially" from onelook.com, downloaded Jul. 6, 2011.
Brown Exhibit 2042—Definitions of "axis" from onelook.com, downloaded Jul. 6, 2011.
Brown Exhibit 2043—Definitions of "connecting" from onelook.com, downloaded Jul. 17, 2011.
Brown Exhibit 2044—Definitions of "connection" from onelook.com, downloaded Jul. 17, 2011.
Brown Exhibit 2045—Definitions of "operatively" from onelook.com, downloaded Jul. 17, 2011.
Brown Exhibit 2046—Definitions of "operative" from onelook.com, downloaded Jul. 17, 2011.
Brown Exhibit 2047—Brown's second declaration of Steve Merritt in Support of Motion 3, filed in Interference Aug. 31, 2011.
Brown Exhibit 2049—Definitions of "filter" from onelook.com, downloaded Jul. 17, 2011.
Brown Exhibit 2050—Brown Steve Merritt Unnumbered Declaration in Response to Objections to Evidence Submitted in Support of Brown Motion 2, filed in Interference Dec. 25, 2011.
Brown Exhibit 2051—US Patent Application Publication 20020185008 to Anderson, filed in Interference on Dec. 25, 2011, published Dec. 12, 2002.
Brown Exhibit 2052—IFW for Schrage accorded benefit U.S. Appl. No. 60/532,783, filed in Interference Aug. 31, 2011.
Brown Exhibit 2053—Application, as Filed, for Schrage accorded to benefit U.S. Appl. No. 11/019,883, filed in Interference Aug. 31, 2011.
Brown Exhibit 2054—Application, as Filed, for Schrage accorded to benefit U.S. Appl. No. 12/215,725, filed in Interference Aug. 31, 2011.
Brown Exhibit 2055—Brown's third declaration of Steve Merritt in support of Motion 4, filed in Interference Aug. 31, 2011.
Brown Exhibit 2056—Brown's fourth declaration of Steve Merritt in support of Motion 5, filed in Interference Aug. 31, 2011.
Brown Exhibit 2057—Brown's fifth declaration of Steve Merritt in support of Motion, filed in Interference Aug. 31, 2011.
Brown Exhibit 2059—"John Deere" Trademark registration No. 921844, downloaded Jul. 23, 2011.
Brown Exhibit 2060—AL111748B perspective top elevation view, long side, filed in Interference Aug. 31, 2011.
Brown Exhibit 2061—AL111748B perspective side elevation view, long side, filed in Interference Aug. 31, 2011.
Brown Exhibit 2062—AL1117488 perspective side elevation view, short side, filed in Interference Aug. 31, 2011.
Brown Exhibit 2063—AL111748B perspective bottom elevation view, long side, filed in Interference Aug. 31, 2011.
Brown Exhibit 2064—AL111748B close-up of outer side surface of seal, filed in Interference Aug. 31, 2011.
Brown Exhibit 2065—AL111748E close-up of inner short side surface of seal, filed in Interference Aug. 31, 2011.
Brown Exhibit 2066—AL111748B close-up of inner long side surface of seal, peeled, filed in Interference Aug. 31, 2011.
Brown Exhibit 2067—Sandberg Declaration Regarding AL111748 sale in the U.S., filed in Interference Jul. 27, 2011.
Brown Exhibit 2068—Sandberg Declaration Exhibit A, bates Nos. 1-4, filed in Interference Jul. 27, 2011.

(56) References Cited

OTHER PUBLICATIONS

Brown Exhibit 2069—Sandberg Declaration Exhibit A, bates Nos. 5-7, filed in Interference Jul. 27, 2011.
Brown Exhibit 2070—Sandberg Declaration Exhibit A, bates Nos. 8, filed in Interference Jul. 27, 2011.
Brown Exhibit 2071—Sandberg Declaration Exhibit A, bates Nos. 9-17, filed in Interference Jul. 27, 2011.
Brown Exhibit 2072—Sandberg Declaration Exhibit A, bates Nos. 18-25, filed in Interference Jul. 27, 2011.
Brown Exhibit 2073—Sandberg Declaration Exhibit A, bates Nos. 26, filed in Interference Jul. 27, 2011.
Brown Exhibit 2074—Sandberg Declaration Exhibit A, bates Nos. 27, filed in Interference Jul. 27, 2011.
Brown Exhibit 2075—Sandberg Declaration Exhibit A, bates Nos. 28-31, filed in Interference Jul. 27, 2011.
Brown Exhibit 2076—Sandberg Declaration Exhibit A, bates Nos. 32, filed in Interference Jul. 27, 2011.
Brown Exhibit 2077—Sandberg Declaration Exhibit A, bates Nos. 33-36, filed in Interference Jul. 27, 2011.
Brown Exhibit 2078—Sandberg Declaration Exhibit A, bates Nos. 37-42, filed in Interference Jul. 27, 2011.
Brown Exhibit 2079—Sandberg Declaration Exhibit A, bates Nos. 43, filed in Interference Jul. 27, 2011.
Brown Exhibit 2080—Sandberg Declaration Exhibit A, bates Nos. 44-45, filed in Interference Jul. 27, 2011.
Brown Exhibit 2081—Sandberg Declaration Exhibit A, bates Nos. 46-49, filed in Interference Jul. 27, 2011.
Brown Exhibit 2082—Sandberg Declaration Exhibit A, bates Nos. 50-53, filed in Interference Jul. 27, 2011.
Brown Exhibit 2083—Sandberg Declaration Exhibit A, bates Nos. 54-60, filed in Interference Jul. 27, 2011.
Brown Exhibit 2084—Sandberg Declaration Exhibit A, bates Nos. 61-65, filed in Interference Jul. 27, 2011.
Brown Exhibit 2085—Sandberg Declaration Exhibit A, bates Nos. 66-71, filed in Interference Jul. 27, 2011.
Brown Exhibit 2086—Sandberg Declaration Exhibit A, bates Nos. 72, filed in Interference Jul. 27, 2011.
Brown Exhibit 2087—Definition of "canted" from onelook.com, downloaded Aug. 31, 2011.
Brown Exhibit 2089—Redacted version of Conception Document, filed in Interference Sep. 6, 2011.
Brown Exhibit 2090—AL1117488 close-up of stripped corner, posts exposed, filed in Interference Aug. 31, 2011.
Brown Exhibit 2091—U.S. Pat. No. 5,902,364 to Tokar, seal height, issued May 11, 1999.
Brown Exhibit 2092—Deere TM4523 (Aug. 3, 1997) manual excerpt, showing filter, filed in Interference Aug. 31, 2011.
Brown Exhibit 2093—Transcript of Aug. 19, 2011 deposition of Eric Sandberg, signature page.
Brown Exhibit 2094—Picture of label and packing bag enclosing new AL111748 filter, filed in Interference Aug. 31, 2011.
Brown Exhibit 2095—Brown Steve Merritt Unnumbered Declaration in Response to Objections to Evidence Served on Brown Sep. 7, 2011.
Brown Exhibit 2096—Brown Bruce Margulies Unnumbered Declaration in Response to Objections to Evidence Served on Brown on Sep. 7, 2011.
Brown Exhibit 2097—Brown Sep. 16, 2011 Email Requesting Clarification of Sep. 7, 2011 Objections.
Brown Exhibit 2098—Brown's seventh declaration of Steve Merritt in support of Opposition 1, filed in Interference Nov. 15, 2011.
Brown Exhibit 2099—Definition of "conically" from onelook.com, downloaded Oct. 5, 2011.
Brown Exhibit 2100—Definition of "conical" from onelook.com, downloaded Oct. 5, 2011.
Brown Exhibit 2101—Definition of "join" from onelook.com, downloaded Oct. 8, 2011.
Brown Exhibit 2102—Definition of "joined" from onelook.com, downloaded Oct. 8, 2011.
Brown Exhibit 2103—Definition of "joint" from onelook.com, downloaded Oct. 8, 2011.
Brown Exhibit 2104—Definition of "cavity" from onelook.com, downloaded Oct. 8, 2011.
Brown Exhibit 2105—Definition of "hub" from onelook.com, downloaded Oct. 8, 2011.
Brown Exhibit 2108—Definition of "bead" from onelook.com, downloaded Oct. 10, 2011.
Brown Exhibit 2109—Transcript of Cross Examination of Mr. Pui on Oct. 25, 2011.
Brown Exhibit 2110—*Carace* v. *Meyer Marketing*, 2011 U.S. Dist. Lexis 104181, ___ F. Supp. ___ (S.D.N.Y., Sep. 13, 2011).
Brown Exhibit 2117—Steve Merritt measurements on Fig. 7 of U.S. Pat. No. 6,350,291, filed in Interference Nov. 15, 2011.
Brown Exhibit 2118—Steve Merritt measurements on Fig. 6 of U.S. Pat. No. 6,350,291, filed in Interference Nov. 15, 2011.
Brown Exhibit 2119—Screen Shot of Solid Edge generated lines on zoomed portion of Fig. 6 of U.S. Pat. No. 6,350,291, filed in Interference Nov. 15, 2011.
Brown Exhibit 2120—Brown's eighth declaration of Steve Merritt in support of Reply 2, filed in Interference Nov. 29, 2011.
Brown Exhibit 2121—Steve Merritt measurements on Fig. 4 of US20090241494 (Schrage), filed in Interference Nov. 29, 2011.
Brown Exhibit 2122—Steve Merritt measurements on Fig. 6 of US20090241494 (Schrage), filed in Interference Nov. 29, 2011.
Brown Exhibit 2123—Steve Merritt measurements on Fig. 10 of US20090241494 (Schrage), filed in Interference Nov. 29, 2011.
Brown Exhibit 2125—Brown unnumbered declaration of Steve Merritt in response to objection served Nov. 22, 2011 to evidence Brown evidence served Nov. 15, 2011.
Brown Exhibit 2126—Brown Objections to Evidence Served Sep. 1, 2011.
Brown Exhibit 2127—Brown Objections to Evidence Served Sep. 22, 2011.
Brown Exhibit 2128—Brown Objections to Evidence Served Sep. 22, 2011.
Brown Exhibit 2129—Brown unnumbered declaration of Steve Merritt in response to objection served Dec. 6, 2011 to evidence Brown served Nov. 29, 2011.
Brown Exhibit 2130—Wikipedia page for "Solid Edge," downloaded Dec. 12, 2011.
Brown Exhibit 2131—Wikipedia page for "Measurement Uncertainty," downloaded Dec. 12, 2011.
Brown Exhibit 2132—US application publication 20060090434 to Brown published May 4, 2006.
Brown Exhibit 2133—Brown Ninth Declaration of Steve Merritt in support of Motion 9, filed in Interference Apr. 18, 2012.
Brown Exhibit 2134—US application publication 20050166561 (publication of the first filed non provisional Schrage application), published Aug. 4, 2005.
Brown Exhibit 2135—Selected pages of U.S. Pat. No. 6,410,516 (pp. 1, 2, 3, and 62), published Jun. 25, 2002.
Brown Exhibit 2136—Paper 352, Decision on Motions, in *Mitchell* v. *Holt*, Interference 105,746, filed in Interference Apr. 27, 2012.
Brown Exhibit 2137—Jan. 10, 2003 Memo to Norm Johnson.
Brown Exhibit 2138—Jan. 31, 2003 Memo to Norm Johnson.
Brown Exhibit 2139—Feb. 7, 2003 Memo to Norm Johnson.
Brown Exhibit 2140—Mar. 7, 2003 Memo to Norm Johnson.
Brown Exhibit 2141—Mar. 14, 2003 Memo to Norm Johnson.
Brown Exhibit 2142—Mar. 21, 2003 Memo to Norm Johnson.
Brown Exhibit 2143—Mar. 28, 2003 Memo to Norm Johnson.
Brown Exhibit 2144—Apr. 4, 2003 Memo to Norm Johnson.
Brown Exhibit 2145—Apr. 18, 2003 Memo to Norm Johnson.
Brown Exhibit 2146—May 2, 2003 Memo to Norm Johnson.
Brown Exhibit 2147—Marked up Ex 2089, showing numbers for counts 2-3 language, dated Dec. 25, 2011.
Brown Exhibit 2148—May 12, 2003 G.W. Brown 13 page power point.
Brown Exhibit 2149—May 23, 2003 Memo to Norm Johnson.
Brown Exhibit 2150—Channel Flow Concept Ideas TOC, dated Jan. 4, 2008.
Brown Exhibit 2151—Channel Flow Concept Ideas Tab 36, dated May 12, 2003.

(56) References Cited

OTHER PUBLICATIONS

Brown Exhibit 2152—Jun. 6, 2003 Memo to Norm Johnson.
Brown Exhibit 2153—Jun. 13, 2003 Memo to Norm Johnson.
Brown Exhibit 2154—Jun. 20, 2003 Memo to Norm Johnson.
Brown Exhibit 2155—Jun. 27, 2003 Memo to Norm Johnson.
Brown Exhibit 2156—Jul. 3, 2003 Memo to Norm Johnson.
Brown Exhibit 2157—Jul. 18, 2003 Memo to Norm Johnson.
Brown Exhibit 2158—Aug. 1, 2003 Memo to Norm Johnson.
Brown Exhibit 2159—Aug. 8, 2003 Memo to Norm Johnson.
Brown Exhibit 2160—Aug. 15, 2003 Memo to Norm Johnson.
Brown Exhibit 2161—Aug. 22, 2003 Memo to Norm Johnson.
Brown Exhibit 2162—Aug. 29, 2003 Memo to Norm Johnson.
Brown Exhibit 2163—Sep. 5, 2003 Memo to Norm Johnson.
Brown Exhibit 2164—Sep. 26, 2003 Memo to Norm Johnson.
Brown Exhibit 2165—Oct. 24, 2003 Memo to Norm Johnson.
Brown Exhibit 2166—Oct. 31, 2003 Memo to Norm Johnson.
Brown Exhibit 2167—Nov. 7, 2003 Memo to Norm Johnson.
Brown Exhibit 2168—Nov. 21, 2003 Memo to Norm Johnson.
Brown Exhibit 2169—Nov. 26, 2003 Memo to Norm Johnson.
Brown Exhibit 2170—Dec. 19, 2003 Memo to Norm Johnson.
Brown Exhibit 2171—Jan. 16, 2004 Memo to Norm Johnson.
Brown Exhibit 2172—Jan. 23, 2004 Memo to Norm Johnson.
Brown Exhibit 2173—Jan. 30, 2004 Memo to Norm Johnson.
Brown Exhibit 2174—Feb. 6, 2004 Memo to Norm Johnson.
Brown Exhibit 2175—Feb. 20, 2004 Memo to Norm Johnson.
Brown Exhibit 2176—Feb. 27, 2004 Memo to Norm Johnson.
Brown Exhibit 2177—Mar. 19, 2004 Memo to Norm Johnson.
Brown Exhibit 2178—Mar. 26, 2004 Memo to Norm Johnson.
Brown Exhibit 2179—Apr. 2, 2004 Memo to Norm Johnson.
Brown Exhibit 2180—Apr. 9, 2004 Memo to Norm Johnson.
Brown Exhibit 2181—Apr. 16, 2004 Memo to Norm Johnson.
Brown Exhibit 2182—Feb. 13, 2004 Memo to Norm Johnson.
Brown Exhibit 2183—Mar. 5, 2004 Memo to Norm Johnson.
Brown Exhibit 2184—Apr. 23, 2004 Memo to Norm Johnson.
Brown Exhibit 2185—May 7, 2004 Memo to Norm Johnson.
Brown Exhibit 2186—May 14, 2004 Memo to Norm Johnson.
Brown Exhibit 2187—May 21, 2004 Memo to Norm Johnson.
Brown Exhibit 2188—Emails between counsel regarding service discrepancy, Ex 1101, dated Jul. 16, 2012.
Brown Exhibit 2189—Jun. 4, 2004 Memo to Norm Johnson.
Brown Exhibit 2190—Jun. 25, 2004 Memo to Norm Johnson.
Brown Exhibit 2191—Jul. 2, 2004 Memo to Norm Johnson.
Brown Exhibit 2192—Jul. 9, 2004 Memo to Norm Johnson.
Brown Exhibit 2193—Jul. 16, 2004 Memo to Norm Johnson.
Brown Exhibit 2194—Jul. 23, 2004 Memo to Norm Johnson.
Brown Exhibit 2195—Jul. 30, 2004 Memo to Norm Johnson.
Brown Exhibit 2196—Aug. 6, 2004 Memo to Norm Johnson.
Brown Exhibit 2197—Aug. 13, 2004 Memo to Norm Johnson.
Brown Exhibit 2198—Aug. 20, 2004 Memo to Norm Johnson.
Brown Exhibit 2199—Aug. 27, 2004 Memo to Norm Johnson.
Brown Exhibit 2200—Mar. 3, 2004 Memo to Norm Johnson.
Brown Exhibit 2201—Sep. 10, 2004 Memo to Norm Johnson.
Brown Exhibit 2202—Sep. 17, 2004 Memo to Norm Johnson.
Brown Exhibit 2203—Sep. 24, 2004 Memo to Norm Johnson.
Brown Exhibit 2204—Oct. 1, 2004 Memo to Norm Johnson.
Exhibit 2205—Oct. 8, 2004 Memo to Norm Johnson.
Exhibit 2206—Oct. 22, 2004 Memo to Norm Johnson.
Exhibit 2207—Oct. 29, 2004 Memo to Norm Johnson.
Exhibit 2208—Nov. 5, 2004 Memo to Norm Johnson.
Exhibit 2209—Nov. 12, 2004 Memo to Norm Johnson.
Exhibit 2210—Jul. 17, 2003 Memo, Ken Stirn to Distribution.
Exhibit 2211—Jul. 21, 2003 Memo from Michaela Lewis regarding Powercore Weekly Update.
Exhibit 2212—Jul. 29, 2003 Memo from Michaela Lewis regarding Powercore Weekly Update.
Exhibit 2213—Aug. 4, 2003 Memo from Michaela Lewis regarding Powercore Weekly Update.
Exhibit 2214—Aug. 11, 2003 Memo from Michaela Lewis regarding Powercore Weekly Update.
Exhibit 2215—Aug. 15, 2003 Memo from Michaela Lewis regarding Powercore Weekly Update.
Exhibit 2216—Aug. 25, 2003 Memo from Michaela Lewis regarding Powercore Weekly Update.
Exhibit 2217—Sep. 22, 2003 Memo from Michaela Lewis regarding Powercore Weekly Update.
Exhibit 2218—Sep. 29, 2003 Memo from Michaela Lewis regarding Powercore Weekly Update.
Exhibit 2219—Oct. 6, 2003 Memo from Michaela Lewis regarding Powercore Weekly Update.
Exhibit 2220—Oct. 10, 2003 Memo from Michaela Lewis regarding Powercore Weekly Update.
Exhibit 2221—Oct. 20, 2003 Memo from Michaela Lewis regarding Powercore Weekly Update.
Exhibit 2222—Oct. 27, 2003 Memo from Michaela Lewis regarding Powercore Weekly Update.
Exhibit 2223—Nov. 3, 2003 Memo from Michaela Lewis regarding Powercore Weekly Update.
Exhibit 2224—Nov. 10, 2003 Memo from Michaela Lewis regarding Powercore Weekly Update.
Exhibit 2225—Nov. 17, 2003 Memo from Michaela Lewis regarding Powercore Weekly Update.
Exhibit 2226—Dec. 5, 2003 Memo from Michaela Lewis regarding Powercore Weekly Update.
Exhibit 2227—Dec. 15, 2003 Memo from Michaela Lewis regarding Powercore Weekly Update.
Exhibit 2228—Dec. 22, 2003 Memo from Michaela Lewis regarding Channel Flow Weekly Update.
Exhibit 2229—Mar. 29, 2004 Memo from Michaela Lewis regarding Channel Flow Weekly Update.
Exhibit 2230—Jan. 19, 2004 Memo from Michaela Lewis regarding Channel Flow Weekly Update.
Exhibit 2231—Feb. 2, 2004 Memo from Michaela Lewis regarding Channel Flow Weekly Update.
Exhibit 2232—Feb. 9, 2004 Memo from Michaela Lewis regarding Channel Flow Weekly Update.
Exhibit 2233—Feb. 16, 2004 Memo from Michaela Lewis regarding Channel Flow Weekly Update.
Brown Exhibit 2234—Feb. 23, 2004 Memo from Michaela Lewis regarding Channel Flow Weekly Update.
Brown Exhibit 2235—Mar. 1, 2004 Memo from Michaela Lewis regarding Channel Flow Weekly Update.
Brown Exhibit 2236—Mar. 8, 2004 Memo from Michaela Lewis regarding Channel Flow Weekly Update.
Brown Exhibit 2237—Mar. 15, 2004 Memo from Michaela Lewis regarding Channel Flow Weekly Update.
Brown Exhibit 2238—Mar. 22, 2004 Memo from Michaela Lewis regarding Channel Flow Weekly Update.
Brown Exhibit 2239—Jan. 12, 2004 Memo from Michaela Lewis regarding Channel Flow Weekly Update.
Brown Exhibit 2240—Apr. 5, 2004 Memo from Michaela Lewis regarding Channel Flow Weekly Update.
Brown Exhibit 2241—Apr. 12, 2004 Memo from Michaela Lewis regarding Channel Flow Weekly Update.
Brown Exhibit 2242—Apr. 19, 2004 Memo from Michaela Lewis regarding Channel Flow Weekly Update.
Brown Exhibit 2243—Apr. 27, 2004 Memo from Michaela Lewis regarding Channel Flow Weekly Update.
Brown Exhibit 2244—May 10, 2004 Memo from Michaela Lewis regarding Channel Flow Weekly Update.
Brown Exhibit 2245—Michaela Lewis PC Screen Shots of 2003 and 2004 Weekly folders.
Brown Exhibit 2246—Michaela Lewis PC Screen Shots of 2003 Power Core and 2004 Channel Flow folders.
Brown Exhibit 2247—Michaela Lewis Channel Flow folder file named "Channel Flow Design Review 070704.ppt"; Windows date modified Jul. 15, 2004.
Brown Exhibit 2248—Jan. 4, 2008, Channel Flow Concept Ideas Book.
Brown Exhibit 2249—Gene Brown CD Screen Shot, Powerpoint presentation modified May 12, 2003.

(56) References Cited

OTHER PUBLICATIONS

Brown Exhibit 2250—Vacation Records for Gene Brown, Steven Merritt, Stan Johnston and Allen Liibbe, filed in Interference on Aug. 16, 2012.
Brown Exhibit 2251—Gasket Designs—030512.ppt, from Gene Brown CD (Option 9 conception), dated May 12, 2003.
Brown Exhibit 2252—Oslakovic 030804.ppt, from Gene Brown CD, dated Aug. 4, 2003.
Brown Exhibit 2253—Design Requirements 040302.ppt, from Gene Brown CD, filed in Interference on Aug. 16, 2012.
Brown Exhibit 2254—End Cap-Possibilities 040224.ppt, from Gene Brown CD (Concept M at 12), filed in Interference on Aug. 16, 2012.
Brown Exhibit 2255—End Cap-Possibilities 040225.ppt, from Gene Brown CD (Concept P at 15), filed in Interference on Aug. 16, 2012.
Brown Exhibit 2256—End Cap-Possibilities 040303.ppt, from Gene Brown CD (Concepts S and T at 19 and 20), filed in Interference on Aug. 16, 2012.
Brown Exhibit 2257—End Cap-Possibilities 040304.ppt, from Gene Brown CD (Concept U at 21), filed in Interference on Aug. 16, 2012.
Brown Exhibit 2258—Honeycomb-CNH-030428.ppt slide 18 Option 9 Al Liibbe File (Slide 18 is option 9), filed in Interference on Aug. 16, 2012.
Brown Exhibit 2259—Screen Shot Al Liibbe Folder View (Honeycomb-CNH-030428.ppt file, Modified May 1, 2003).
Brown Exhibit 2260—Brown Declaration of Tom Hamilton, filed in Interference on Aug. 16, 2012.
Brown Exhibit 2261—May 30, 2003 Memo to Norm Johnson.
Brown Exhibit 2262—Italy—ClarCor UK Travel Request, Al Liibbe Travel Request Form Modified May 28, 2003.
Brown Exhibit 2263—Screen Shot Al Liibbe Folder View, Italy—ClarCor UK Travel Request, Modified May 28, 2003.
Brown Exhibit 2264—Brown Declaration of Michelle Pearson, filed in Interference on Aug. 16, 2012.
Brown Exhibit 2265—BayOne Sep. 11, 2003 meeting, Al Liibbe memo, diligence.
Brown Exhibit 2266—Dan Arens Test Data Channel Flow Projects 2003-2004.
Brown Exhibit 2267—Brown Declaration of Dan Arens, filed in Interference on Aug. 16, 2012.
Brown Exhibit 2268—Brown Declaration of Michaela Lewis, filed in Interference on Aug. 16, 2012.
Brown Exhibit 2269—Chanel Flow Material Specs approved Oct. 19, 2004 by Josh Quackenbush.
Brown Exhibit 2270—Chanel Flow Material Specs approved Oct. 19, 2004 by Kyle Swanson.
Brown Exhibit 2271—R&D Design Engineering Quote to Josh Quackenbush Dec. 4, 2003.
Brown Exhibit 2272—Distefano UPS Consignment to Josh Quackenbush Dec. 22, 2003.
Brown Exhibit 2273—Distefano Quote to Josh Quackenbush Dec. 29, 2003.
Brown Exhibit 2274—Baldwin Filters POs from Josh Quackenbush Dec. 16, 2003.
Brown Exhibit 2275—Midland Molding Order from Josh Quackenbush May 11, 2004.
Brown Exhibit 2276—Distefano Order from Josh Quackenbush May 12, 2004.
Brown Exhibit 2277—DMB Supply Order from Josh Quackenbush Jan. 22, 2004.
Brown Exhibit 2278—Urethane Mold Drawing and Quote from Distefano Tool & Mfg. Company, dated Mar. 18, 2004.
Brown Exhibit 2279—Forecast Order Frame Outlet B from Josh Quackenbush Jul. 6, 2004.
Brown Exhibit 2280—Forecast Order Outlet B from Josh Quackenbush Jun. 30, 2004.
Brown Exhibit 2281—Purchase Requisition Molds From Forecast to Josh Quackenbush May 24, 2004.
Brown Exhibit 2282—Midland Molding Quote Various to Josh Quackenbush Jul. 6, 2004.
Brown Exhibit 2283—Distefano Mold Order from Josh Quackenbush Jul. 6, 2004.
Brown Exhibit 2284—Distefano Mold Order from Josh Quackenbush Aug. 19, 2004.
Brown Exhibit 2285—DMB Fasteners Order from Josh Quackenbush Aug. 5, 2004.
Brown Exhibit 2286—Endura Email Exchange Regarding Anodizing Aug. 19, 2004.
Brown Exhibit 2287—Purchase Requisition Mold Coating from Endura to Josh Quackenbush Aug. 27, 2004.
Brown Exhibit 2288—Midland Order CA4700 Mold Parts from Josh Quackenbush Sep. 2, 2004.
Brown Exhibit 2289—GT Midwest Urethane Quote to Steve Merritt Sep. 20, 2004.
Brown Exhibit 2290—Redfield Order Label Tooling Channel Flow from Josh Quackenbush Oct. 21, 2004.
Brown Exhibit 2291—McMaster Order for Caulking Gun from Josh Quackenbush dated Sep. 27, 2004.
Brown Exhibit 2292—Midland Quote for Surface Texture from Josh Quackenbush dated Oct. 14, 2004.
Brown Exhibit 2293—Midland Order for Surface Texture from Josh Quackenbush dated Oct. 19, 2004.
Brown Exhibit 2294—Engineering Drawing OutletEndCap CantedIn BX02657 JQ Apr. 29, 2004.
Brown Exhibit 2295—Engineering Drawing FrameRings BX02524 JQ Mar. 15, 2004.
Brown Exhibit 2296—Engineering Drawing Core BX02622 JQ Mar. 29, 2004.
Brown Exhibit 2297—Capital Project Request dated Apr. 7, 2004.
Brown Exhibit 2298—Ahlstrom Media Order from Kyle Swanson dated Jan. 22, 2004.
Brown Exhibit 2299—Engineering Drawing CA4700FrameInlet CA4700 JQ Aug. 16, 2004.
Brown Exhibit 2300—Engineering Drawing CA4700BaldwinFilters CA4700 JQ Jul. 22, 2004.
Brown Exhibit 2301—Engineering Drawing CA4700FrameAssyOutlet 751490 JQ Jul. 22, 2004.
Brown Exhibit 2302—Engineering Drawing Wout SingleFace 149051 JQ Jul. 2004.
Brown Exhibit 2303—Engineering Drawing CA4700FrameOutlet 751508 JQ Aug. 16, 2004.
Brown Exhibit 2304—Memo Michaela Lewis regarding Powercore Weekly Update dated Sep. 2, 2003.
Brown Exhibit 2305—Engineering Drawing CA4700Mold 751511 JQ Aug. 16, 2004.
Brown Exhibit 2306—Engineering Drawing CA4700Core 147677 JQ Aug. 16, 2004.
Brown Exhibit 2307—Engineering Drawing CA4700Rhms 147690 JQ Dec. 12, 2003.
Brown Exhibit 2308—Engineering Drawing CA4700FrameAsyInlet 528654 JQ Jun. 2, 2004.
Brown Exhibit 2309—Engineering Drawing CA4700 FrameInlet 147652 JQ Aug. 16, 2004.
Brown Exhibit 2310—Brown Declaration of Darla Wright-Covert, filed in Interference on Aug. 16, 2012.
Brown Exhibit 2311—Weekly Items—Engineering dated Oct. 15, 2004.
Brown Exhibit 2312—Brown Declaration of Kyle Swanson, filed in Interference on Aug. 16, 2012.
Brown Exhibit 2313—080112 Matrix Explanation.pdf, filed in Interference on Aug. 16, 2012.
Brown Exhibit 2314—080112 NPR 003815.pdf, filed in Interference on Aug. 16, 2012.
Brown Exhibit 2315—Brown Declaration of Dan Schulte, filed in Interference on Aug. 16, 2012.
Brown Exhibit 2316—"Channel Flow Round Freightliner Radial Seal Trial Run, World Wide Design" report dated Aug. 7, 2004.
Brown Exhibit 2317—Baldwin Filters Catalog Supplement (2006) showing CA4700.
Brown Exhibit 2318—"Freightliner Channel Flow Design Worldwide Design" dated Jun. 28, 2004.
Brown Exhibit 2319—Brown Declaration of Gene Brown, filed in Interference on Aug. 16, 2012.

(56) References Cited

OTHER PUBLICATIONS

Brown Exhibit 2320—Patent application correspondence file, dated Nov. 9, 2004.
Brown Exhibit 2321—Reinhardt CD Image "Channel Flow Concept Ideas" provided by GWB, filed in Interference on Aug. 16, 2012.
Brown Exhibit 2322—Brown Declaration of Andrew Heinisch, filed in Interference on Aug. 16, 2012.
Brown Exhibit 2323—File "JDFEAJoeBorgia070804.ppt," filed in Interference on Aug. 16, 2012.
Brown Exhibit 2324—File "JDFEAJoeBorgia070804.ppt" Jul. 8, 2004 Date Modified property.
Brown Exhibit 2325—File "UpdateforMeeting091604.do,c" filed in Interference on Aug. 16, 2012.
Brown Exhibit 2326—File "UpdateforMeeting091604.doc" Sep. 24, 2004 Date Modified property, , filed in Interference on Aug. 16, 2012.
Brown Exhibit 2327—Brown Declaration of Charles Oslakovic, filed in Interference on Aug. 16, 2012.
Brown Exhibit 2328—Brown Declaration of Al Libbe, filed in Interference on Aug. 16, 2012.
Brown Exhibit 2329—Brown Declaration of Steve Merritt, filed in Interference on Aug. 16, 2012.
Brown Exhibit 2330—Date Modified "Channel Flow Design Review 070704.ppt" (Ex 2247), filed in Interference on Aug. 16, 2012.
Brown Exhibit 2331—Concept P Ex 2255, p. 15, marked, filed in Interference on Aug. 16, 2012.
Brown Exhibit 2332—Concept S Ex 2256, p. 19, marked, filed in Interference on Aug. 16, 2012.
Brown Exhibit 2333—Concept T Ex 2256, p. 20, marked, filed in Interference on Aug. 16, 2012.
Brown Exhibit 2334—Concept U Ex 2257, p. 21, marked, filed in Interference on Aug. 16, 2012.
Brown Exhibit 2335—Concept M Ex 2254, p. 12, marked, filed in Interference on Aug. 16, 2012.
Brown Exhibit 2336—Leydig Billing Record, concepts P and U, filed in Interference on Aug. 16, 2012.
Brown Exhibit 2345—PAIR Application Data Tab for Schrage U.S. Appl. No. 12/321,127, downloaded Sep. 5, 2012.
Brown Exhibit 2346—PAIR Continuity Data Tab for Schrage U.S. Appl. No. 12/321,127, downloaded Sep. 5, 2012.
Brown Exhibit 2347—Counts 2, 3, 4, and corresponding claims from paper 326, filed in Interference on Aug. 16, 2012.
Brown Exhibit 2349—Brown Declaration of Bruce Margulies, filed in Interference on Aug. 16, 2012.
Brown Exhibit 2352—Dictionary Definition of "generally", downloaded Sep. 28, 2012.
Brown Exhibit 2353—Office Action dated Apr. 27, 2007 in Brown U.S. Appl. No. 10/979,876.
Brown Exhibit 2366—Brown Eleventh Declaration of Steve Merritt, filed in Interference on Dec. 26, 2012.
Brown Exhibit 2367—Donaldson web page_global, downloaded Oct. 21, 2012.
Brown Exhibit 2368—Reliable Industries home page, http://www.reliableindustries.com/, downloaded Oct. 22, 2012.
Brown Exhibit 2369—PowerCore filter picture, filed in Interference on Dec. 26, 2012.
Brown Exhibit 2370—PowerCore filter picture, detail 1, filed in Interference on Dec. 26, 2012.
Brown Exhibit 2371—PowerCore filter picture, detail 2, filed in Interference on Dec. 26, 2012.
Brown Exhibit 2377—Brown Declaration of Bruce Margulies Jan. 1, 2013.
Brown Exhibit 2378—Fluted filter with no grate, model A2947C, downloaded Jan. 4, 2013.
Brown Exhibit 2379—Fluted filter with no grate, model A3087, downloaded Jan. 4, 2013.
Brown Exhibit 2380—Fluted filter with no grate, model A3077C, downloaded Jan. 4, 2013.
Brown Exhibit 2381—Fluted filter with no grate, model 49501, downloaded Jan. 4, 2013.
Brown Exhibit 2382—Fluted filter with no grate, model 49108, downloaded Jan. 4, 2013.
Brown Exhibit 2383—Fluted filter with no grate, model CA5352, downloaded Jan. 4, 2013.
Brown Exhibit 2384—Brown Declaration of Bruce Margulies Jan. 4, 2012, filed in Interference on Dec. 26, 2012.
Brown Exhibit 2385—U.S. Pat. No. 6,743,317 B2 to Wydeven, issued Jun. 1, 2004.
Brown Exhibit 2386—U.S. Pat. No. 4,410,427 to Wydeven, issued Oct. 18, 1983.
Brown Exhibit 2387—U.S. Pat. No. 7,320,717 to Koeberle, issued Jan. 22, 2008.
Brown Exhibit 2388—U.S. Pat. No. 2,599,604 to Bauer et al., issued Jun. 10, 1952.
Brown Exhibit 2389—U.S. Pat. No. 7,799,219 B2 to Reamsnyder et al., issued Sep. 21, 2010.
Brown Exhibit 2390—U.S. Pat. No. 7,794,556 B2 to Treier et al., issued Sep. 14, 2010.
Brown Exhibit 2397—*ABB, Inc. v. Roy-G-Biv Corp.*, IPR2013-00063, Notice 14, filed in Interference on Dec. 26, 2013.
Brown Motion 10 filed Apr. 23, 2012.
Brown Motion 10 Supplement filed Apr. 24, 2012.
Brown Motion 11 filed Aug. 16, 2012.
Brown Motion 12 to Exclude Evidence filed Jan. 16, 2013.
Brown Motion 2—Lack of Written Description, 87 pages, filed Jul. 7, 2011.
Brown Motion 3—Indefiniteness, 112, Second, 51 pages, filed Aug. 31, 2011.
Brown Motion 4 Based Upon Prior Art, 78 pages, filed Aug. 31, 2011.
Brown Motion 5—Denial of Benefit, 13 pages, filed Aug. 31, 2011.
Brown Motion 6—Dedesignate Claims, 31 pages, filed Aug. 31, 2011.
Brown Motion 8, 18 pages, filed Dec. 13, 2011.
Brown Motion 9 filed Apr. 18, 2012.
Brown Notice of Service of Supplement to Evidence, 3 pages, filed Sep. 19, 2012.
Brown Notice of Service of Supplemental Evidence Jan. 15, 2013, 5 pages, filed Jan. 15, 2013.
Brown Opposition 1, 55 pages, Nov. 15, 2011.
Brown Opposition 11 (Count 2), 57 pages, filed Dec. 26, 2012.
Brown Opposition 12 (Counts 3 and 4), 57 pages, filed Dec. 26, 2012.
Brown Opposition 13, 11 pages, filed Jan. 21, 2013.
Brown Opposition 2, 21 pages, filed Dec. 15, 2011.
Brown Priority Record Filing and Service filed Jan. 25, 2013.
Brown Reply 11, 19 pages, filed Jan. 15, 2013.
Brown Reply 2, 83 pages, filed Nov. 29, 2011.
Brown Reply 3, 45 pages, filed Nov. 29, 2011.
Brown Reply 4, 52 pages, filed Nov. 29, 2011.
Brown Reply 5, 22 pages, filed Nov. 29, 2011.
Brown Reply 6, 17 pages, filed Nov. 29, 2011.
Brown Reply 8, 19 pages, filed Dec. 19, 2011.
Brown Request for Oral Hearing filed Jan. 16, 2013.
Brown Request for Rehearing filed Jul. 27, 2012.
Brown Request for Rehearing on Paper 297 filed Mar. 30, 2012.
Brown Request for Rehearing on Paper 301 filed Apr. 10, 2012.
Brown Request for Rehearing on Paper 376 filed Jan. 4, 2013.
Brown Request for Rehearing on Paper 771 filed Jul. 23, 2013.
Brown Response to the Schrage Request for Rehearing, filed Aug. 20, 2012.
Brown Supplement to Request for Rehearing, 6 pages, filed Jun. 7, 2012.
*Brown v. Schrage* Patent Interference No. 105,799, Brown Motion 2—Lack of Written Description (87 pages) (Jul. 7, 2011).
Civil Cover Sheet; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.
Communication filed Apr. 13, 2012.

(56) References Cited

OTHER PUBLICATIONS

Complaint filed Oct. 1, 2007, Civil Action No. 07-cv-04136-MJD-SRN, Federal Court for the District of Minnesota, Exhibits A-F.
Decision Hearing from European Opposition of EP 1 159 052 B1 (Dec. 2, 2009).
Decision on Motions—Bd.R. 125(a) filed Jul. 11, 2013.
Decision on Motions filed Mar. 23, 2012.
Decision on Request for Rehearing—Bd.R. 125(c), filed Aug. 31, 2012.
Decision Revoking the European patent from European Opposition of EP 1 159 052 B1 (Apr. 13, 2006).
Declaration of Steven S. Gieseke with Exhibits A-C dated Jan. 31, 2000.
European Search Report for Application No. 14196909.7 dated Mar. 30, 2015.
File History of U.S. Pat. No. 6,190,432 B1 issued Feb. 20, 2001.
File History of U.S. Pat. No. 6,350,291 B1 issued Feb. 26, 2002.
File History of U.S. Pat. No, 6,610,117 B2 issued Aug. 26, 2003.
File History of U.S. Pat. No, 6,783,565 B2 issued Aug. 31, 2004.
File History of U.S. Pat. No. 7,303,604 issued Dec. 4, 2007.
File History of U.S. Patent Publication No. 2005/0060972 A1 published Mar. 24, 2005.
First Redeclaration Order filed Mar. 23, 2012.
International Search Report and Written Opinion for PCT/US2004/043012 dated Apr. 18, 2005.
Judgement—37 CFR § 41.127 dated Jul. 11, 2013.
Maintenance Decision from European Opposition of EP 1 159 052 B1 (Jul. 7, 2011).
Memorandum Opinion and Order dated Apr. 13, 2012.
Minutes from Oral Hearing from European Opposition of EP 1 159 052 B1 (Dec. 15, 2009).
Minutes of the Oral Proceedings from European Opposition of EP 1 159 052 B1 (Apr. 13, 2006).
Notice of Claims Involving Patents; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Notification of Transmittal of the International Preliminary Report on Patentability dated Feb. 3, 2006 for PCT/US2004/043012.
Opposer's (Baldwin's) Written Submission from European Opposition of EP 1 159 052 B1 (Nov. 11, 2009).
Opposer's Arguments Prior to Oral Proceedings from European Opposition of EP 1 159 052 B1 (Jan. 20, 2006).
Opposer's Reasons for the Opposition from European Opposition of EP 1 159 052 B1 (Aug. 24, 2004).
Opposer's Response to the Grounds of Appeal from European Opposition of EP 1 159 052 B1 (Feb. 16, 2007).
Order Times for Priority Phase and Second Redeclaration filed May 7, 2012.
Proprietor's Answer from European Opposition of EP 1 159 052 B1 (Mar. 31, 2005).
Proprietor's Arguments Prior to Oral Proceedings from European Opposition of EP 1 159 052 B1 (Jan. 20, 2006).
Proprietor's Donaldson's Written Submission from European Opposition of EP 1 159 052 B1 (Oct. 30, 2009).
Proprietor's Grounds of Appeal from European Opposition of EP 1 159 052 B1 (Aug. 17, 2006).
Record of Oral Hearing for Interference No. 105,799 filed Jul. 12, 2013.
Rule 7.1 Disclosure Statement of Plaintiff Donaldson Company, Inc.; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.
Statement Regarding Product dated Dec. 23, 2010 (10 pages).
Statement Regarding Product dated Dec. 23, 2010 (7 pages).
Voluntary Order of Dismissal, *Donaldson Company, Inc.* v. *Mann+Hummel USA, Inc. and Mann+Hummel GmbH*, United States District Court District of Minnesota, Case 0:07-cv-04136 MJD-SRN filed Apr. 29, 2008.
Declaration of Interference, *Baldwin Filters, Inc.* v. *Donaldson Company, Inc.*, Interference No. 106,021 (RES), 6 pages (Apr. 30, 2015).
Schrage List of Proposed Motions, Interference No. 105,799, 6 pages, filed Jun. 9, 2011.
Schrage Opposition 1, Interference No. 105,799, 11 pages, Jul. 15, 2011.
Schrage Substantive Motion 1, 28 pages, filed Aug. 31, 2011.
Schrage Opposition 2, 91 pages, filed Nov. 15, 2011.
Schrage Opposition 3, 61 pages, filed Nov. 15, 2011.
Schrage Opposition 4, 74 pages, filed Nov. 15, 2011.
Schrage Opposition 5, 21 pages, filed Nov. 15, 2011.
Schrage Opposition 6, 21 pages, filed Nov. 15, 2011.
Schrage Reply 1, 68 pages, filed Nov. 29, 2011.
Schrage Request for Oral Argument, Interference No. 105,799, 3 pages, filed Dec. 13, 2011.
Schrage Motion 2 (to Exclude Brown Exhibits 2098, 2117-2123, and 2125), 20 pages, filed Dec. 13, 2011.
Schrage Opposition 8, 20 pages, filed Dec. 16, 2011.
Schrage Reply 2, 25 pages, filed Dec. 20, 2011.
Schrage Response to Interlocutory Order (Paper 283), Interference No. 105,799, 3 pages, filed Jan. 31, 2012.
Schrage Response to Invitation for Input (Paper 291), Interference No. 105,799, 13 pages, filed Feb. 21, 2012.
Schrage Reply to Brown's Input in Response to Paper 291, Interference No. 105,799, 7 pages, filed Feb. 24, 2012.
Schrage Request for Rehearing, Interference No. 105,799, 9 pages, filed Apr. 6, 2012.
Schrage Opposition 10, Interference No. 105,799, 20 pages, filed Apr. 30, 2012.
Schrage Motion 11, Interference No. 105,799, 35 pages, filed Jul. 9, 2012.
Schrage Motion 12, Interference No. 105,799, 51 pages, filed Jul. 9, 2012.
Schrage Reply to Brown's Request for Rehearing on Paper 297, Interference No. 105,799, 8 pages, filed Aug. 21, 2012.
Schrage Reply to Brown's Request for Rehearing on Paper 301, Interference No. 105,799, 4 pages, filed Aug. 21, 2012.
Schrage Reply to Brown's Supplement to Request for Rehearing, Interference No. 105,799, 5 pages, filed Aug. 21, 2012.
Schrage Opposition 11, Interference No. 105,799, 43 pages, filed Dec. 27, 2012.
Schrage Motion 13 (to exclude exhibits 2271-2294, 2296-2297 and 2318), Interference No. 105.799, 26 pages, filed Jan. 16, 2013.
Schrage Request for Oral Argument, Interference No. 105.799, 3 pages, filed Jan. 16, 2013.
Schrage Reply 11, Interference No. 105.799, 26 pages, filed Jan. 16, 2013.
Schrage Reply 12, Interference No. 105.799, 26 pages, filed Jan. 16, 2013.
Schrage List of Issues to be Considered, Interference No. 105,799, 4 pages, filed Jan. 16, 2013.
Schrage Opposition 12, Interference No. 105,799, 24 pages, filed Jan. 22, 2013.
Schrage Corrected List of Issues to be Considered, Interference No. 105,799, 5 pages, filed Jan. 25, 2013.
Schrage Request for Rehearing, Interference No. 105,799, 5 pages, filed Aug. 12, 2013.
Complaint for Review of Patent Interference Decision, Civil Action No. 13-cv-3095, 13 pages, filed Nov. 12, 2013.
Order, Civil Action No. 13-cv-03095, 1 page, filed Jul. 22, 2014.
Schrage Exhibit List as of Jan. 25, 2013, 11 pages, filed Jan. 25, 2013.
Schrage Exhibit 1001—Schrage Objections to Brown's Evidence Served Jul. 27, 2011; filed Aug. 3, 2011.
Schrage Exhibit 1002—U.S. Pat. No. 7,318,851 (filed Jan. 19, 2012).
Schrage Exhibit 1003—U.S. Pat. No. 6,350,291 (filed Jan. 19, 2012).
Schrage Exhibit 1004—U.S. Pat. No. 6,517,598 (filed Jan. 19, 2012).
Schrage Exhibit 1005—U.S. Patent Application Publication No. US2008/0016832 (filed Jan. 19, 2012).

(56) References Cited

OTHER PUBLICATIONS

Schrage Exhibit 1006—U.S. Pat. No. 7,396,375 (filed Jan. 19, 2012).
Schrage Exhibit 1007—Declaration of David Y.H. Pui (filed Jan. 19, 2012).
Schrage Exhibit 1008—Exhibit Curricula Vitae of David Y.H. Pui (filed Jan. 19, 2012).
Schrage Exhibit 1009—Claim Chart (filed Jan. 19, 2012).
Schrage Exhibit 1010—Declaration of Tom Lage (filed Jan. 19, 2012).
Schrage Exhibit 1011—Drawing of Tom Lage (filed Jan. 19, 2012).
Schrage Exhibit 1012—U.S. Patent Application Publication No. US2009/0241494 (filed Jan. 19, 2012).
Schrage Exhibit 1013—U.S. Pat. No. 7,569,090 (filed Jan. 19, 2012).
Schrage Exhibit 1014—Merriam-Webster Dictionary Definition of the Term "Hub"; as printed on Aug. 31, 2011.
Schrage Exhibit 1015—U.S. Pat. No. 7,318,851 marked by Merritt during deposition dated Oct. 27, 2011.
Schrage Exhibit 1016—Second Declaration of David Y.H. Pui (filed Jan. 19, 2012).
Schrage Exhibit 1017—Second Declaration of Tom Lage (filed Jan. 19, 2012).
Schrage Exhibit 1018—Page of U.S. Patent Publication No. US 2009/0241494 that includes Figure 6 (as referenced by exhibit 1017). (filed Jan. 19, 2012).
Schrage Exhibit 1019—Page of U.S. Patent Publication No. US 2009/0241494 that includes Figure 6, with Lage drawing (as referenced by exhibit 1017) (filed Jan. 19, 2012).
Schrage Exhibit 1020—Deposition Transcript of Steven Merritt dated Oct. 27, 2011.
Schrage Exhibit 1021—Exhibit 2117, "Steve Merritt measurements on Fig. 7 of U.S. Pat. No. 6,350,291"—with additional drawings and notations by Steven Merritt during his deposition on Nov. 22, 2011.
Schrage Exhibit 1022—Exhibit 1011, "Drawing by Tom Lage"—with additional drawings and notations by Steven Merritt during his deposition on Nov. 22, 2011.
Schrage Exhibit 1023—Exhibit 2119, "Screen Shot of Solid Edge generated lines on zoomed portion of Fig. 6 of U.S. Pat. No. 6,350,291"—with additional drawings and notations by Steven Merritt during his deposition on Nov. 22, 2011.
Schrage Exhibit 1024—Exhibit 2007, "Browns involved U.S. Pat. No. 7,318,851"—with additional drawings and notations by Steven Merritt during his deposition on Nov. 22, 2011.
Schrage Exhibit 1025—Exhibit 2024, "Timely Engineering Associates Memorandum dated Aug. 10, 2004"—with additional drawings and notations by Steven Merritt during his deposition on Nov. 22, 2011.
Schrage Exhibit 1026—Deposition transcript of Steven Merritt dated Nov. 22, 2011.
Schrage Exhibit 1027—Japanese patent application JP 9-234157 published Sep. 9, 1997.
Schrage Exhibit 1028—English translation of the abstract of Japanese patent application JP 9-234157 published Sep. 9, 1997 (printed from qpat.com on Nov. 17, 2011).
Schrage Exhibit 1029—Deposition transcript of Steven Merritt dated Dec. 9, 2011.
Schrage Exhibit 1030—File History of U.S. Appl. No. 60/556,133, filed Mar. 24, 2004.
Schrage Exhibit 1031—Paper 136: Schrage Objections to Evidence Dated Nov. 15, 2011 (filed Nov. 22, 2011).
Schrage Exhibit 1032—Paper 148: Schrage Objections to Evidence Dated Nov. 29, 2011 (filed Dec. 6, 2011).
Schrage Exhibit 1033—"Complaint and Demand for Jury Trial"—Paper 19; *Donaldson Co., Inc.* v. *Baldwin Filters, Inc.*, 09-CV-01049-PJS-AJB, D. Minn. Filed May 5, 2009.
Schrage Exhibit 1034—"Channel Flow® Air Filters", printed Apr. 26, 2012 from www.baldwinfilter.com/productsairchannelflow.html.
Schrage Exhibit 1035—"Baldwin's Channel Flow Air Filters . . . A Stronger Design for Outstanding Protection," Baldwin Filter promotional material.
Schrage Exhibit 1036—"Channel Flow Air Filters," Baldwin Filter promotional material (filed Apr. 30, 2012).
Schrage Exhibit 1037—"Order of Dismissal"—Paper 175; *Donaldson Co., Inc.* v. *Baldwin Filters, Inc.*, 09-CV-01049-PJS-AJB, D. Minn. Filed Feb. 2, 2012.
Schrage Exhibit 1038—U.S. Pat. No. 7,931,724 (filed Apr. 30, 2012).
Schrage Exhibit 1039—First Declaration of Kevin Schrage (filed Jan. 25, 2013).
Schrage Exhibit 1040—First Declaration of Wayne Bishop (filed Jan. 25, 2013).
Schrage Exhibit 1041—First Declaration of Tom Miller (filed Jan. 25, 2013).
Schrage Exhibit 1042—E-mail from Wayne R. Bishop dated Jan. 17, 2003; re: PowerCore Production Line Meeting Agenda Jan. 24, 2003.
Schrage Exhibit 1043—E-mail from Wayne R. Bishop dated Dec. 3, 2002; re: PowerCore Production Line Development Meeting Agenda (filed Jan. 25, 2013).
Schrage Exhibit 1044—E-mail from Wayne R. Bishop dated Mar. 24, 2003; re: PowerCore Production Line Development Agenda. (with attached meeting minutes dated Mar. 27, 2003 and agenda dated Mar. 24, 2003).
Schrage Exhibit 1045—E-mail from Wayne R. Bishop dated Feb. 26, 2003; re: PowerCore Production line Development Meeting minutes Feb. 20, 2003 (with attachment).
Schrage Exhibit 1046—E-mail from Wayne R. Bishop dated Oct. 30, 2003; re:JDM urethane overmold process jan 2004.xls (with attachment).
Schrage Exhibit 1047—Engineering Drawing #1 of P604057 (filed Jan. 25, 2013).
Schrage Exhibit 1048—E-mail from Wayne R. Bishop dated Jun. 28, 2004; re: PowerCore Samples with Over-mold gasket 203×330×150mm long and 250mm long.
Schrage Exhibit 1049—E-mail from Wayne R. Bishop dated Feb. 19, 2003; re: PowerCore Agenda 022003 (with attachment).
Schrage Exhibit 1050—E-mail from Wayne R. Bishop dated Jan. 29, 2003; re: PowerCore Production Line Development Meeting Minutes (with attachment).
Schrage Exhibit 1051—E-mail from Don R. Mark dated Nov. 5, 2003; re: Overmolded designs.
Schrage Exhibit 1052—E-mail from Wayne R. Bishop dated Nov. 21, 2003; re: Over-molded gasket dust capacity comparison.xls (with attachment).
Schrage Exhibit 1053—E-mail from Wayne R. Bishop dated Sep. 8, 2003; re: overmold urethane 9-8-2003.xls (with attachment).
Schrage Exhibit 1054—Engineering Drawing #2 of P604057 (filed Jan. 25, 2013).
Schrage Exhibit 1055—E-mail from Wayne R. Bishop dated Dec. 13, 2002; re: PowerCore Production Line Development Meeting Minutes Dec. 4, 2003 & Dec. 11, 2003* (with typo for 2002) (with attachments).
Schrage Exhibit 1056—E-mail from Wayne R. Bishop dated Jan. 23, 2003; re: PowerCore Qualification Testing (with attachment).
Schrage Exhibit 1057—E-mail from Wayne R. Bishop dated Apr. 29, 2004; re: Urethane Overmold Design Guidelines (with attachment).
Schrage Exhibit 1058—Product sales for Counts 3 and 4 (filed Jan. 25, 2013).
Schrage Exhibit 1059—E-mail from Calvin J. Dvorak dated Jun. 27, 2003; re: PowerCore Meeting Minutes (2).
Schrage Exhibit 1060—E-mail from Steve S. Gieseke dated Feb. 3, 2003; re: PowerCore Direction (with attachment).
Schrage Exhibit 1061—E-mail from Vladimir Kladnitsky dated Aug. 11, 2003; re: Meeting #2 Minutes. Project 535, Confidential (with attachments).
Schrage Exhibit 1062—E-mail from Calvin J. Dvorak dated Jun. 27, 2003; re: PowerCore Meeting Minutes (2).

(56) References Cited

OTHER PUBLICATIONS

Schrage Exhibit 1063—E-mail from Ben K. Nelson dated Jul. 7, 2003; re: Undercut gasket with zinc stearate insertion force.xls (with attachment).
Schrage Exhibit 1064—Part Save History Reports (Part P604057 with drawings) (filed Jan. 25, 2013).
Schrage Exhibit 1065—Engineering Drawing P605533 (filed Jan. 25, 2013).
Schrage Exhibit 1066—Invoice dated Dec. 31, 2002 from Upper Iowa Tool & Die, Inc. to Donaldson Co.
Schrage Exhibit 1067—Part Save History Reports (Part P604050 with drawings) (filed Jan. 25, 2013).
Schrage Exhibit 1068—Part Save History Reports (Part P604062 with drawings) (filed Jan. 25, 2013).
Schrage Exhibit 1069—Part Save History Reports (Part P604059 with drawings) (filed Jan. 25, 2013).
Schrage Exhibit 1070—Part Save History Reports (Part P605519 with drawings) (filed Jan. 25, 2013).
Schrage Exhibit 1071—Part Save History Reports (Part P604052 with drawings) (filed Jan. 25, 2013).
Schrage Exhibit 1072—Part Save History Reports (Part P605518 with drawings) (filed Jan. 25, 2013).
Schrage Exhibit 1073—Part Save History Reports (Part P609728 with drawings) (filed Jan. 25, 2013).
Schrage Exhibit 1074—Donaldson Company, Inc.—Engine Systems and Parts New Product Releases (with drawings) (filed Jan. 25, 2013).
Schrage Exhibit 1075—Engineering Drawing P542693 (filed Jan. 25, 2013).
Schrage Exhibit 1076—Memorandum from Kevin Schrage to Stan Koehler dated Mar. 4, 2003; re: PowerCore Urethane Ring Seal.
Schrage Exhibit 1077—Engineering Drawing P545099 (filed Jan. 25, 2013).
Schrage Exhibit 1078—Engineering Drawing P545120 (filed Jan. 25, 2013).
Schrage Exhibit 1079—Sales of Volvo FL6 Filter (filed Jan. 25, 2013).
Schrage Exhibit 1080—Engineering Drawing P605520 (filed Jan. 25, 2013).
Schrage Exhibit 1081—E-mail from Wayne R. Bishop dated Apr. 11, 2003; re: PowerCore Production Line Development Meeting, Mar. 27, 2003 (with attachments).
Schrage Exhibit 1082—E-mail from Wayne R. Bishop dated Oct. 30, 2003; re: JDM Urethane overmold process jan 2004.xls (with attachment).
Schrage Exhibit 1083—Engineering Drawing P605892 (filed Jan. 25, 2013).
Schrage Exhibit 1084—Engineering Drawing P605520 (filed Jan. 25, 2013).
Schrage Exhibit 1085—Engineering Drawing P605528 (filed Jan. 25, 2013).
Schrage Exhibit 1086—Engineering Drawing P609728 (filed Jan. 25, 2013).
Schrage Exhibit 1087—Engineering Drawing P545120 (filed Jan. 25, 2013).
Schrage Exhibit 1088—Engineering Drawing P545099 (filed Jan. 25, 2013).
Schrage Exhibit 1089—Engineering Drawing P608716 (filed Jan. 25, 2013).
Schrage Exhibit 1090—Engineering Drawing #2 of P545120 (filed Jan. 25, 2013).
Schrage Exhibit 1091—Engineering DrawingP608716 (filed Jan. 25, 2013).
Schrage Exhibit 1092—Fax from Donaldson Co. dated Jan. 15, 2004, attn: Randy Hillson.
Schrage Exhibit 1093—Amt Requisition No. 12535 dated Jul. 14, 2004.
Schrage Exhibit 1094—Engineering Drawing P605529 (filed Jan. 25, 2013).
Schrage Exhibit 1095—Engineering Drawing P605897 (filed Jan. 25, 2013).
Schrage Exhibit 1096—Engineering Drawing P605898 (filed Jan. 25, 2013).
Schrage Exhibit 1097—Engineering Drawing P608334 (filed Jan. 25, 2013).
Schrage Exhibit 1098—Engineering Drawing J130585 (filed Jan. 25, 2013).
Schrage Exhibit 1099—Engineering Drawing P608775 (filed Jan. 25, 2013).
Schrage Exhibit 1100—First Declaration of Randall Hillson (filed Jan. 25, 2013).
Schrage Exhibit 1101—First Declaration of David Nelson (filed Jan. 25, 2013).
Schrage Exhibit 1102—First Declaration of Richard Osendorf (filed Jan. 25, 2013).
Schrage Exhibit 1103—First Declaration of Ted Moe (filed Jan. 25, 2013).
Schrage Exhibit 1104—Count 2 Timeline (filed Jan. 25, 2013).
Schrage Exhibit 1105—Counts 3 and 4 Timeline (filed Jan. 25, 2013).
Schrage Exhibit 1106—Brown Exhibit 2089, marked during the deposition of Steven Merritt on Sep. 21, 2012.
Schrage Exhibit 1107—Brown Exhibit 2251, marked during the deposition of Gene Brown on Oct. 11, 2012.
Schrage Exhibit 1108—Brown Exhibit 2001, marked during the deposition of Kevin Schrage on Dec. 14, 2012.
Schrage Exhibit 1109—Deposition transcript of Al Liibbe, dated Sep. 20, 2012.
Schrage Exhibit 1110—Deposition transcript of Gene Brown, dated Oct. 11, 2012.
Schrage Exhibit 1111—Deposition transcript of Dan Arens, dated Sep. 19, 2012.
Schrage Exhibit 1112—Deposition transcript of Steven Merritt, dated Sep. 21, 2012.
Schrage Exhibit 1113—Declaration of Daniel E. Adamek (filed Jan. 25, 2013).
Schrage Exhibit 1114—U.S. Pat. No. 5,690,712 (filed Jan. 25, 2013).
Schrage Exhibit 1115—U.S. Pat. No. 6,652,614 (filed Jan. 25, 2013).
Schrage Exhibit 1116—U.S. Patent Publication No. 2006/0091064 (filed Jan. 25, 2013).
Schrage Exhibit 1117—European Patent No. 1 008 375 A1 (filed Jan. 25, 2013).
Schrage Exhibit 1118—Brown Exhibit 2007, marked during the deposition of Steven Merritt on Jan. 8, 2013.
Schrage Exhibit 1119—Deposition transcript of Steven Merritt, dated Jan. 8, 2013.
Schrage Exhibit 1120—Deposition transcript of Tom Hamilton, dated Sep. 19, 2012.
Selvage Exhibit 1121—Deposition transcript of Michaela Lewis, dated Sep. 20, 2012.
Schrage Exhibit 1122—Deposition transcript of Darla Wright Covert, dated Sep. 20, 2012.
Schrage Exhibit 1123—Deposition transcript of Michelle Pearson, dated Sep. 19, 2012.
Schrage Exhibit 1124—Deposition transcript of Kyle Swanson, dated Oct. 16, 2012.
Schrage Exhibit 1125—Deposition transcript of Dan Schulte, dated Sep. 21, 2012.
Schrage Exhibit 1126—Brown Office Action Reply dated Jul. 25, 2007.
Schrage Exhibit 1127—Email exchange dated Jul. 9, 2012 and Jul. 13, 2012 regarding service of Exhibit 1101.
Complaint, *Donaldson Company, Inc., v. Burnett Process, Inc.* Western District of New York, Case 1:18-cv-01125 filed Oct. 12, 2018.
Exhibit A U.S. Pat. No. 6,783,565, filed Oct. 12, 2018.
Exhibit B U.S. Pat. No. 8,241,384, filed Oct. 12, 2018.
Exhibit C U.S. Pat. No. 8,343,245, filed Oct. 12, 2018.
Exhibit D US Reg No. 604,188, filed Oct. 12, 2018.
Exhibit E US Reg No. 3,419,741, filed Oct. 12, 2018.

(56) References Cited

OTHER PUBLICATIONS

Exhibit F Jun. 22, 2018 Letter to Burnett, filed Oct. 12, 2018.
Exhibit G '565 Claim Chart, filed Oct. 12, 2018.

* cited by examiner

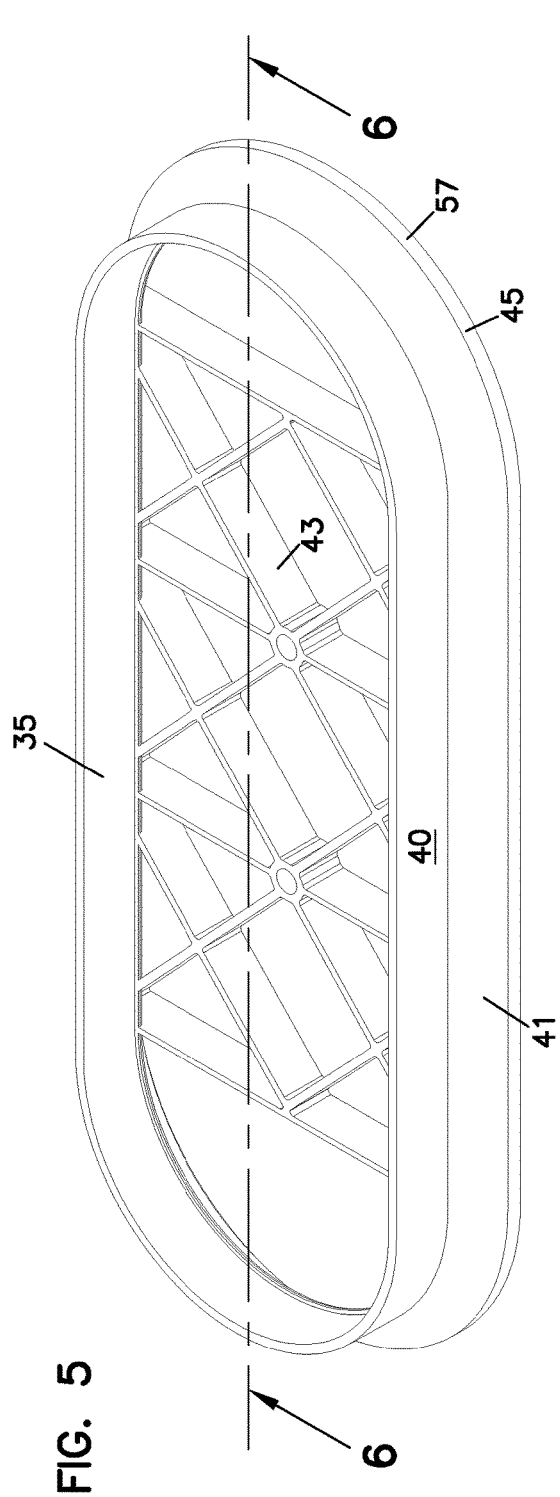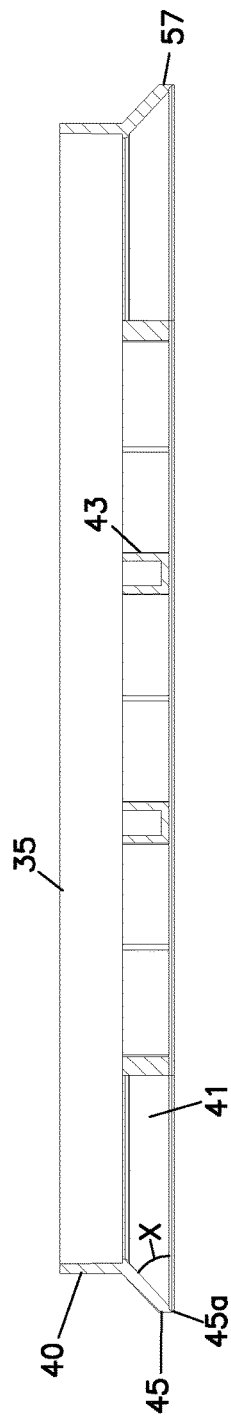
FIG. 5
FIG. 6

SEAL ARRANGEMENT FOR FILTER ELEMENT; FILTER ELEMENT ASSEMBLY; AND, METHODS

CROSS-REFERENCE TO RELATED APPLICATION

The present application is a continuation of U.S. application Ser. No. 14/230,561, filed Mar. 31, 2014. U.S. application Ser. No. 14/320,561 is a continuation of U.S. application Ser. No. 13/584,224, filed Aug. 13, 2012, and issued as U.S. Pat. No. 8,685,128 on Apr. 1, 2014. U.S. application Ser. No. 13/584,224 is a continuation of U.S. application Ser. No. 13/098,983, filed May 2, 2011, and issued as U.S. Pat. No. 8,241,384 on Aug. 14, 2012. U.S. application Ser. No. 13/098,983 is a continuation of U.S. application Ser. No. 12/215,725, filed Jun. 30, 2008, and issued as U.S. Pat. No. 7,935,166 on May 3, 2011. U.S. application Ser. No. 12/215,725 is a continuation of U.S. application Ser. No. 11/019,883, filed Dec. 21, 2004, and issued as U.S. Pat. No. 7,396,376 on Jul. 8, 2008. U.S. application Ser. No. 11/019,883 includes, with some edits and additional information, the disclosure of U.S. provisional application 60/532,783, filed Dec. 22, 2003. A claim of priority to U.S. application Ser. No. 13/584,224, U.S. application Ser. No. 13/098,983, U.S. application Ser. No. 12/215,725, U.S. application Ser. No. 11/019,883, and U.S. provisional application 60/532,783 is made to the extent appropriate. The complete disclosures of U.S. application Ser. No. 14/230,561, U.S. application Ser. No. 13/584,224, U.S. application Ser. No. 13/098,983, U.S. application Ser. No. 12/215,725, U.S. application Ser. No. 11/019,883, and US provisional U.S. 60/532,783 are incorporated herein by reference.

FIELD OF THE INVENTION

The present invention relates to air cleaners with removable and replaceable, i.e., serviceable, filter element or cartridge components. Although other applications are possible, the invention described is particularly useful in air cleaners for use in filtering intake air for engines (used for example in: vehicles, construction, agricultural and mining equipment; and, generator systems). The invention specifically concerns seal arrangements provided on serviceable filter elements or cartridges, for such air cleaners. The invention also concerns methods of assembly and use.

BACKGROUND

Air streams carry contaminant material therein. In many instances, it is desired to filter some or all of the contaminant material from the air stream. For example, air flow streams to engines for motorized vehicles or for power generation equipment, construction equipment or other equipment, gas streams to gas turbine systems and air streams to various combustion furnaces, carry particulate contaminant therein. It is preferred for such systems that the selected contaminant material be removed from (or have its level reduced in) the air or gas. A variety of air filter arrangements have been developed for contaminant reduction. In general, however, continued improvements are sought.

SUMMARY

According to the present disclosure a filter element or cartridge is provided, for use in air filtering. In general the filter element or cartridge comprises a media pack including opposite inlet and outlet ends. The media pack defines: a set of inlet flutes open at the inlet end of the media pack to passage of air to be filtered therein, the inlet flutes being closed preferably at a location within a distance of 10% of the total length of the inlet flutes from the outlet end of the media pack; and, a set of outlet flutes closed to passage of air to be filtered therein preferably at a distance within 10% of the total length of the inlet flutes from the inlet end of the media pack and open the passage of filtered air therefrom at the outlet end of the media pack. The element or cartridge further includes: a preform positioned adjacent a first one of the inlet and outlet ends of the media pack; and, an overmold formed of seal material having a first portion sealing at a joint or interface between the preform and a first end of the media pack at which the preform is positioned; and, a second portion oriented to form an air cleaner seal, between the filter element (or cartridge) and an air cleaner, when the filter element is installed for use. The first and second portions of the overmold are integral with one another, in a preferred, convenient, arrangement.

In certain preferred applications, the media pack is a coiled z-filter media arrangement; and, the overmold comprises foamed polyurethane. The media pack can have a variety of shapes and configurations. Two examples depicted are: an oval shape, for example having a racetrack perimeter or cross-sectional shape; and, a circular perimeter or cross-sectional shape. A variety of alternate shapes, are possible.

The combination of the preform and the overmold, form a preferred seal arrangement for a filter element. Methods of preparation and use are also provided. Also, arrangements for use are generally described.

BRIEF DESCRIPTION OF THE DRAWINGS

FIG. 5 is an enlarged, perspective view of a component used in the filter element of FIG. 1.

FIG. 6 is a cross-sectional view of the component of FIG. 5, taken along line 6-6 thereof.

FIG. 24 is a schematic perspective view, analogous to FIG. 19, of a media material useable in the filter elements of FIG. 1 and FIG. 7, shown with a flow direction opposite to.

DETAILED DESCRIPTION

I. General Information

Figure 1:
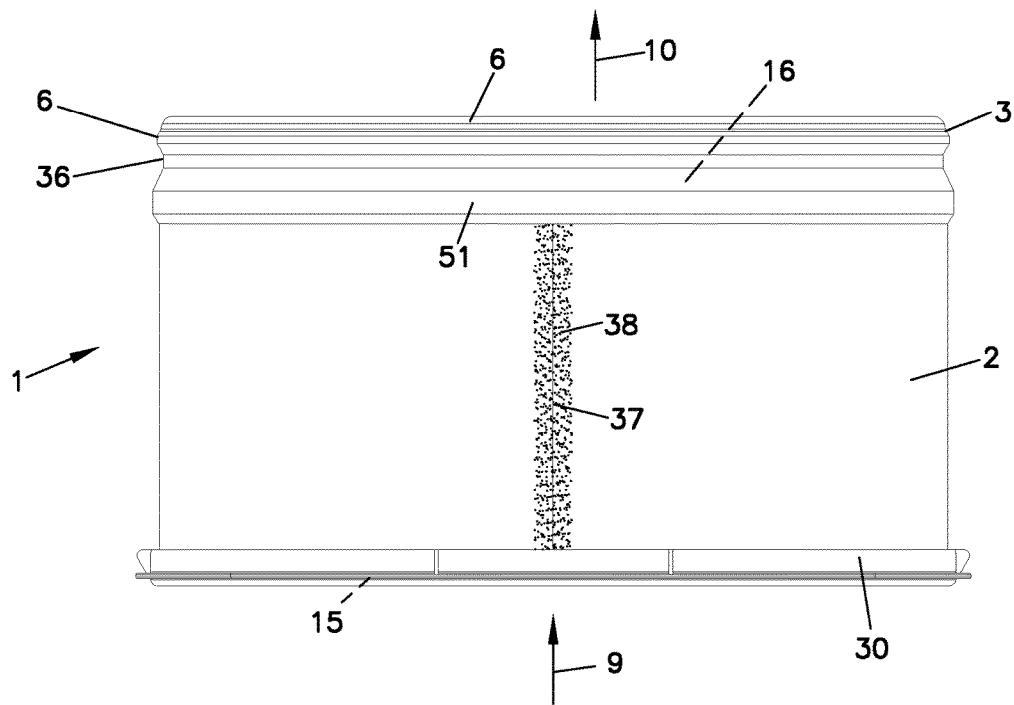
FIG. 1 is a side elevational view of a filter element according to a first embodiment of the present disclosure.

The present disclosure relates to filter elements (sometimes called cartridges) useable in air cleaner assemblies. In general, the preferred filter elements of concern herein are those in which: (a) the media of the elements comprises a first corrugated sheet of media attached to a second sheet of media (typically a flat media or nearly flat media) to form a single facer; and (b) in which the single facer combination is either wound or stacked, to create a media arrangement comprising a plurality of inlet flutes open at an inlet end face of the filter media and closed at or near (typically within 10% of the total length of the inlet flutes of) the outlet face of the media; and, a plurality of outlet flow flutes seal closed at or near the inlet face of the media (i.e., typically within 10% of the total length of the outlet flutes of the inlet face), and open at the outlet end face of the media. Such media arrangements are well known and are described for example in U.S. Pat. Nos. 5,820,646; 5,772,883; 5,902,364; 5,792,247; 6,190,432 and 6,350,291, the complete disclosures of these six U.S. patents being incorporated herein by reference. Herein, such media will sometimes be referred to as z-filter media; and, media packs formed from such media as z-filter media packs. A characteristic of such media packs, and the ones described herein is that they are closed to passage of unfiltered air through the packs, between the opposite end faces.

Many variations of such media can be used, with the principles according to the present disclosure. For example, the end seals of the flutes (flute seals) can be provided in a variety of ways, including through utilization of sealant beads; darting, folding or other arrangements for distorting the shape of the flute at the end and/or closing and sealing the flute ends; and through combinations thereof. Not all flutes need to be sealed closed in the same way. The particular approach to sealing is generally a matter of choice, not specifically related to the general principles described herein (except as indicated below) in connection with provision of seals between the serviceable filter element and a housing or housing component, in use.

Another variable is the specific shape of the flutes. Tapered flutes in accord with PCT Application No. WO 97/40918 and PCT Publication Number WO 03/47722 and other flute shapes can be used, with arrangements according to the principles disclosed. Of course, straight (non-tapered) flutes can, and often will, be used.

Another variable with respect to the media arrangement, is whether the media is configured in a "coiled" arrangement or a "stacked" arrangement. The principles described herein will typically be applied in connection with "coiled" arrangements, for reasons which will be apparent from the following discussions. However, certain of the principles could be applied in connection with arrangements that are stacked.

Herein the term "coiled" and variants thereof, when used to refer to a media pack form from z-filter media, is meant to refer to a media pack formed by coiling a single combination strip of media or single facer, made from a strip of corrugated media secured to flat or nearly flat sheet (the combination being a single facer), in order to form the media pack. Such coiled media can be made in a variety of shapes including: round or cylindrical; oval, for example racetrack; square; or rectangular with rounded corners; and, they can even be configured in conical or similar arrangements. Examples of selected ones of these are described in U.S. Pat. No. 6,350,291 and U.S. provisional application Ser. No. 60/467,521, filed May 2, 2003, the complete disclosures of which are incorporated herein by reference.

Herein the term "stacked arrangements" and variants thereof generally refers to media packs that are not formed from a single combination strip of media that is coiled, but rather to media packs formed from a plurality of strips of media or single facer (corrugated media secured to flat or nearly flat media); the strips being secured to one another in a stack or block form. Stacked arrangements are described for example in U.S. Pat. No. 5,820,646, at FIG. 3, incorporated herein by reference.

In general, z-filter media pack arrangements as described, are used in serviceable filter elements (or cartridges), i.e., filter elements (or cartridges) that are removable and replaceable with respect to an air cleaner in which they are used. Generally, such z-filter media packs are provided with sealing arrangements for engagement with portions of air cleaner parts such as a housing, in use. Herein, such seals are referred to as "air cleaner seals" or "housing seals," or by variants thereof. A variety of such air cleaner seals are known. One type, involving an outside or outwardly directed radial seal, is described in U.S. Pat. No. 6,350,291 at Ref. #250, FIG. 5.

Other types of seals useable with z-pack media are axial pinch seals, as described for example in U.S. Pat. Nos. 6,348,085; 6,368,374 and U.S. Publication US 2002/0185007 A1, incorporated herein by reference; and, internally directed radial seals, as described for example in U.S. Provisional 60/457,255 filed Mar. 25, 2003 at FIG. 12, the complete disclosure of which is incorporated herein by reference.

In general z-pack media and its preparation are characterized in more detail herein below, in Section VII.

II. An Example Element, FIGS. 1-6

The reference numeral 1, FIG. 1, generally depicts a serviceable filter element (sometimes called a cartridge) according to the present disclosure. The filter element 1 depicted, comprises a z-filter media pack 2 having an air cleaner seal arrangement 3 positioned thereon.

Again, herein, the term "air cleaner seal arrangement" and variants thereof is generally meant to reference a seal arrangement 3 provided on a serviceable filter element 1 in such a manner that, when the filter element 1 is installed in an air cleaner for use, the seal arrangement 3 provides for an air seal with appropriate componentry or portions of air cleaner, typically an air cleaner housing. The term "serviceable element" in this context, is meant to refer to a filter element 1 which is removable and replaceable with respect to other portions of an air cleaner.

The particular air cleaner seal arrangement 3 depicted comprises an outside radial seal member. By the term "outside radial seal member" in this context, it is meant that the surface 6 which forms a seal with an air cleaner component, in use, is directed radially outwardly, rather than radially inwardly with respect to the portion of the serviceable filter element 1 on which it is mounted. The principles described herein could be applied with alternate orientations and types of seals, but the particular seal configuration characterized is a convenient, advantageous, example.

In general, during operation, air flow through the z-filter media pack 2 is shown by inlet arrow 9 and exit arrow 10. It is a characteristic of z-filter media packs, that air flow therethrough is generally such that the inlet flow arrow and exit flow arrow are generally parallel to one another. That is, the only turns the air needs to make in passage through the element 1 are minor turns in flow through media pack 2, since the air flow flutes are generally parallel to one another, and parallel to the direction of inlet and outlet flow. It is noted that an opposite direction of air flow to that shown by arrows 9 and 10 is possible, but this particular direction of air flow shown, in use, is advantageous. When constructed and oriented for use in this manner, the media pack 2 has an inlet end or flow face 15 and an opposite exit end or flow face 16.

For the example shown, the inlet flow face 15 and exit flow face 16 are each substantially planar and are substantially parallel with one another. Although alternate arrangements are possible, the principles disclosed herein are particularly well considered for this application.

Figure 2:
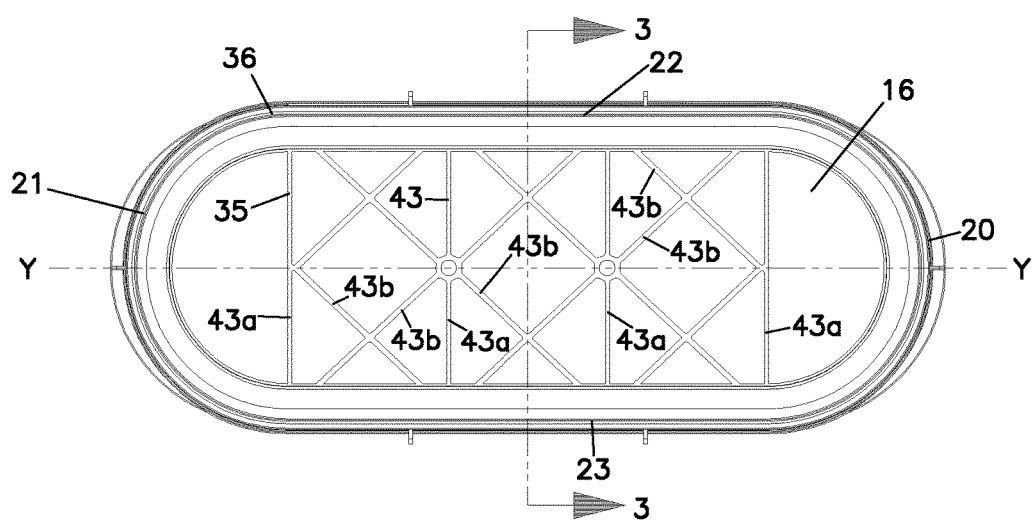
FIG. 2 is a top view of the filter element component of FIG. 1.

FIG. 2 is a top plan view of filter element arrangement 1. Referring to FIG. 2, the z-filter media 2 and seal arrangement 3 are provided with an oval outside perimeter shape, in this instance corresponding to two similar, opposite, curved ends 20, 21 spaced apart by two opposite, generally straight, sides, 22, 23. Herein this specific oval configuration will generally be referred to as a "racetrack" shape. Racetrack shaped z-filter media pack elements are described in the prior art, for example, in U.S. Pat. No. 6,350,291 at FIG. 10. It will be seen that many of the principles of the present disclosure can be applied in elements having media packs with alternate peripheral shapes, for example circular, as described herein below. Another variation in the oval shape would one in which the opposite sides are not straight, but are curved somewhat, with less curvature than the ends. Another shape which is possible, is a shape which has two pairs of opposite, generally straight, sides which may or may not have a slight curvature to them, with four substantially curved corners. An example of this type of element is described in U.S. provisional application 60/457,255, in FIG. 22, the complete disclosure of which is incorporated herein by reference.

The various shapes identified in the previous paragraph, indicate that the principles herein can be applied to a wide variety of coiled shapes, not just the ones shown in the figures.

Referring to FIG. 1, the filter element 1 includes an optional end piece or skid skirt 30 thereon, at an opposite end of the media 2 from the seal arrangement 3. The optional end piece or skid skirt 30 can be used to provide engagement between element 1, and structure in a housing, during use, to facilitate installation. Examples of such end pieces are shown and described, in PCT Publication number WO 03/095068, published Nov. 20, 2003, at FIGS. 4 and 8, the complete disclosure of PCT publication WO 03/095068 being incorporated herein by reference. The optional end piece 30 is discussed again below, in section V in association with description of FIGS. 17 and 18.

Referring to FIG. 2, seal arrangement 3 comprises: a rigid preform part or insert 35; and, a molded seal component 36. By the term "preform part" and variants thereof, as used in this context herein, it is meant that part 35 is formed prior to formation of the molded seal component 36 to form the seal arrangement 3. Indeed, in a typical manufacturing process for filter element 1, as described below: media pack 2 would be preformed; part 35 would be preformed; and, the two parts (2, 35) would be placed together in a mold, for formation of the molded seal component 36. Herein, the molded seal component 36 is sometimes referred to as an "overmold," or by variants thereof. Among other things, as will be understood from the following descriptions, the term "overmold" in this context indicates that the molded seal component 36 is molded in place on the media pack 2 and preform 35, and is not itself preformed.

Figure 3:
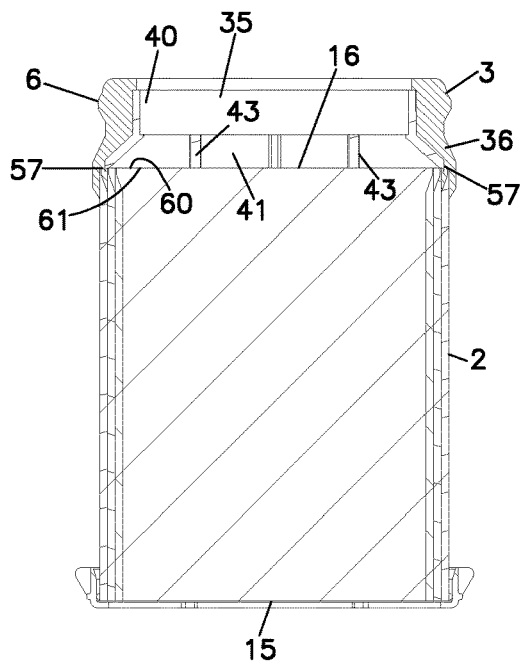
FIG. 3 is a cross-sectional view taken along line 3-3, FIG. 2.

Attention is now directed to FIG. 3. FIG. 3 is a cross-sectional view taken along line 3-3, FIG. 2. The cross-section of FIG. 3 is through the shorter or narrower dimension of the element 1, FIG. 1. However, similar features will be viewable, if the cross-section were taken along the longer axis, i.e., line Y-Y, FIG. 2.

The media pack 2, FIG. 3, is a coiled media pack. In general the media pack 2 comprises a corrugated media sheet secured to a facing sheet, often a flat or nearly flat sheet, to form a strip or single facer, which is itself coiled in the configuration shown. Thus, the media pack 2 comprises a single strip of the corrugated sheet facing (typically flat or non-corrugated) sheet, or single facer, coiled and configured as shown. In FIG. 2, although the media pack 2 is shown schematically, the outer three coils are indicated. Referring to FIG. 1, the outside tail end of the outer most coil is shown at 37. For the embodiment shown, tail end 37 is sealed and secured in position, by a hot melt sealant strip 38, although alternatives are possible.

Referring again to FIG. 3, it is noted that there is no center board, center gap, center piece or center seal schematically shown in the media pack 2. The media pack 2 is simply shown schematically with respect to this point. Center boards can be used, for example as described in U.S. Pat. No. 6,348,084, incorporated herein by reference. Interdigitated center strips can be used, for example as described in U.S. Provisional Application Ser. No. 60/467,521, filed May 2, 2003. Center seals can also be used, for example as described in U.S. Provisional Application Ser. No. 60/467,521, filed May 2, 2003. No specific choice from among these, and variants, is meant to be indicated with respect to FIG. 3. However, as is apparent from a review of the figures and further description herein, a center of the media pack 2 would be sealed closed, in some manner, to prevent the flow of unfiltered air between the two opposite end faces 15, 16; i.e., so unfiltered are cannot flow outwardly from an end face.

Referring to FIG. 3, the preform part 35 depicted includes three sections generally comprising: housing seal support section 40; media engagement periphery or skirt 41; and, media face cross piece arrangement 43.

Figure 4:
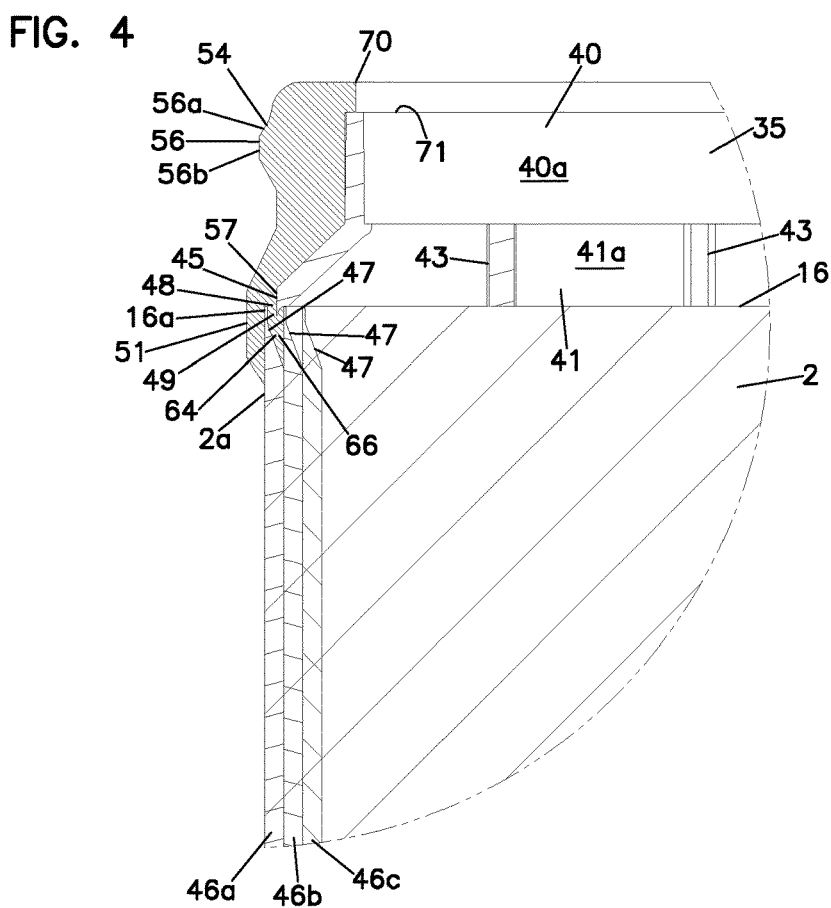
FIG. 4 is an enlarged fragmentary view of a portion of FIG. 3.

Attention is directed now to FIG. 4. FIG. 4 is a fragmentary enlarged view of a portion of FIG. 3. In FIG. 4 it can be seen that no portion of preform 35 extends around the outer periphery or side 2a of the media pack 2. This will be preferred, for arrangements according to the present disclosure, although alternates are possible. For the particular arrangement depicted in FIG. 3, media engagement portion 41 includes an edge 45 which is brought into engagement with flow face 16 of the z-filter media pack 2 and which for the example shown does not project to, or beyond, an outer perimeter edge 16a of flow face 16, although alternatives are possible. The particular preform 35 depicted includes a small ridge 45a, FIG. 6 which projects slightly into media pack 2. Preferably ridge 45a is no greater than 1 mm and comes to a fine point, to help contain flow of rising urethane, during formation of the overmold 36, and desirably from extending across flow face 16.

As described above in reference to FIG. 3, it is noted that the particular z-filter media pack 2 depicted comprises a coiled media arrangement. In FIG. 4, the outer three coils 46a, 46b and 46c are formed. The ends of coils 46a, 46b and 46c, adjacent surface 16, are shown comprising ends folded or darted closed at 47. Such folding or darting is described, for example, in U.S. Provisional Application Ser. No. 60/467,521, filed May 2, 2003, incorporated herein by reference.

Referring still to FIG. 4, molded seal component 36 is positioned with a portion 48 overlapping and sealing a joint 49 where preform part 35 engages flow surface 16 of the media pack 2. Preferably the molded seal component 36 includes a portion 51 which extends beyond the joint 49 in a direction away from flow face 16 (toward opposite flow face 15, FIG. 3) a distance of at least 5 mm, preferably at least 8 mm, and typically a distance within the range of about 9 mm to 18 mm, inclusive.

In general, portions 48 and 51 of the molded seal component 36, provide then, for a sealing between the media pack 2 and the preform part 35 at this location, and also for sealing around and against media pack 2, adjacent face 16, to inhibit undesired, contaminated, air flow at this region. Typically, if the media pack does not include a covering or coating of some type, portions 48 and 51 will contact the single facer sheet of the media directly. In other cases, material on the media pack will be between the media and portions 48 and 51. In both instances, portions 48 and 51 engage the media pack 2.

Referring to FIG. 1, and in particular to hot melt seal strip 38, preferably the strip 38 is continuous and terminates, underneath region 51 of overmold 36, at a location spaced at least 4 mm from face 16, FIG. 4. Typically an extension of 6-12 mm of strip 38 will be positioned underneath overmold 36. The termination of strip 38 at least 4 mm from surface 16 ensures that over a distance of at least 4 mm, the seal material of overmold 36 is sealed directly to the media pack 2 adjacent end face 16. This will help avoid leak between the overmold 36 and the media pack 2 at this location.

Referring to FIG. 4, molded seal component or overmold 36 further includes air cleaner seal portion 54. Air cleaner seal portion 54 includes a radial outer surface 56, configured in a preferred manner, for sealing with an air cleaner component. The particular surface 56 is depicted, as a stepped surface portion 56a having a shape similar to the shape of the seal surface portion at reference 250 depicted in U.S. Pat. No. 6,350,291 at FIG. 7, the complete disclosure of which is incorporated herein by reference.

From review of FIG. 3, it can be seen that portion 40 of preform part 35 is positioned to back up housing seal 56 and stepped portion 56a of molded seal composition or overmold 36. Thus, preform part 35, in part, serves a function of providing for rigid backup to the strength of the seal when air cleaner seal portion 54 is compressed in the thickness (preferably at least 10% in thickness at the portion of most compression) upon installation in an air cleaner, with compression being of surface 56 toward portion 40. Preferably, the distance of compression is within the range of 1.5-2.8 mm, at the thickest part 56b of seal 56, more preferably about 1.9-2.5 mm. As can be seen from a review of FIG. 3, portion 40 is positioned to operate as a backup to the seal, because it projects outwardly (axially) from one of the flow faces 15, 16.

Figure 15:
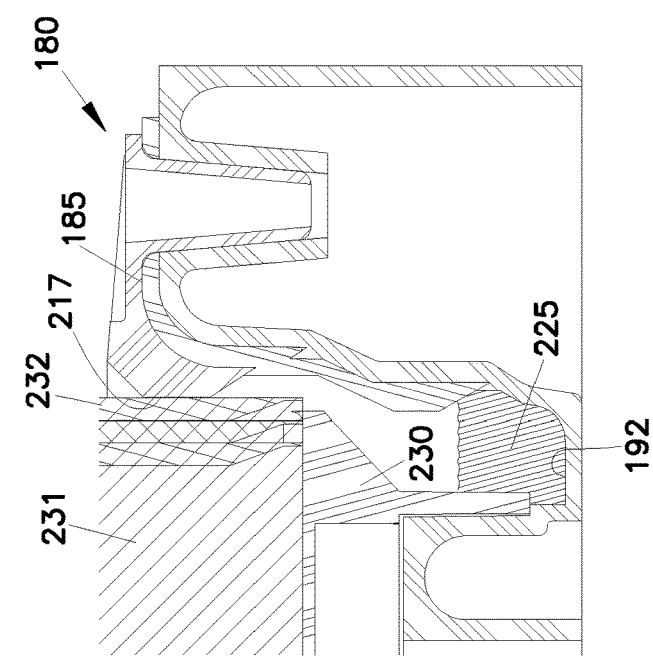
FIG. 15 is a view of FIG. 14, with the seal material foamed and substantially cured.

The recess of surface 40 across face 16, from outer periphery 2a of the media pack 2, provides that the filter element 1 can be installed in air cleaners that are originally configured, for example, to receive elements such as element 450, FIG. 15 of U.S. Pat. No. 6,350,291, incorporated herein by reference. Of course alternate configurations are possible. Of course surface 40 is preferably positioned so the supported housing seal 56 projects at or outwardly from the outer perimeter of the media pack, in preferred arrangements.

Media engagement portion 41 is configured to extend radially outwardly, in extension between portion 40 and edge 57. Media engagement portion 41 is configured as a radially outwardly directed skirt, from region 40. This outward extension means that ends of outlet flutes in the z-filter media pack 2, at region 60, FIG. 3, are not closed to passage of air therefrom, during filtering operation. If region 41 was not positioned as a flared, diagonal, skirt, but rather section 40 extended to point 61, flutes in region 60 would be blocked by extension 41, for air flow therefrom. This would lead to increased restriction, and less efficient use of the media. Preferably angle X, FIG. 6, is within the range of 20°-70°, to accommodate the desired skirt. The angle X is the angle between the inside surface of skirt 41 and the media face 16.

Referring to FIG. 4, it is noted that for the particular arrangement shown skirt 41 is sized and positioned to leave region 64 in face 16 (corresponding to the otherwise open ends of exit flutes in an outer flute wrap 46a in the media pack 2), exposed to receive a portion of molded seal component 36 therein, as indicated at 66. This can provide for advantage. In particular, this allows some of overmold 36 to rise into the media pack 2, as described below, during molding.

It is noted that for the preferred element 1 depicted in FIG. 4, no portion of the molded seal component 36 is positioned along interior surface 40a of section 40. Further, preferably no portion of molded seal component 36 is provided along inner surface 41a of region 41, except possibly for some bleed or flash immediately adjacent edge 45. This latter prevents undesired levels of flash across surface 16 and provides for a convenient manufacture. Section 40 could be configured, and overmold 36 formed, to allow sealant in region 40a, but this would not be preferred.

Still referring to FIG. 4, media face cross piece arrangement 43 extends across media face 16, in engagement with region 41 of preformed part 35. Media face cross piece arrangement 43 prevents the media pack 2 from telescoping, in the direction of arrow 10, FIG. 1, during use.

A variety of cross piece configurations are useable. In FIG. 2, the particular cross piece arrangement 43 depicted, comprises: a grid of parallel extensions 43a between opposite sides 22, 23; interconnected by diagonal framework 43b.

In FIG. 5, a perspective view is provided, showing preformed part 35. It can be seen that the preform part 35 can be formed as a single integral unit, for example through injection molding or other molding processes. It is preferably formed from a polymer such as a (33% for example) glass filled nylon material.

Referring again to FIG. 4, molded overmold or seal component 36 includes a portion 70 overlapping part of end 71 of preform part 35. This is an artifact from a preferred molding operation, as described below.

Referring to FIG. 4, it is noted that where cross-brace 43 engages skirt 41, the angle of the skirt 41 relative to the face 16 may be interrupted somewhat. However, in general, at other locations the skirt 41 will have a preferred angle X as characterized above.

It will be understood that the techniques described herein can be applied in a wide variety of element configurations and sizes. The following dimensions are provided as examples only, and to help understand the wide application of the present techniques. The overmold 36, in its thickest location, could be about 10-12 mm thick, for example about 11.5 mm. The longest cross-sectional dimension of the racetrack shaped media pack could be about 300-320 mm, for example about 308 mm. The shortest cross-sectional dimension of the racetrack shaped element could about 115-125 mm, for example about 121 mm. The length of the straight sides could be about 175-195 mm, for example about 188 mm.

Before formation of arrangements such as described above is discussed, and certain advantages relating to the configuration are described, application of the principles in an alternate configuration will be discussed in connection with FIGS. 7-10.

III. The Arrangement of FIGS. 7-10

Figure 7:
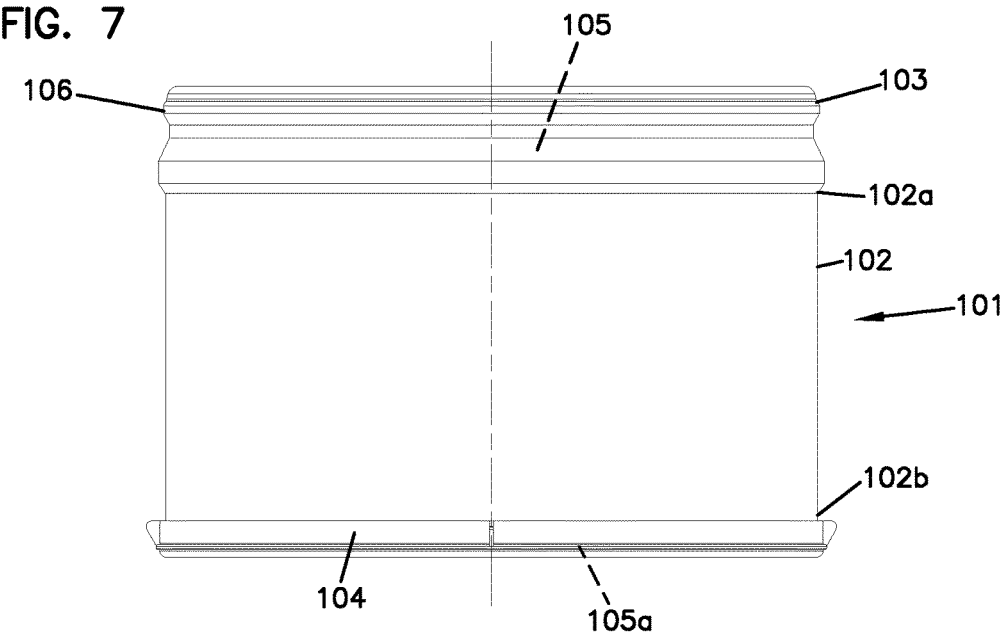
FIG. 7 is a side elevational view of a filter element according to a second embodiment of the present disclosure.

Attention is first directed to FIG. 7. FIG. 7 is a side elevational view of a serviceable filter element (or cartridge) 101. The filter element 101 comprises a z-filter media pack 102 and seal arrangement 103. The element 101 further includes optional end piece 104 at an end 102b of media pack 102 opposite from an end 102a in which seal arrangement 103 is located.

The media pack 102 comprises a coiled single facer having first and second, opposite, flow faces 105, 105a. It would, of course, have an outside tail end, not shown, which would be secured down, for example, with a sealant strip analogous to strip 38 above.

In general, and referring to FIG. 7, surface 106 of seal arrangement 103, is configured to provide a seal, as an outwardly directed radial seal, with a housing or air cleaner component in use (of course alternatives are possible). Surface 106 may be configured, in cross-section, analogously to surface 56, FIG. 4.

Figure 8:
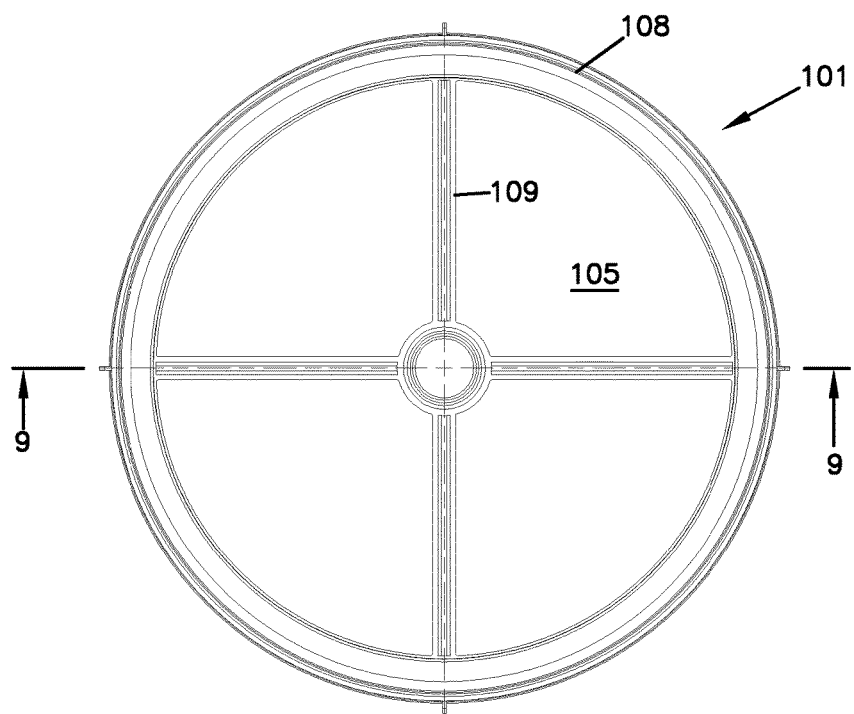
FIG. 8 is a top view of the element shown in FIG. 7.

Attention is now directed to FIG. 8, in which element 101 is depicted in top plan view. From the view of FIG. 7, it can be seen that element 101 is a generally circular outer perimeter 108 defined by both the outer circumference of the seal arrangement 103 and media pack 102. In FIG. 8, grid work 109 is viewable, extending across flow face 105; in this instance face 105 preferably being an outlet flow face.

Figure 9:
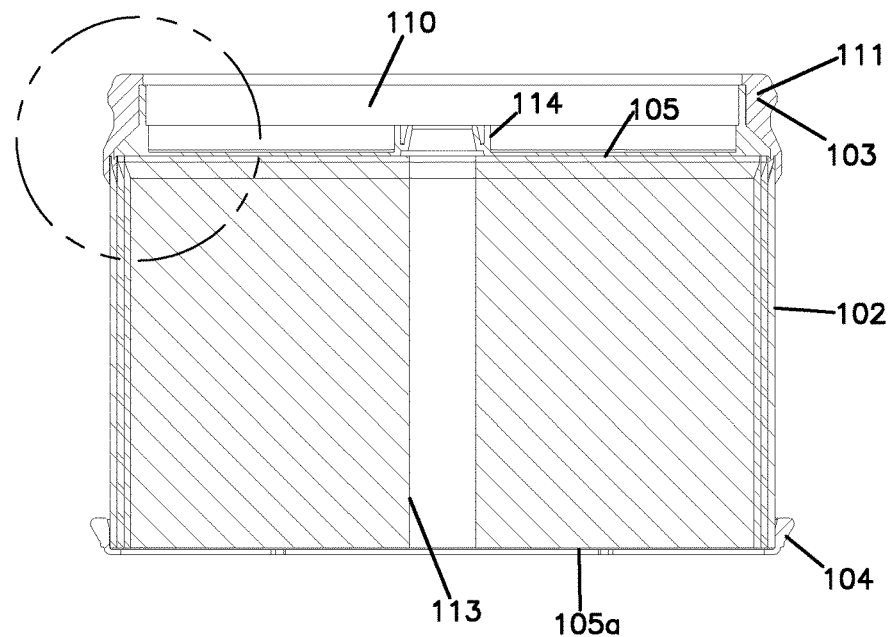
FIG. 9 is a cross-sectional view of the arrangement depicted in FIG. 8, taken along line 9-9 thereof.

Attention is now directed to FIG. 9, which shows a cross-sectional view through element 101. From FIG. 9, it can be seen that the seal arrangement 103 comprises a preformed part 110 and an overmold or molded seal component 111. The preform part 110 and molded seal component 111 may generally be analogous to the preform part 35 and molded seal component 36 of the embodiment shown in FIGS. 1-5, except made round.

Specifically, element 101 includes a core 113, around which the media pack 102 is wound. Core 113 can be provided in snap fit engagement with a portion 114 of preform part 110. A variety of engagement arrangements can be used, including the one, for example, described at FIG. 5 in U.S. Pat. No. 6,517,598, incorporated herein by reference. Core 113 is shown in schematic. It would typically be provided with a plug therein. The plug could be integral with a remainder of core 113 or be added thereto. The plug or other closure in core 113 would generally operate to prevent flow between faces 105a, 105 which is not filtered.

Figure 10:
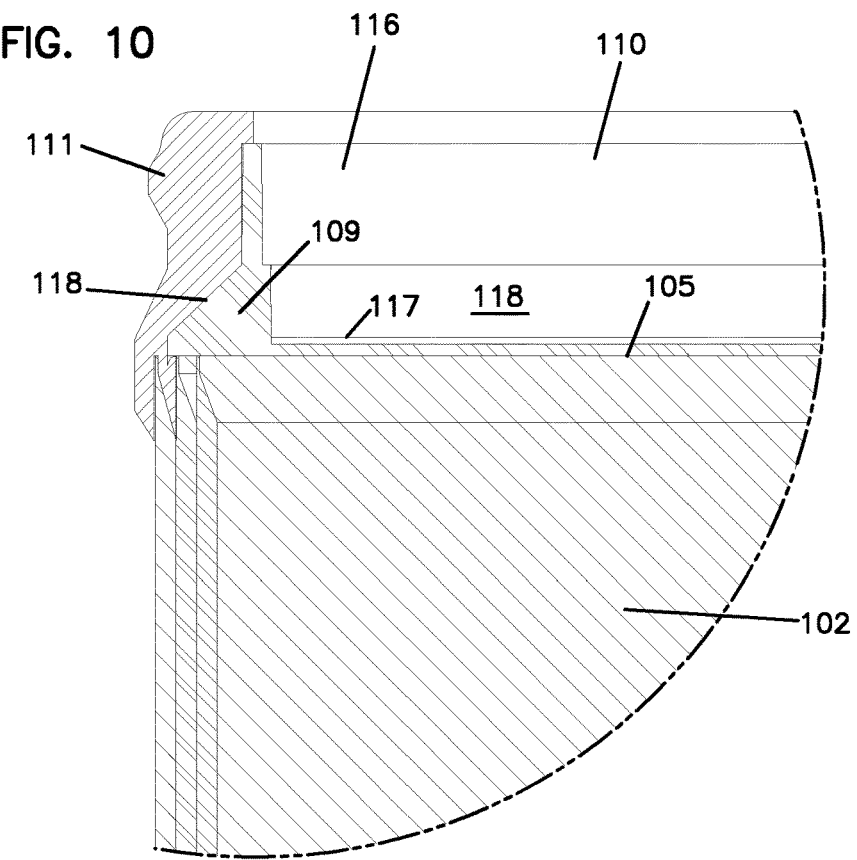
FIG. 10 is an enlarged, fragmentary, view of a portion of FIG. 9.

In FIG. 10, an enlarged fragmentary view of a portion of FIG. 9 is shown. The preform part 110 includes a housing seal support 116; and, a media pack engagement portion 117, configured as a radially outwardly directed skirt 118; and media face cross piece arrangement 109 (FIG. 8). (At region 114 the inside outward skirt 118 is shown filled because the cross-section is taken through cross piece grid work 109, FIG. 8.) For element 101, these components generally provide the same basic operation as the analogous components for element 1, FIG. 1.

IV. Process for Assembly of Elements According to FIGS. 1-10

In general, elements corresponding to element 1, FIG. 1, and element 101, FIG. 6, are formed the processes involving the following:
1. Preforming the media pack component (2, 102).
2. Preforming the preformed part (35, 110) of the seal arrangement.
3. Positioning the preform part (35, 110) and media pack component (2, 102) appropriately with respect to one another in a mold.
4. Overmolding a seal material to form the appropriate molded seal component of the arrangement.
5. Demolding.
6. Optionally placing the skid (30, 104) on an end of the element opposite the seal.

In this context, the term "overmolding" and variants thereof are meant to refer to molding a molded seal component 36, 111 in position: (a) with a portion of the molded seal component 36 over the outside of joint between the preformed part (35, 110) of the seal arrangement and the media pack (2, 102); and, (b) with a portion of the same seal component 36, 111 (i.e. preferably a portion integral with a remainder of the overmold) positioned to form an air cleaner seal. Typical and preferred processes will use, for the formation of the molded seal component, a foaming polyurethane, as described below. Herein, a molded seal component 36 which has been made by overmolding as defined, will sometimes be referred to as an overmold. The portions of the overmold seal, are preferably integral with one another; the overmold 36, 111 being preferably molded from a single pool of polymer.

Typically and preferably, the thickness of the molded seal component, in the region of the seal surface, is configured so that compression of the thickness of the thickest portion of the molded seal component in this region, will be at least 10%, and typically at least 15%, when the element (1, 101)

is installed in an air cleaner for use. This can be accomplished with configurations as shown, using materials as described below.

A typical process is described herein, in connection with FIGS. 11-16.

Figure 11:
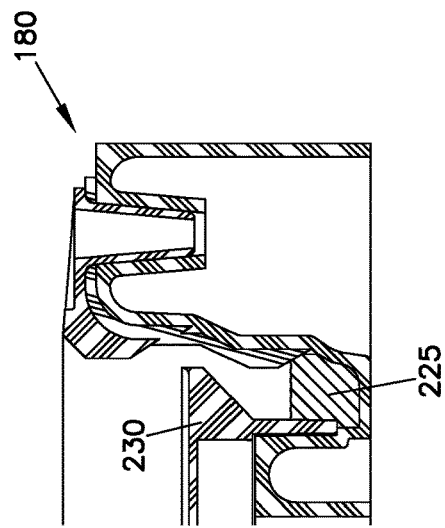
FIG. 11 is a fragmentary schematic, cross-sectional view of a mold arrangement useable to form a seal component of the arrangement depicted in either FIG. 1 or FIG. 7.

Attention is first directed to FIG. 11. In FIG. 11, reference numeral 180 identifies a mold arrangement useable to form the overmold seal arrangement of the present disclosure. Mold arrangement 180 is shown in fragmentary, cross-section. The portions indicated will provide an understanding of how the overmold seal arrangement can be formed. The remainder of the mold will be configured either round or obround, etc., depending on the particular instance of application.

Referring to FIG. 11, the particular mold arrangement 180 depicted is a multi-part mold 181. That is, the mold 180 includes more than one piece fit together, to form the mold in which the overmolding process occurs. The particular multi-part mold 180 depicted comprises three parts 183, 184 and 185 that are fit together, to form the mold. Aperture 189, which extends through three parts 183, 184, 185 when they are appropriately aligned, FIG. 11, can be used to receive a pin or similar member to secure the mold together.

In general, part 183 forms the basic mold structure including: an inner reservoir portion 192, in which uncured resin is placed, for the molding process; inner wall 193, against which a preformed part would be placed in use; shelf 194 on which an edge of the preform part would rest, during the molding process; central wall 195 and shelf 196 which supports additional mold parts as described; and, outer wall 197, which provides an outer support structure to the assembly 180.

The second part 184 comprises a mold insert having an extension 200 with a surface 201 that forms a portion of the outer surface of the molded part of the seal arrangement in use. In this instance surface 201 includes a portion 202 which, in combination with central wall 195 provides a mold undercut 203 molding a particular portion of the sealing surface of the resulting seal portion, as discussed below in connection with FIG. 15. Part 184 further includes upper extension 205 which rests on shoulder 196.

Finally, part 185 includes inner wall 215 and upper flange 218. The flange 218 extends over portion 205 of center part 184. Inner wall 215 includes a surface 216 which will define selected portions of the seal member, during the molding process, as discussed below in connection with FIG. 15. Section 217 will cap the mold, and engage media, during a preferred molding operation.

Figure 12:
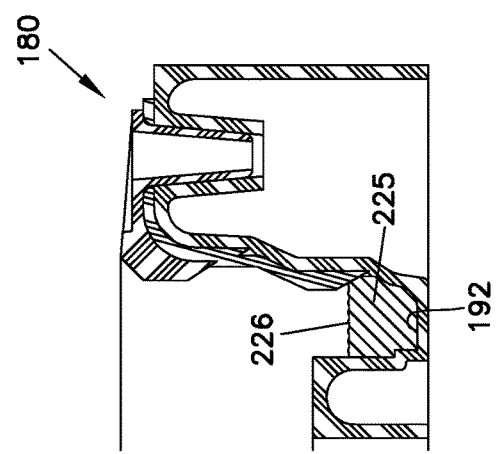
FIG. 12 is a schematic cross-sectional view of the mold of FIG. 11, depicted with a pool of non-cured polymeric seal material therein.

Attention is now directed to FIG. 12, in which assembly 180 is depicted with curable material 225 positioned within reservoir 192 up to fill line 226. The material 225 would generally comprise resin which, during a cure process, will foam and rise as a cure to form the moldable seal component. Typically, during molding and use the material 225 will expand in volume at least 80%, a preferred material increasing about 100%, in volume.

Figure 13:
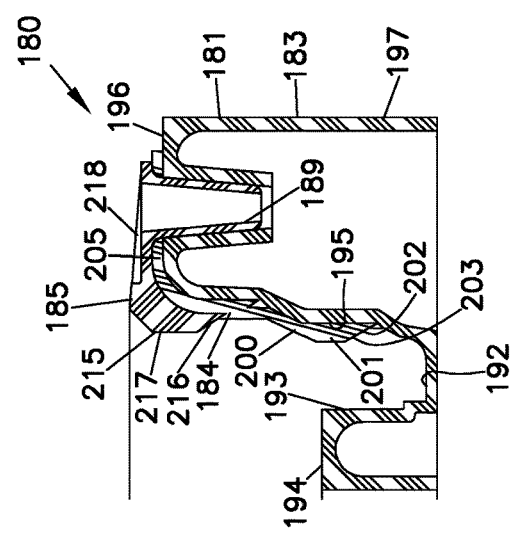
FIG. 13 is a view of the mold of FIG. 12 with certain pre-formed filter element componentry positioned therein.

In FIG. 13, the mold assembly 180 having resin 225 therein is shown having preformed part 230 therein. The preform part 230 could correspond, for example, to preform part 35, FIG. 1. It could also correspond to preform part 110, FIG. 7. However if used with the arrangement of FIG. 7, in some instances it would already be attached to the media pack.

Figure 14:
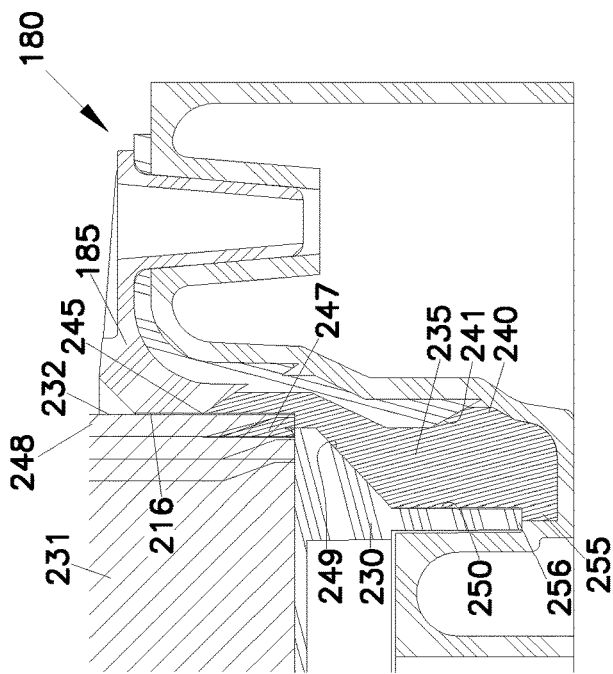
FIG. 14 is a view of FIG. 13 with a media component positioned therein.

Attention is now directed to FIG. 14 in which the mold arrangement 180 is depicted with preform part 230 and media pack 231 positioned appropriately. It is noted that an outer surface 232 of media pack 231 is sized to engage portion 217 of the mold part 185.

Attention is now directed to FIG. 15. In FIG. 15 the material at 235 is meant to indicate the foamed, risen, substantially cured resin; i.e., the overmold (corresponding to overmold 36, FIG. 1, or overmold 103, FIG. 7). By the term "substantially cured" it is meant that the resin is cured sufficiently to have reached a shape which will generally be maintained, as it further cures. From FIG. 15, some of the following important features relating to the molding operation can be understood:

1. At region 240, the most outwardly projecting portion of the molded seal member 235 (number that above) is formed. Portion 240 then, will form the outer most portion of the outwardly directed radial seal member, i.e., the part that compresses most in use as an air cleaner seal;
2. Surface 241 is a portion of mold undercut, which is used to form a portion of region 240.
3. At region 245, rise of the material 235 around the outside surface 232 of the media pack 231 is capped or stopped by mold piece 185, in particular by region 216 of mold piece 185.

At location 247, some of the resin of overmold 235 has risen into the media pack between an outer most layer 248 of the media pack 231 and the layer underneath. This rise will tend to close off any otherwise open flutes at this location. In general, this will render the outer most layer of the media pack (for example layer 46a, FIG. 4) such that while it can be used for filtering material, air must pass into the next inner layer, before it can exit the media pack. What this means or ensures is that even if the outer most wrap of media pack is damaged during handling or installation, leakage will not result. Thus, in a preferred arrangement, a third set of flutes, closed at both ends, is present in the media pack. This third set is present, preferably, only in the outermost wrap. These flutes would otherwise be outlet flutes, and will sometimes be referred to by such terms.

For the process shown in FIGS. 11-16, the media pack is one which has closed ends at the inlet flutes, adjacent the outlet flow face, darted closed, to provide the edges viewable. Alternates of course are possible, including ones that are not darted at all. The overmold material is shown risen up into the open ends of the outlet flutes, at the outlet face of the media, in the region indicated at 247.

Along regions 249, 250, the resin material 236 completely lines an outer surface of preform 230, securing it in place. At region 255, material 235 is positioned over a part of an end 256 of preform 230.

In the particular arrangement shown, FIG. 15, the overmold 235 is a single integral member, molded from the resin 225, FIG. 14.

Demolding can be accomplished by forcing the element out of the mold 180, in a powered process. Equipment to cause the forcing can engage the cross pieces on the preform 230. Generally the overmold 235 will compress sufficiently, to be pushed past undercuts in the mold. It is anticipated that typically, with materials and configurations described herein, demolding can be accomplished with a force of 110 lbs. or less, typically about 100 lbs. (The demolding force would typically be applied directly to the gridwork of the preform 35, 110.)

The optional preform skid skirt at the opposite end of the element, can be applied either before or after molding. In general, if a center plug is used within the media, it would be preformed before the described molding process. However, in some instances a center plug can be molded at the same time as the overmold. This latter would require ensuring that a part of the mold or some other configuration is provided, for appropriate dispensing of the urethane to accomplish this.

It is noted that in some instances, as described above, the preform 230 could be attached to the media pack 231 by snap-fit arrangement.

Figure 16:
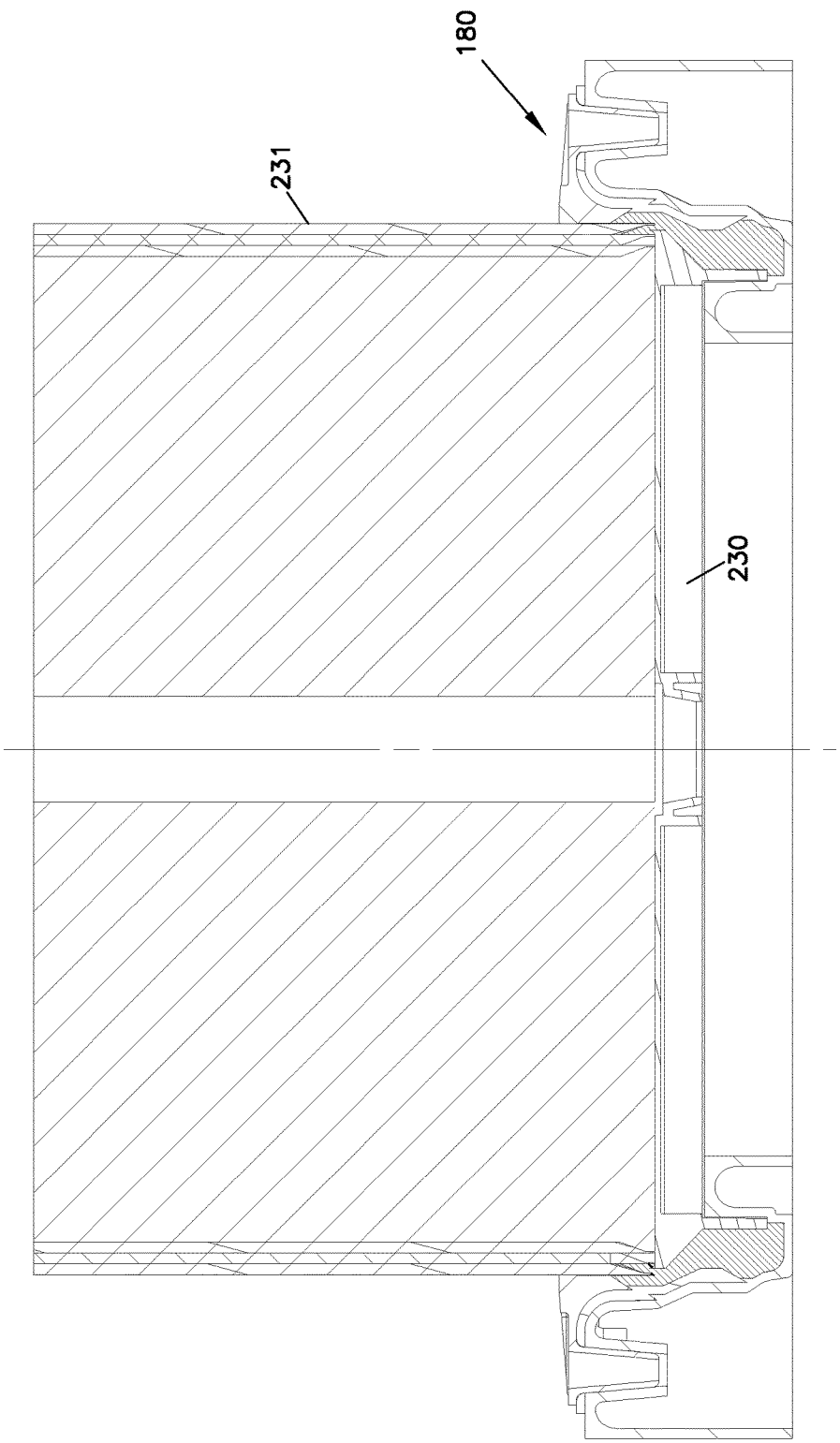
FIG. 16 is a view of preform and media pack component in a mold according to the process of FIGS. 11-15.

In FIG. 16, the mold 180 is depicted with the media pack 231 and preform 230 positioned therein, at molding. In this instance the media pack 231 is depicted without the option skid skirt mounted therein.

V. The Optional Skid Skirt

In the discussion above with respect to FIG. 1, it was indicated that the skid skirt 30 was an optional component. This component is depicted in FIGS. 17 and 18.

Figure 17:
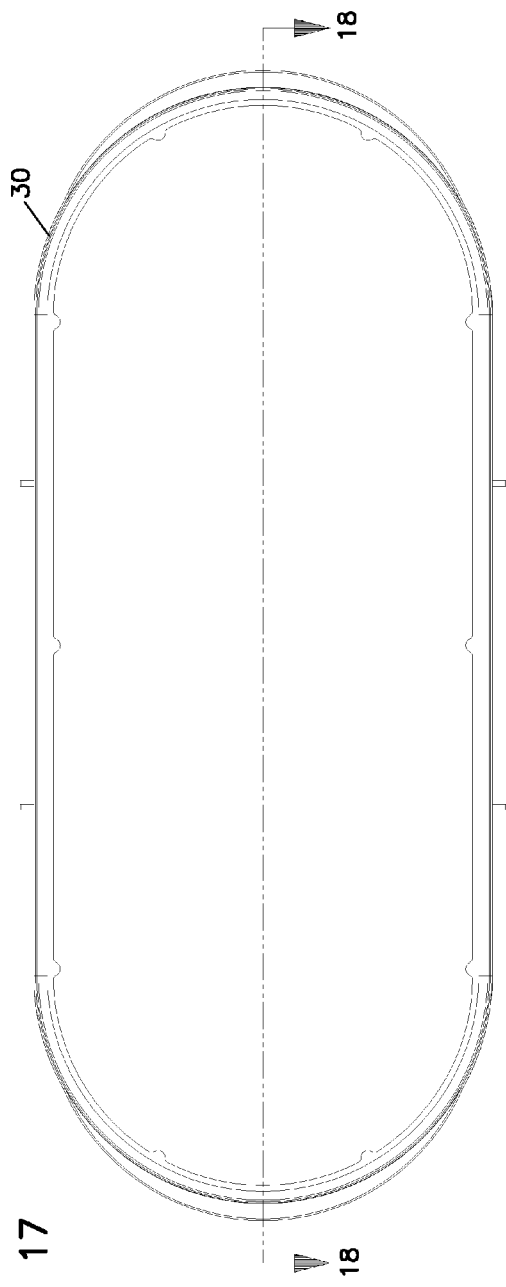
FIG. 17 is an optional end piece useable in the component of FIG. 1.
Figure 18:
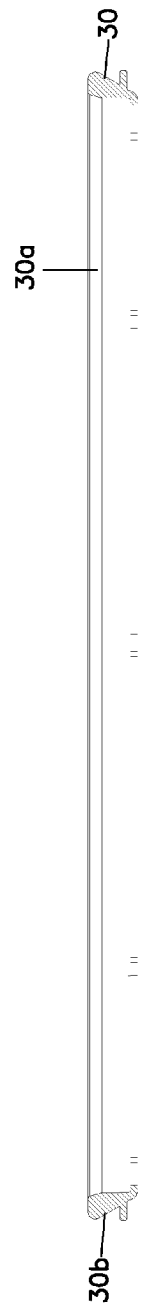
FIG. 18 is a cross-sectional view of the optional piece of FIG. 1.

Referring first to FIG. 17, a top plan view, the skid skirt 30 is depicted. In FIG. 18, the skid skirt 30 is depicted in cross-sectional view. Referring to FIG. 18, receiving area 30a for the media pack, can be viewed, along with outside surface 30b configured to engage componentry in a housing, during installation, as desired. From the principles described in FIGS. 17 and 18, an analogous, but circular, component can be understood, if desired, for application in a circular arrangement. The skid skirt 30 is typically formed from a glass filled (for example 33% glass filled) nylon, secured in position with an adhesive.

VI. The Curable Seal Resin

Preferably with such arrangements, the polyurethane formulation chosen provides for a high foam, very soft, molded end cap. In general, the principal issue is to utilize a formulation that provides for an end cap that is such that a robust seal will result under conditions which will allow for hand assembly and disassembly. This generally means that the seal range which has material is a relatively low density, and exhibits appropriate and desirable compression load deflection and compression set.

Although alternatives are possible, preferably the formula chosen will be such as to provide end caps having an as molded density of no greater than 28 lbs./cubic foot (0.45 g/cu. cm.), more preferably no more than 22 lbs./cubic foot (0.35 g/cu. cm.), typically no greater than 18 lbs/cubic foot (0.29 g/cu. cm.) and preferably within the range of 12 to 17 lbs/cubic foot (0.19-0.27 g/cu. cm.).

Herein the term "as molded density" is meant to refer to its normal definition of weight divided by volume. A water displacement test or similar test can be utilized to determine volume of a sample of the molded foam. It is not necessary when applying the volume test, to pursue water absorption into the pores of the porous material, and to displace the air the pores represent. Thus, the water volume displacement test used, to determine sample volume, would be an immediate displacement, without waiting for a long period to displace air within the material pores. Alternately stated, only the volume represented by the outer perimeter of the sample need be used for the as molded density calculation.

In general, compression load deflection is a physical characteristic that indicates firmness, i.e. resistance to compression. In general, it is measured in terms of the amount of pressure required to deflect a given sample of 25% of its thickness. Compression load deflection tests can be conducted in accord with ASTM 3574, incorporated herein by reference. In general, compression load deflection may be evaluated in connection with aged samples. A typical technique is to measure the compression load deflection on samples that have been fully cured for 72 hours at 75° F. (24° C.) or forced cured at 190° F. (88° C.) for 5 hours.

Preferred materials will be ones which when molded, show a compression load deflection, in accord with ASTM 3574, on a sample measured after heat aging at 158° F. (70° C.) for seven days, on average, of 14 psi (0.96 bar) or less, typically within the range of 6-14 psi (0.41-0.96 bar), and preferably within the range of 7-10 psi (0.48-0.69 bar).

Compression set is an evaluation of the extent to which a sample of the material (that is subjected to compression of the defined type and under defined conditions), returns to its previous thickness or height when the compression forces are removed. Conditions for evaluating compression set on urethane materials are also provided in ASTM 3574.

Typical desirable materials will be ones which, upon cure, provide a material that has a compression set of no more than about 18%, and typically about 8-13%, when measured on a sample compressed to 50% of its height and held at that compression at a temperature of 180° F. (82° C.) for 22 hours.

In general, the compression load deflection and compression set characteristics can be measured on sample plugs prepared from the same resin as used to form the end cap, or on sample cut from the end cap. Typically, industrial processing methods will involve regularly making test sample plugs made from the resin material, rather than direct testing on portions cut from molded end caps.

Urethane resin systems useable to provide materials having physical properties within the as molded density, compression set and compression load deflection definition as provided above, can be readily obtained from a variety of polyurethane resin formulators, including such suppliers as BASF Corp., Wyandotte Mich., 48192.

In general, with any given industrial process to select the appropriate physical characteristics with respect to the material, the key issue will be management of the desired characteristics and the final product, with respect to mounting and dismounting of the element, as well as maintenance of the seal over a variety of conditions. The physical characteristics provided above are useable, but are not specifically limiting with respect to products that may be considered viable. In addition, various element manufacturers, depending on the circumstances, may desire still further specifications, for example, cold temperature compression deflection, typically measured on the sample cooled to −40° F. (−40° C.), with the specification being for the pressure required to cause the compression under the ASTM test, for example, being 100 psi (6.9 bar) max.

One example usable material includes the following polyurethane, processed to an end product having an "as molded" density of 14-22 pounds per cubic foot (0.22 g/cu. cm.-0.35 g/cu. cm.). The polyurethane comprises a material made with I36070R resin and I305OU isocyanate, which are sold exclusively to the assignee Donaldson by BASF Corporation, Wyandotte, Mich. 48192.

The materials would typically be mixed in a mix ratio of 100 parts I36070R resin to 45.5 parts I305OU isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F. The mold temperatures should be 115-135° F.

The resin material I36070R has the following description:
  (a) Average molecular weight
    1) Base polyether polyol=500-15,000
    2) Diols=0-10,000
    3) Triols=500-15,000
  (b) Average functionality
    1) total system=1.5-3.2

(c) Hydroxyl number
   1) total systems=100-300
(d) Catalysts
   1) amine=Air Products 0.1-3.0 PPH
(e) Surfactants
   1) total system=0.1-2.0 PPH
(f) Water
   1) total system=0.2-0.5%
(g) Pigments/dyes
   1) total system=1-5% carbon black
(h) Blowing agent
   1) water.

The I3050U isocyanate description is as follows:
(a) NCO content—22.4-23.4 wt %
(b) Viscosity, cps at 25° C.=600-800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

In more general terms, the portion of the resin that forms in the housing seal, should typically be a material that cures to a density of at least 10 lbs./cubic foot (0.16 grams/cc) would be preferred, although materials as low as 5 lbs./cubic foot (0.08 grams/cc) may be acceptable for some light duty applications. Again it would be preferred that the material be one which cures to a density of no greater than about 22 lbs./cubic foot (0.35 grams/cc), as discussed above, and preferably less than this value.

VII. Z-filter Media Generally

Herein above it was discussed in general the media packs usable in the arrangements described, for example as media packs 2, 102, comprise z-filter media packs. It was indicated that a variety of alternate flute shapes and seal types can be used in such media packs.

A. Z-Filter Media Configurations, Generally

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428, 128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235, 195 and 6,179,890, each of which is incorporated herein by reference. In certain other arrangements, some non-coiled sections of fluted media secured to facing media, are stacked on one another, to create a filter construction. An example of this is described in FIG. 11 of U.S. Pat. No. 5,820,646, incorporated herein by reference.

For specific applications as described herein, coiled arrangements are preferred. Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by such techniques as corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The media pack is closed to passage therethrough of unfiltered air. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

Figure 19:
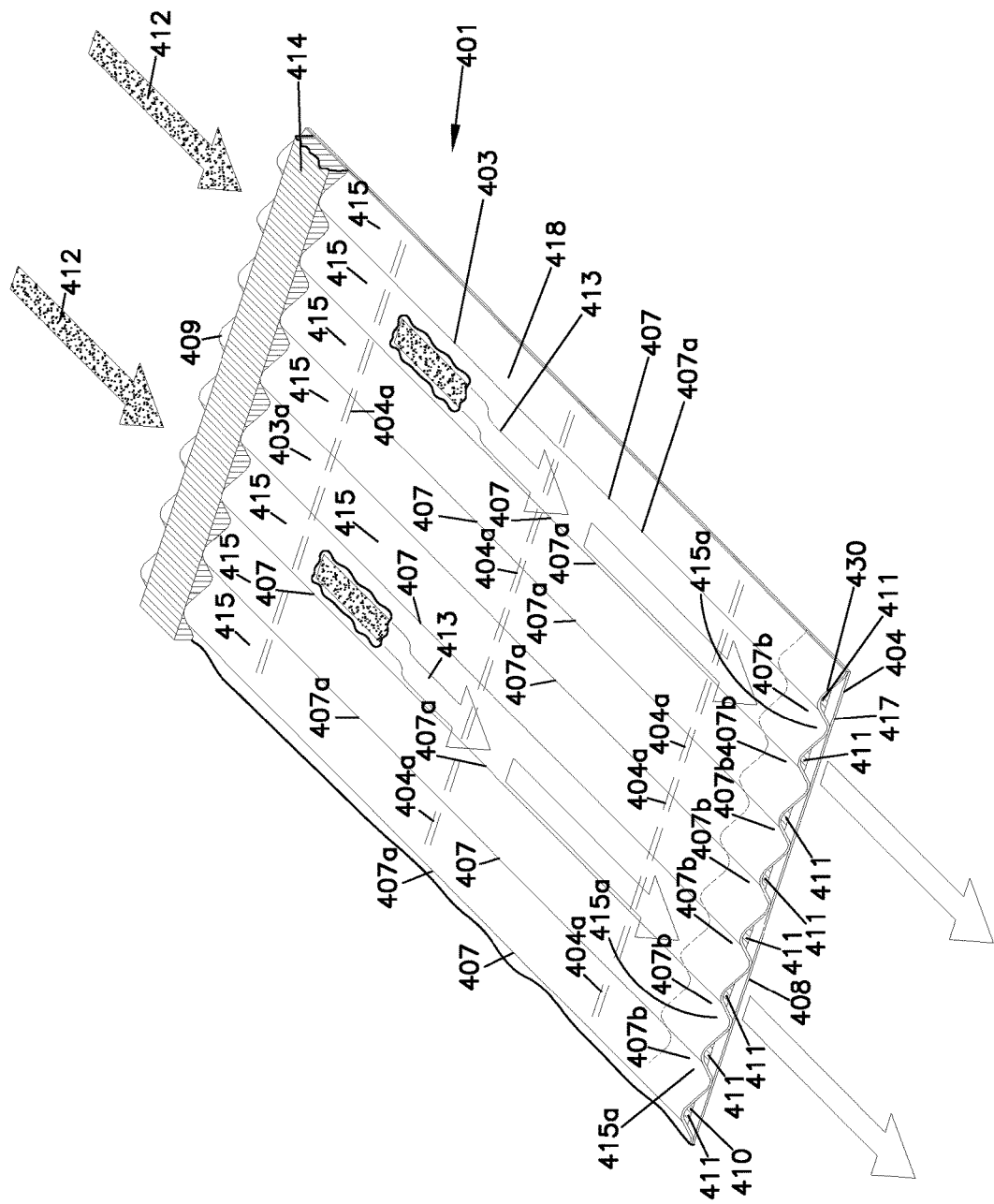
FIG. 19 is a fragmentary, schematic, perspective view of z-filter media useable in arrangements according to the present disclosure.

In FIG. 19, an example of media 401 useable in z-filter media is shown. The media 401 is formed from a corrugated (fluted) sheet 403 and a facing sheet 404.

In general, the corrugated sheet 403, FIG. 19, is of a type generally characterized herein as having a regular, curved, wave pattern of flutes or corrugations 407. The term "wave pattern" in this context, is meant to refer to a flute or corrugated pattern of alternating troughs 407b and ridges 407a. The term "regular" in this context is meant to refer to the fact that the pairs of troughs and ridges (407b, 407a) alternate with generally the same repeating corrugation (or flute) shape and size. (Also, typically in a regular configuration each trough 407b is substantially an inverse of each ridge 407a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 403 is flexible. With respect to the characterization of a repeating pattern, it is not meant that in any given filter construction, an equal number of ridges and troughs is necessarily present. The media 401 could be terminated, for example, between a pair comprising a ridge and a trough, or partially along a pair comprising a ridge and a trough. (For example, in FIG. 19 the media 401 depicted in fragmentary has eight complete ridges 407a and seven complete troughs 407b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 407a of each ridge and the bottom 407b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 19, for the corrugated sheet 403, is that at approximately a midpoint 430 between each trough and each adjacent ridge, along most of the length of the flutes 407, is located a transition region where the curvature inverts. For example, viewing back side or face 403a, FIG. 19, trough 407b is a concave region, and ridge 407a is a convex region. Of course when viewed toward front side or face 403b, trough 407b of side 403a forms a ridge; and, ridge 407a of face 403a, forms a trough. (In some instances, region 430 can be a straight segment, instead of a point, with curvature inverting at ends of the straight segment 430.)

A characteristic of the particular regular, curved, wave pattern corrugated sheet 403 shown in FIG. 19, is that the individual corrugations are generally straight. By "straight" in this context, it is meant that through at least 70% (typically at least 80%) of the length between edges 408 and 409, the ridges 407a and troughs 407b do not change substantially in cross-section. The term "straight" in reference to corrugation pattern shown in FIG. 19, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 19 and as referenced above, the media 401 has first and second opposite edges 408 and 409. When the media 401 is coiled and formed into a media pack, in general edge 409 will form an inlet end for the media pack and edge 408 an outlet end, although an opposite orientation is possible.

Adjacent edge 408 the sheets 403, 404 are sealed to one another, for example by sealant, in this instance in the form of a sealant bead 410, sealing the corrugated (fluted) sheet 403 and the facing sheet 404 together. Bead 410 will sometimes be referred to as a "single facer" bead, when it is applied as a bead between the corrugated sheet 403 and facing sheet 404, to form the single facer or media strip 401. Sealant bead 410 seals closed individual flutes 411 adjacent edge 408, to passage of air therefrom.

Adjacent edge 409, is provided sealant, in this instance in the form of a seal bead 414. Seal bead 414 generally closes flutes 415 to passage of unfiltered fluid therein, adjacent edge 409. Bead 414 would typically be applied as the media 401 is coiled about itself, with the corrugated sheet 403 directed to the inside. Thus, bead 414 will form a seal between a back side 417 of facing sheet 404, and side 418 of the corrugated sheet 403. The bead 414 will sometimes be referred to as a "winding bead" when it is applied as the strip 401 is coiled into a coiled media pack. If the media 401 were cut in strips and stacked, instead of coiled, bead 414 would be a "stacking bead."

In some applications, the corrugated sheet 403 is also tacked to the facing sheet 4 at various points along the flute length, as shown at lines 404a.

Referring to FIG. 19, once the media 401 is incorporated into a media pack, for example by coiling or stacking, it can be operated as follows. First, air in the direction of arrows 412, would enter open flutes 411 adjacent end 409. Due to the closure at end 408, by bead 410, the air would pass through the media shown by arrows 413. It could then exit the media pack, by passage through open ends 415a of the flutes 415, adjacent end 408 of the media pack. Of course operation could be conducted with air flow in the opposite direction, as discussed for example with respect to FIG. 24. The point being that in typical air filter applications, at one end or face of the media pack unfiltered air flow goes in, and at an opposite end or face the filtered air flow goes out, with no unfiltered air flow through the pack or between the faces.

For the particular arrangement shown herein in FIG. 19, the parallel corrugations 7a, 7b are generally straight completely across the media, from edge 708 to edge 709. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 403, facing sheet 404 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 20:
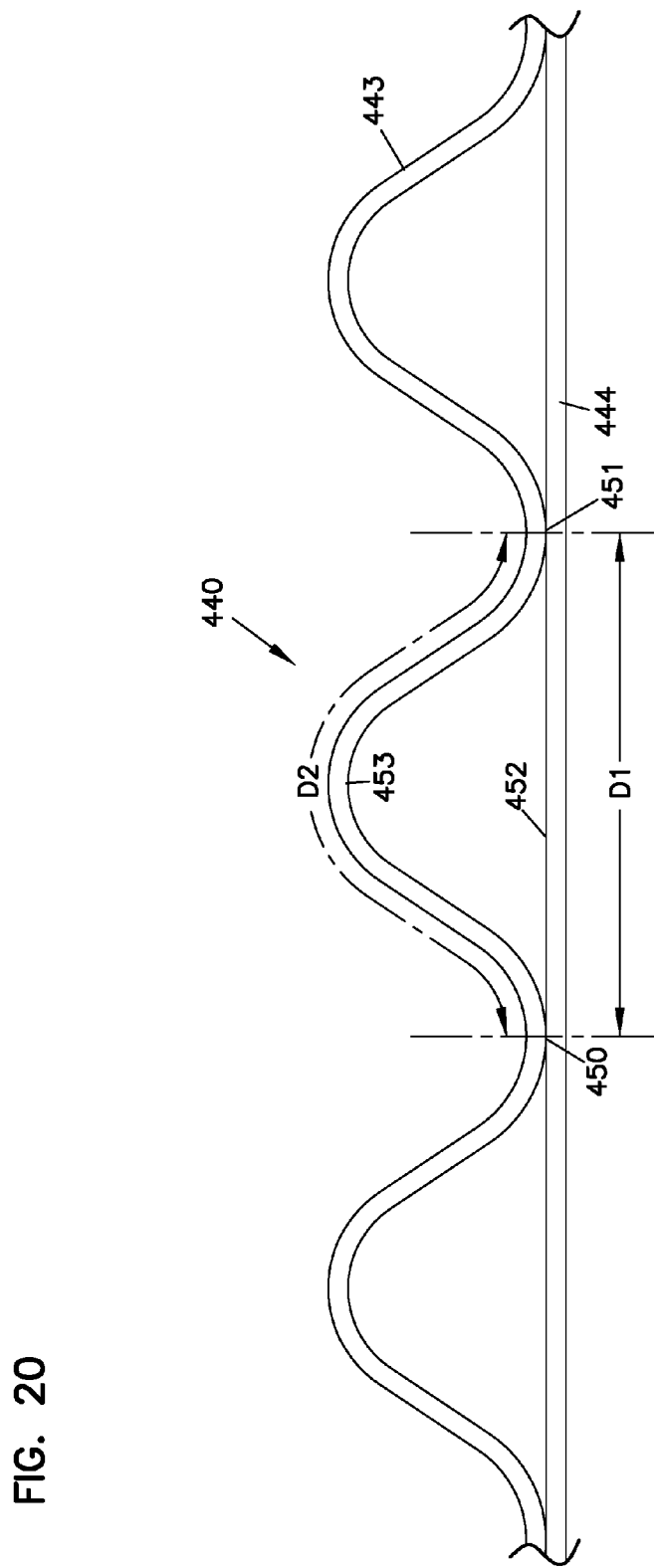
FIG. 20 is a schematic, cross-sectional view of a portion of the media depicted in FIG. 19.

Attention is now directed to FIG. 20, in which a z-filter media construction 440 utilizing a regular, curved, wave pattern corrugated sheet 443, and a facing (in this instance non-corrugated) sheet 444, is depicted. The distance D1, between points 450 and 451, defines the extension of facing media 444 in region 452 underneath a given corrugated flute 453. The length D2 of the arcuate media for the corrugated flute 453, over the same distance D1 is of course larger than D1, due to the shape of the corrugated flute 453. For a typical regular shaped media used in fluted filter applications, the linear length D2 of the media 453 between points 450 and 451 will generally be at least 1.2 times D1. Typically, D2 would be within a range of 1.2-2.0 time D1, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated (fluted) media.

Figure 21:
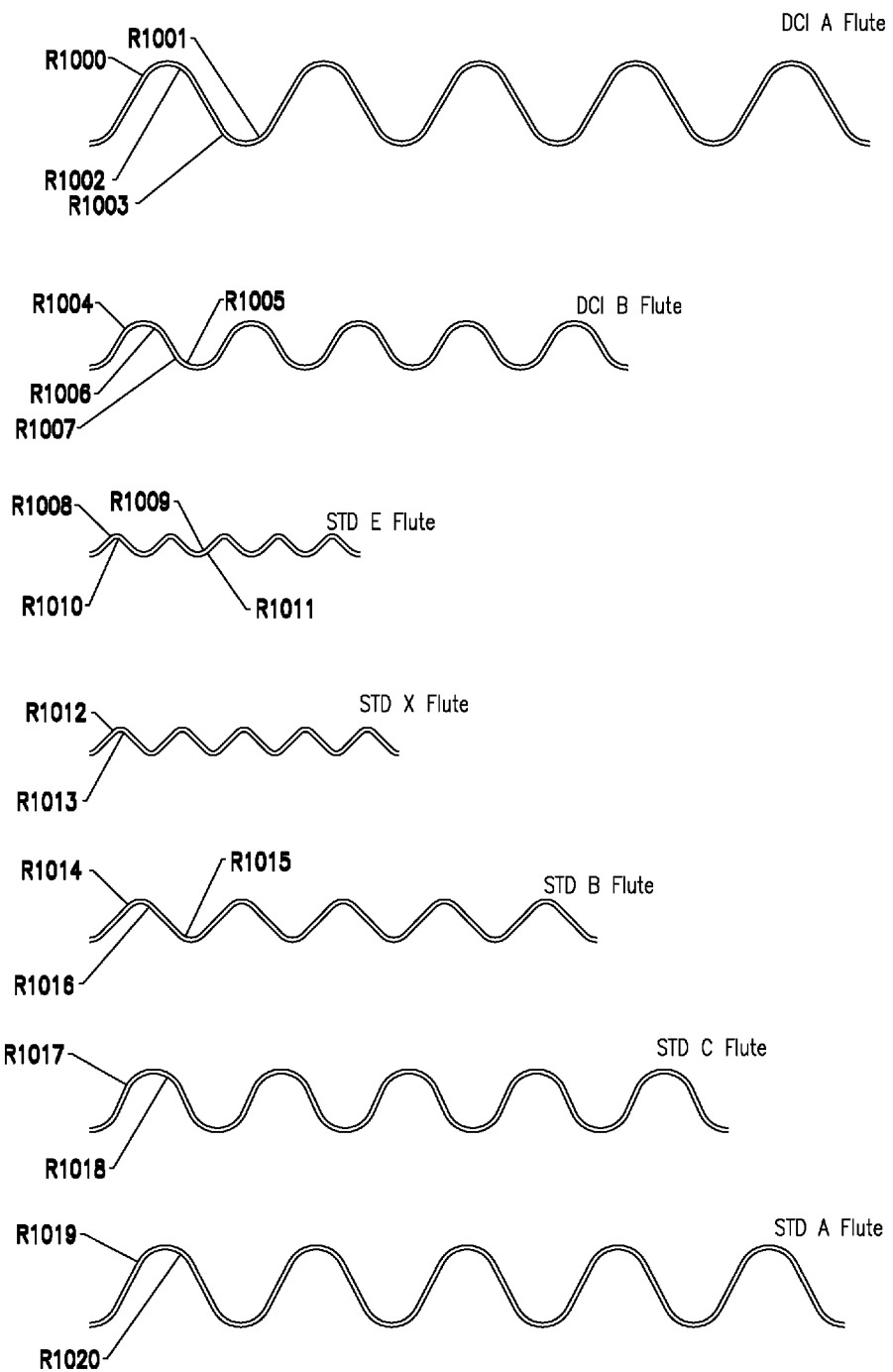
FIG. 21 is a schematic view of examples of various corrugated media definitions.

In the corrugated cardboard industry, various standard flutes have been defined. For example the standard E flute, standard X flute, standard B flute, standard C flute and standard A flute. FIG. 21, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 21.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm);<br>R1001 = .0581 inch (1.476 mm);<br>R1002 = .0575 inch (1.461 mm);<br>R1003 = .0681 inch (1.730 mm); |
| DCI B Flute: | Flute/flat = 1.32:1; The Radii (R) are as follows:<br>R1004 = .0600 inch (1.524 mm);<br>R1005 = .0520 inch (1.321 mm);<br>R1006 = .0500 inch (1.270 mm);<br>R1007 = .0620 inch (1.575 mm); |
| Std. E Flute: | Flute/flat = 1.24:1; The Radii (R) are as follows:<br>R1008 = .0200 inch (.508 mm);<br>R1009 = .0300 inch (.762 mm);<br>R1010 = .0100 inch (.254 mm);<br>R1011 = .0400 inch (1.016 mm); |
| Std. X Flute: | Flute/flat = 1.29:1; The Radii (R) are as follows:<br>R1012 = .0250 inch (.635 mm);<br>R1013 = .0150 inch (.381 mm); |
| Std. B Flute: | Flute/flat = 1.29:1; The Radii (R) are as follows:<br>R1014 = .0410 inch (1.041 mm);<br>R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm);<br>R1018 = .0620 inch (1.575 mm); |
| Std. A Flute: | Flute/flat =1.53:1; The Radii (R) are as follows:<br>R1019 = .0720 inch (1.829 mm);<br>R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

B. Manufacture of Coiled Media Configurations Using Fluted Media, Generally

Figure 22:
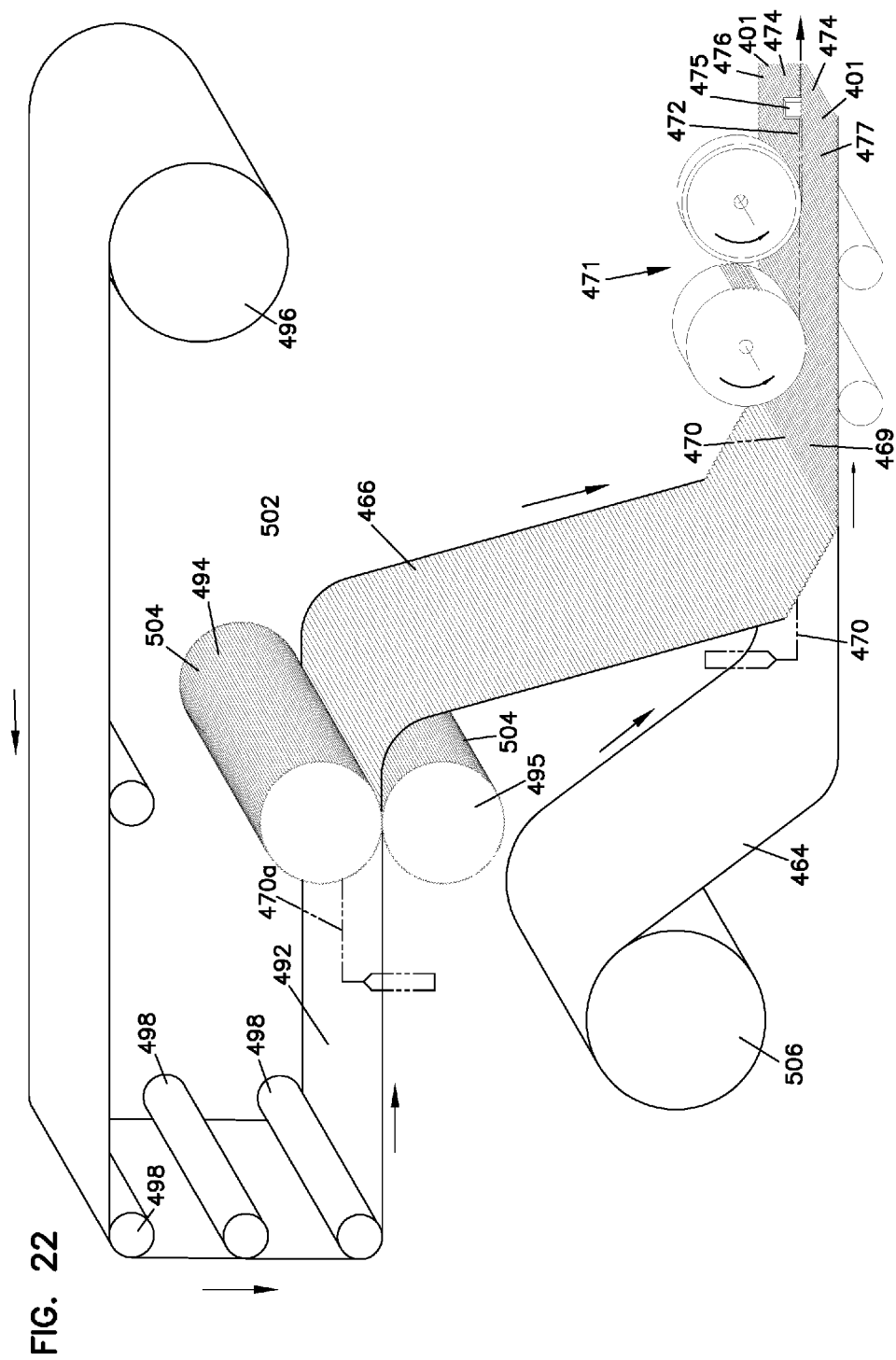
FIG. 22 is a schematic view of a process for manufacturing media useable according to the present disclosure.

In FIG. 22, one example of a manufacturing process for making a media strip corresponding to strip 401, FIG. 19 is shown. In general, facing sheet 464 and the fluted (corrugated) sheet 466 having flutes 468 are brought together to form a media web 469, with an adhesive bead located therebetween at 470. The adhesive bead 470 will form a single facer bead 410, FIG. 19. An optional darting process occurs at station 471 to form center darted section 472 located mid-web. The z-filter media or Z-media strip 474 can be cut or slit at 475 along the bead 470 to create two pieces 476, 477 of z-filter media 474, each of which has an edge with a strip of sealant (single facer bead) extending between the corrugating and facing sheet. Of course, if the optional darting process is used, the edge with a strip of sealant (single facer bead) would also have a set of flutes darted at this location.

Also, if tack beads or other tack connections 404a, FIG. 19, are used, they can be made, as the sheets 464, 466 are brought together.

Techniques for conducting a process as characterized with respect to FIG. 22 are described in PCT WO 04/007054, published Jan. 22, 2004 incorporated herein by reference.

Still in reference to FIG. 22, before the z-filter media 474 is put through the darting station 471 and eventually slit at 475, it must be formed. In the schematic shown in FIG. 22, this is done by passing a sheet of media 492 through a pair of corrugation rollers 494, 495. In the schematic shown in FIG. 22, the sheet of media 492 is unrolled from a roll 496, wound around tension rollers 498, and then passed through a nip or bite 502 between the corrugation rollers 494, 495. The corrugation rollers 494, 495 have teeth 504 that will give the general desired shape of the corrugations after the flat sheet 492 passes through the nip 502. After passing through the nip 502, the sheet 492 becomes corrugated across the machine direction and is referenced at 466 as the corrugated sheet. The corrugated sheet 466 is then secured to facing sheet 464. (The corrugation process may involve heating the media, in some instances.)

Still in reference to FIG. 22, the process also shows the facing sheet 464 being routed to the darting process station 471. The facing sheet 464 is depicted as being stored on a roll 506 and then directed to the corrugated sheet 466 to form the Z-media 474. The corrugated sheet 466 and the facing sheet 464 are secured together by adhesive or by other means (for example by sonic welding).

Referring to FIG. 22, an adhesive line 470 is shown used to secure corrugated sheet 466 and facing sheet 464 together, as the sealant bead. Alternatively, the sealant bead for forming the facing bead could be applied as shown as 470a. If the sealant is applied at 470a, it may be desirable to put a gap in the corrugation roller 495, and possibly in both corrugation rollers 494, 495, to accommodate the bead 470a.

The type of corrugation provided to the corrugated media is a matter of choice, and will be dictated by the corrugation or corrugation teeth of the corrugation rollers 494, 495. One preferred corrugation pattern will be a regular curved wave pattern corrugation of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 23:
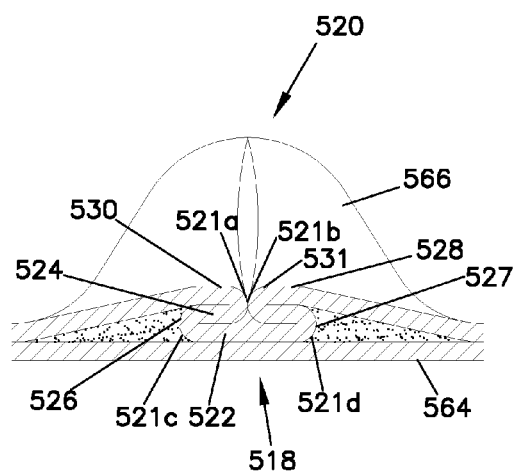
FIG. 23 is a schematic cross-sectional view and optional end dart for media flutes useable in arrangements according to the present disclosure.

As described, the process shown in FIG. 22 can be used to create the center darted section 472. FIG. 23 shows, in cross-section, one of the flutes 468 after darting and slitting.

A fold arrangement 518 can be seen to form a darted flute 520 with four creases 521a, 521b, 521c, 521d. The fold arrangement 518 includes a flat first layer or portion 522 that is secured to the facing sheet 464. A second layer or portion 524 is shown pressed against the first layer or portion 522. The second layer or portion 524 is preferably formed from folding opposite outer ends 526, 527 of the first layer or portion 522.

Still referring to FIG. 23, two of the folds or creases 521a, 521b will generally be referred to herein as "upper, inwardly directed" folds or creases. The term "upper" in this context is meant to indicate that the creases lie on an upper portion of the entire fold 520, when the fold 520 is viewed in the orientation of FIG. 23. The term "inwardly directed" is meant to refer to the fact that the fold line or crease line of each crease 521a, 521b, is directed toward the other.

In FIG. 23, creases 521c, 521d, will generally be referred to herein as "lower, outwardly directed" creases. The term "lower" in this context refers to the fact that the creases 521c, 521d are not located on the top as are creases 521a, 521b, in the orientation of FIG. 23. The term "outwardly directed" is meant to indicate that the fold lines of the creases 521e, 521d are directed away from one another.

The terms "upper" and "lower" as used in this context are meant specifically to refer to the fold 520, when viewed from the orientation of FIG. 23. That is, they are not meant to be otherwise indicative of direction when the fold 520 is oriented in an actual product for use.

Based upon these characterizations and review of FIG. 23, it can be seen that a preferred regular fold arrangement 518 according to FIG. 23 in this disclosure is one which includes at least two "upper, inwardly directed, creases." These inwardly directed creases are unique and help provide an overall arrangement in which the folding does not cause a significant encroachment on adjacent flutes.

A third layer or portion 528 can also be seen pressed against the second layer or portion 524. The third layer or portion 528 is formed by folding from opposite inner ends 530, 531 of the third layer 528.

Another way of viewing the fold arrangement 518 is in reference to the geometry of alternating ridges and troughs of the corrugated sheet 566. The first layer or portion 522 is formed from an inverted ridge. The second layer or portion 524 corresponds to a double peak (after inverting the ridge) that is folded toward, and in preferred arrangements folded against, the inverted ridge.

Techniques for providing the optional dart described in connection with FIG. 23, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Techniques described herein are particularly well adapted for use with media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding axis of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack. Examples of such media pack arrangements are shown in U.S. Provisional Application 60/578,482, filed Jun. 8, 2004, incorporated herein by reference.

The flute seals (for example from the single facer bead, winding bead or stacking bead) can be formed from a variety of materials. In various ones of the cited and incorporated references, hot melt or polyurethane seals are described as possible for various applications. Such materials are also useable for arrangements as characterized herein.

When the media is coiled, generally a center of the coil needs to be closed, to prevent passage of unfiltered air between the flow faces; i.e., through the media pack. Some approaches to this are referenced below. Others are described in U.S. Provisional 60/578,482, filed Jun. 8, 2004; and U.S. Provisional 60/591,280, filed Jul. 26, 2004.

The media chosen for the corrugated sheet and facing sheet can be the same or different. Cellulose fiber, synthetic fiber or mixed media fiber materials can be chosen. The media can be provided with a fine fiber layer applied to one or more surface, for example in accord with U.S. Pat. No. 6,673,136, issued Jan. 6, 2004, the complete disclosure of which is incorporated herein by reference. When such material is used on only one side of each sheet, it is typically applied on the side(s) which will form the upstream side of inlet flutes.

Above it was discussed that flow could be opposite to the direction shown in FIG. 19.

Figure 24:
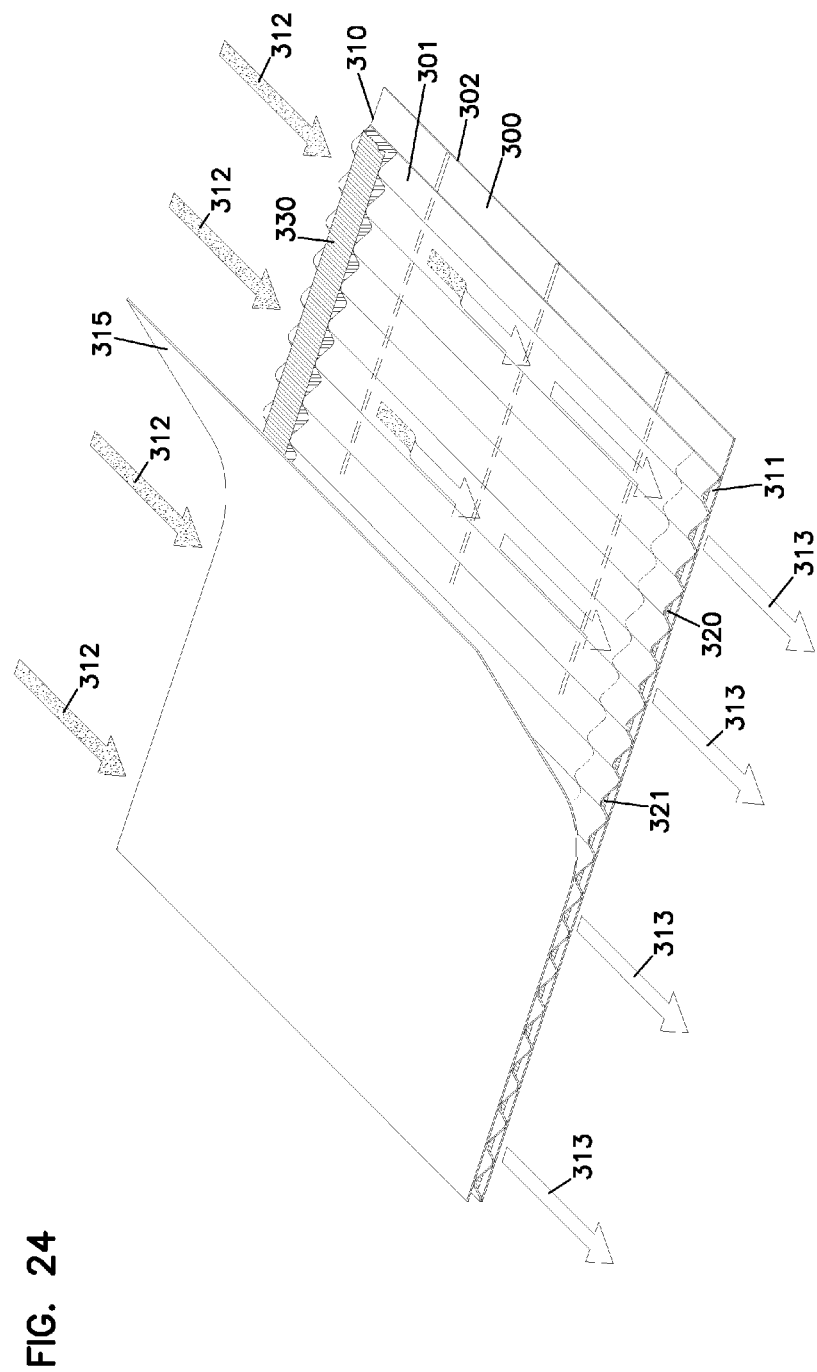

In FIG. 24, a schematic depiction of media useable in such z-filter media packs as shown. The schematic depiction of FIG. 24 is generic, and is not meant to indicate unique or preferred seal type or flute shapes.

Referring to FIG. 24, the reference numeral 300 generally indicates a single facer comprising corrugated sheet 301 secured to flat sheet 302. It is noted that the flat sheet 302 does not have to be perfectly flat, it may comprise a sheet that itself has very small corrugations and other formations therein.

Particular single facer 300 depicted, could be coiled around itself or around a core and then around itself, typically with flat sheet 302 to the outside. For the arrangement shown, edge 310 will form the inlet face in the eventual media pack and end or edge 311 will form the outlet flow faces. Thus arrows 312 represent inlet arrows and arrows 313 represent outlet flow arrows. Sheet 315 is merely meant to schematically represent a flat sheet corresponding to sheet 302, of the next wind.

Adjacent edge 311 is provided a single facer seal arrangement 320. In this instance the single facer shield arrangement 320 comprises a bead of sealant 321 between corrugated sheet 301 and flat sheet 302, positioned along edge 310 or within about 10% of the total length of the flutes, i.e., the distance between inlet edge 310 and outlet edge 311. A variety of materials and arrangements can be used for the seal arrangement 320. The seal arrangement could comprise a corrugated or folded arrangement, sealed with a sealant, or sealed by other means. The particular seal arrangement 320 depicted, could comprise a bead of hot melt sealant, although alternatives are possible. The seals at 320 could be darted or folded, as shown for FIGS. 4 and 10.

Adjacent end 310 a winding seal 330 is depicted. Winding seal 330 generally provides for a seal between layers adjacent edge 311, as the single facer 300 is coiled. Preferably winding seal 330 is positioned within 10% of the total length of the flutes (i.e., the distance between edge 311 and 310) of edge 310.

If is the very ends (lead and tail) of the single facer need to be sealed between the corrugated and flat sheets, sealant can be applied at these locations to do so.

VIII. General Background Regarding Air Cleaner Systems

Figure 25:
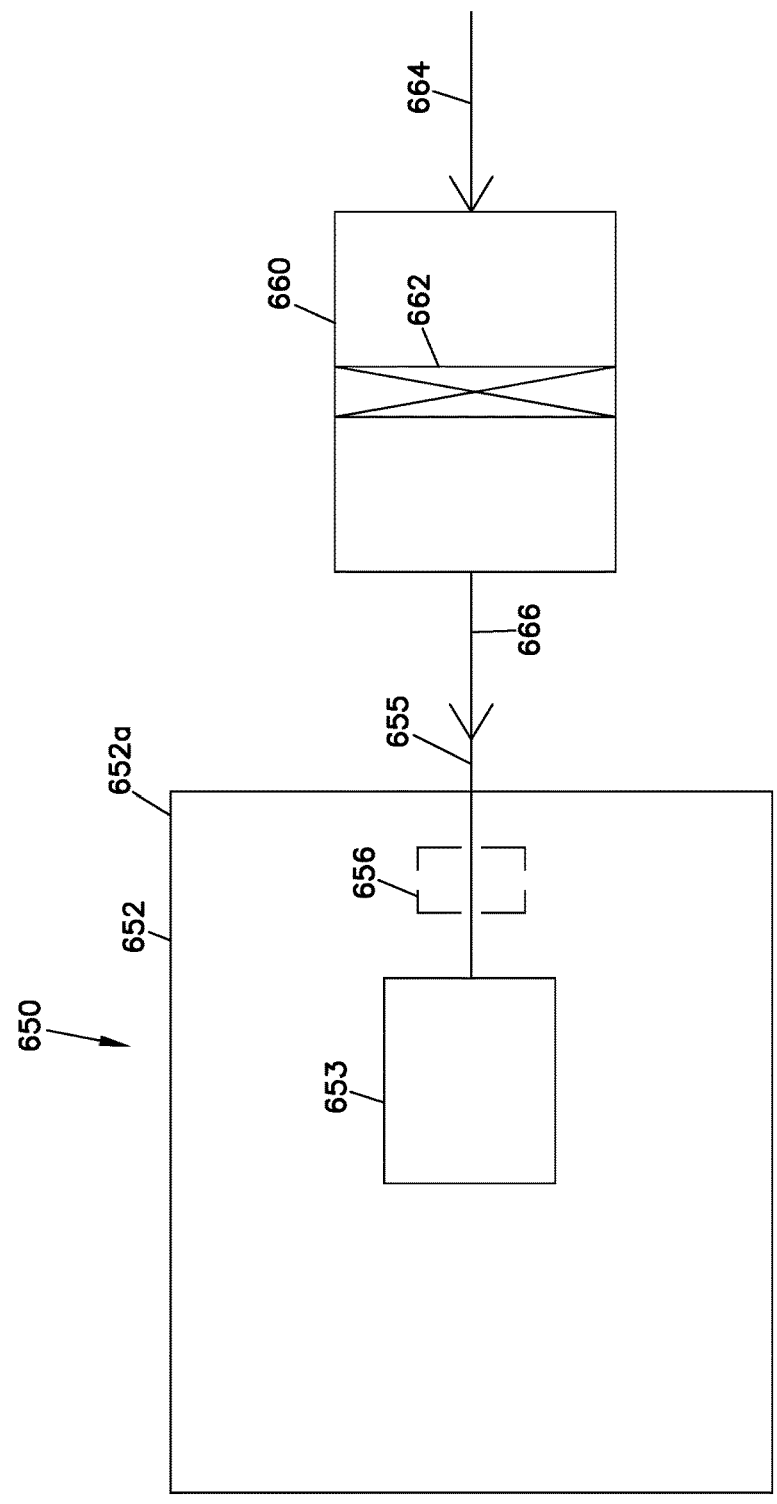
FIG. 25 is a schematic view of a system using an air cleaner having a filter cartridge component according to the present disclosure.

The principles and arrangements described herein are useable in a variety of systems. One particular system is depicted schematically in FIG. 25, generally at 650. In FIG. 25, equipment 652, such as a vehicle 652a having an engine 653 with some defined rated air flow demand, for example in the range of 50 cfm to 2000 cfm (cubic feet per minute) (i.e., 1.4-57 cubic meters/minute) is shown schematically. Although alternatives are possible, the equipment 652 may, for example, comprise a bus, an over-the-highway truck, an off-road vehicle, a tractor, a light-duty or medium-duty truck, or a marine vehicle such as a power boat. The engine 653 powers the equipment 652 upon fuel combustion. In FIG. 25, air flow is shown drawn into the engine 653 at an air intake at region 655. An optional turbo 656 is shown in phantom, as optionally boosting the air intake to the engine 653. The turbo 656 is shown downstream from an air cleaner 660, although alternate arrangement are possible.

The air cleaner 660 has a filter cartridge 662 and is shown in the air inlet stream to the engine 653. In general, in operation, air is drawn in at arrow 664 into the air cleaner 660 and through the filter cartridge 662. Upon passage through the air cleaner 660, selected particles and contaminants are removed from the air. The cleaned air then flows downstream at arrow 666 into the intake 655. From there, the air flow is directed into the engine 653.

In a typical air cleaner 660, the filter cartridge 662 is a serviceable component. That is, the cartridge 662 is removable and replaceable within the air cleaner 660. This allows the cartridge 662 to be serviced, by removal and replacement, with respect to remainder of air cleaner 660, when the cartridge 662 becomes sufficiently loaded with dust or other contaminant, to require servicing.

IX. One Type of Useable Central Core for Round Coiled Media Packs

Figure 26:
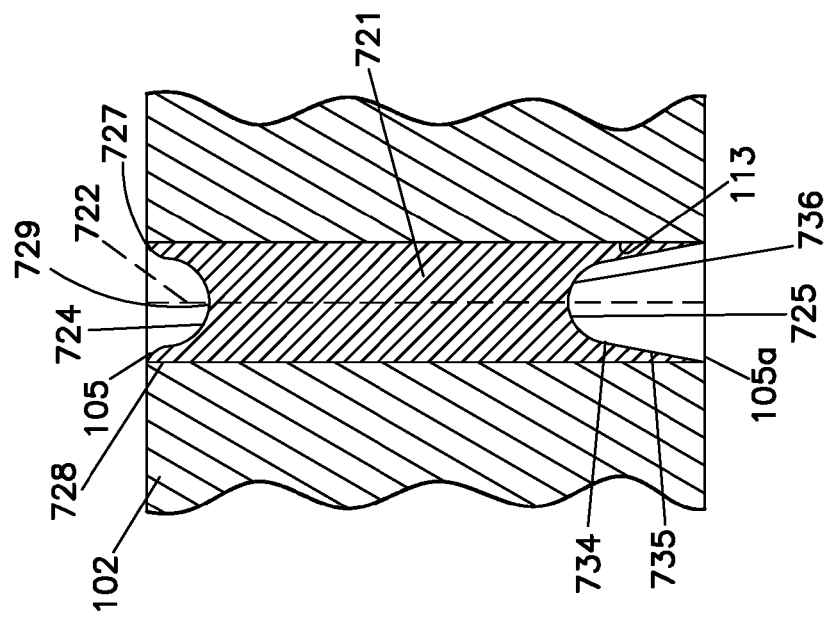
FIG. 26 is a fragmentary, cross-sectional view showing a plug in a central core of the filter cartridge of FIG. 9.

Above it was discussed, in connection with the discussion of FIG. 9, the core 113 could be filled with a plug. An example is described below, and shown in FIG. 26. In FIG. 26, a fragmentary portion of media pack 102, FIG. 9, is shown. Referring to FIG. 26, the coiled media pack 102 includes center core 113. The core 113 needs to be sealed against unfiltered air flow therethrough. This is done by center piece, plug or core 721. Core 721 also provides for a lead end seal of the single facer strip which is coiled to form the media pack 102.

More specifically, the media lead end is shown in phantom at 722. For the arrangement shown, between regions 724 and 725, the mold-in-place plug 721 is provided in center 113. Thus, it seals at least a portion of the lead end 724 of the media strip.

Still referring to FIG. 26, in general the preferred plug 721 is a poured and cured core. By this it is meant that the plug 721 results from pouring a fluid resin into center 113 and allowing the resin to cure. A variety of shapes and sizes for the plug 721 are possible.

Typically when used as a lead end seal, the plug 721 will be configured to extend along, or engulf, at least 80% of the lead end seal length, typically at least 90% of that length. In some instances, for example in the instance shown in FIG. 26, the plug 721 may be configured to cover or enclose the entire lead end 722.

The plug 721 can be configured with recesses as shown, or it can be configured to have no recesses or even to have one or more projections extending outwardly from the element.

When the plug 721 is provided with recesses as shown, typically region 724 will be spaced from end face 105 at least 2 mm, and region 725 will be spaced from end 105a by at least 2 mm.

Region 727 extends from region 724 toward face 105, and terminates at face 105 as shown, or spaced therefrom within a preferred distance. This region defines an outer seal wall 728 with a hollow center 729. The seal wall 728 continues the sealing of the lead end 722 of the media pack 102. Region 727 can be viewed as a concave end to plug 721. Herein, region 727 will sometimes be referred to as a concave end with an axially outwardly projecting end skirt 728.

Skirt 728 is not required to terminate at end face 105, although such termination is shown in the arrangement of FIG. 26. It can terminate short thereof and can still accomplish much of its function of sealing the lead end 722, for example, by terminating at or adjacent the winding bead seal or single facer seal in this region.

Analogously, between region 725 and surface 105a, region 734 is provided, with outer seal area 735 and inner center recess 736. The seal area 735 provides, among other things, for sealing of the lead end 722 of the media 102 between region 725 and surface 105a. The seal area 735 can be seen as a concave end to plug 721. Herein, region 725 will sometimes be referred to as a concave end with an axially outwardly projecting end skirt 735. In some instances end skirt 735 is not required to terminate adjacent end face 105a, as shown. Rather skirt 735 can terminate short of end face 105a, and still accomplish an appropriate seal of the lead end 102 at this location, by terminating adjacent or in cooperation with a winding bead or seal bead at this location.

Still referring to FIG. 26, although not shown, structure could be embedded within plug 721. For example, a hollow core or other structure from a winding process could be left within region 113, to be engulfed within core 721 as a result of a molding operation.

The plug 721 can be molded-in-place, from a resin port into core 113. As an example, a plug could be provided projecting into core 113 from end face 105, having an appropriate shape. The resin could be poured in place, and a second plug put in place projecting into core 113 from end face 105a. A foamed urethane could be used in the resin for example, which would rise an form the shape shown. This molding operation could be conducted before the molding operation discussed above in connection with FIGS. 11-16. In the alternative, the mold arrangement 180 could be provided with the appropriate plug projecting into the central core 113 of the media pack involved, with the opposite end being formed by an appropriate plug.

With respect to the core, urethane having an as molded density of no more than 15 lbs. per cubic foot (0.24 grams/cc), and sometimes no more than 10 lbs. per cubic foot (0.16 grams/cc), can be used, although alternatives of higher density, can be used. It is anticipated that the as molded density would typically be at least 5 lbs./cubic foot (0.08 grams/cc).

What is claimed is:

1. An air filter cartridge comprising:
    (a) a filter media pack having an inlet end and an opposite outlet end, and an outer periphery, wherein:
        (i) the filter media pack comprises alternating fluted sheet and facing sheet;
        (ii) the filter media pack comprises flutes extending from the inlet end to the outlet end, wherein inlet flute ends are closed by sealant at or near the outlet end of the filter media pack, and outlet flute ends are closed by sealant at or near the inlet end of the filter media pack; and
        (iii) the filter media pack is closed to flow of unfiltered air into the inlet end and then out of the outlet end without filtering;
    (b) a seal member comprising at least a portion thereof molded around the outer periphery of the filter media pack, and an outwardly directed surface constructed to form an outwardly directed radial seal when the air filter element is installed in an air cleaner housing; and
    (c) a polymeric material in addition to the sealant in the inlet flutes and the outlet flutes, wherein the polymeric material is introduced through the outlet end of the filter media pack and penetrates into the filter media pack beyond the outlet end of the filter media pack.

2. An air filter cartridge according to claim 1 wherein:
    (a) the flutes comprise inlet flutes open at the inlet end of the filter media pack to passage of air to be filtered therein, and outlet flutes open at the outlet end of the filter media pack to passage of filtered air therefrom.

3. An air filter cartridge according to claim 2 wherein:
    (a) the inlet flutes are closed at a location at or near the outlet end of the filter media pack, and the outlet flutes are closed at a location at or near the inlet end of the filter media pack.

4. An air filter cartridge according to claim 1 further comprising:
    (a) a seal support wherein the seal member is molded onto at least a portion of the seal support.

5. An air filter cartridge according to claim 1 wherein:
    (a) the seal support is constructed to maintain the outwardly directed radial seal when the air filter cartridge is installed in an air cleaner housing.

6. An air filter cartridge according to claim 4 wherein:
    (a) the seal support is part of a preform positioned adjacent the outlet end of the filter media pack.

7. An air filter cartridge according to claim 6 wherein:
    (a) the seal support projects from the outlet end of the filter media pack.

8. An air filter cartridge according to claim 6 wherein:
    (a) the preform comprises a media face cross-piece arrangement integral therewith and extending over the outlet end of the filter media pack.

9. An air filter cartridge according to claim 6 wherein:
    (a) the preform comprises a glass filled nylon material.

10. An air filter cartridge according to claim 1 wherein:
    (a) the alternating fluted sheet and facing sheet are coiled to provide the filter media pack in a wound configuration.

11. An air filter cartridge according to claim 1 wherein:
(a) the seal member comprises foamed polyurethane.

12. An air filter cartridge according to claim 1 wherein:
(a) the filter media pack has an oval shaped cross-section.

13. An air filter cartridge according to claim 1 wherein:
(a) the filter media pack comprises a racetrack shaped cross-section having two opposite, curved ends and two, opposite, sides.

14. An air filter cartridge according to claim 1 wherein:
(a) the filter media pack has a circular cross-section.

15. An air filter cartridge according to claim 1 wherein:
(a) the alternating fluted sheet and facing sheet has an outside tail end edge, and the seal member covers at least a portion of the outside tail end edge.

16. An air filter cartridge according to claim 1 wherein:
(a) inlet flute ends, adjacent the outlet end of the filter media pack, are closed by sealant; and
(b) outlet flute ends, adjacent the inlet end of the filter media pack, are closed by sealant.

17. An air filter cartridge according to claim 1 wherein:
(a) the polymeric material introduced through the outlet end of the filter media pack is integral with the seal member.

18. An air filter cartridge comprising:
(a) a filter media pack having an inlet end and an opposite outlet end, and an outer periphery, wherein:
  (i) the filter media pack comprises alternating fluted sheet and facing sheet in a wound configuration;
  (ii) the filter media pack comprises a plurality of inlet flutes and outlet flutes extending from the inlet end to the outlet end, wherein the inlet flute ends are closed by sealant at or near the outlet end of the filter media pack, and the outlet flute ends are closed by sealant at or near the inlet end of the filter media pack; and
  (iii) the filter media pack is closed to flow of unfiltered air into the inlet end and then out of the outlet end without filtering;
(b) a seal member comprising at least a portion thereof molded around the outer periphery of the filter media pack; and
(c) a polymeric material in addition to the sealant in the inlet flutes and the outlet flutes, wherein the polymeric material is introduced through the outlet end of the filter media pack and penetrates into the filter media pack beyond the outlet end of the filter media pack.

19. An air filter cartridge according to claim 18 further comprising:
(a) a seal support wherein the seal member is molded onto at least a portion of the seal support.

20. An air filter cartridge according to claim 18 wherein:
(a) the seal support is part of a preform positioned adjacent the outlet end of the filter media pack.

21. An air filter cartridge according to claim 20 wherein:
(a) the preform comprises a media face cross-piece arrangement integral therewith and extending over the outlet end of the filter media pack.

22. An air filter cartridge according to claim 18 wherein:
(a) the seal member comprises foamed polyurethane.

23. An air filter cartridge according to claim 18 wherein:
(a) the filter media pack has an oval shaped cross-section.

24. An air filter cartridge according to claim 18 wherein:
(a) the filter media pack comprises a racetrack shaped cross-section having two opposite, curved ends and two, opposite, sides.

25. An air filter cartridge according to claim 18 wherein:
(a) the filter media pack has a circular cross-section.

26. An air filter cartridge according to claim 20 wherein:
(a) the alternating fluted sheet and facing sheet has an outside tail end edge, and the seal member covers at least a portion of the outside tail end edge.

27. An air filter cartridge according to claim 18 wherein:
(a) the polymeric material is introduced into the filter media pack through the outlet end of the filter media pack.

28. An air filter cartridge according to claim 27 wherein:
(a) the polymeric material is integral with the seal member.

* * * * *